US010264525B2

(12) United States Patent
Pratt et al.

(10) Patent No.: US 10,264,525 B2
(45) Date of Patent: Apr. 16, 2019

(54) ENERGY EFFICIENT COMMUNICATIONS

(71) Applicant: University of Notre Dame du Lac, South Bend, IN (US)

(72) Inventors: Thomas G. Pratt, Niles, MI (US); Jun Chen, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 0 days.

(21) Appl. No.: 14/944,109

(22) Filed: Nov. 17, 2015

(65) Prior Publication Data

US 2016/0219506 A1 Jul. 28, 2016

Related U.S. Application Data

(60) Provisional application No. 62/080,917, filed on Nov. 17, 2014, provisional application No. 62/256,592, filed on Nov. 17, 2015.

(51) Int. Cl.
*H04W 52/02* (2009.01)
*H04B 7/0426* (2017.01)
(Continued)

(52) U.S. Cl.
CPC ...... *H04W 52/0209* (2013.01); *H04B 7/0434* (2013.01); *H04B 7/10* (2013.01);
(Continued)

(58) Field of Classification Search
CPC ........... H04W 52/0209; H04W 28/048; H04W 40/16; H04W 92/18; H04B 7/0434;
(Continued)

(56) References Cited

U.S. PATENT DOCUMENTS 6,865,164 B1 * 3/2005 Scribano ............... H04W 28/06 370/328
9,325,436 B2 4/2016 Pratt et al.
(Continued)

OTHER PUBLICATIONS

Agilent Technologies, "Agilent N5182A MXG and N5162A MXG Vector Signal Generators," Data Sheet, May 21, 2012, pp. 35, http://cp.literature.agilent.com/litweb /pdf/ 5989-5261EN.pdf, as accessed Jun. 3, 2013.
(Continued)

*Primary Examiner* — Duc C Ho
(74) *Attorney, Agent, or Firm* — Knobbe, Martens, Olson & Bear, LLP

(57) ABSTRACT

Systems and methods for performing energy efficient communication. A transceiver for use in a point-to-point packet-based communication link with packet erasures is described. The transceiver can include a data source to provide bits of data for transmission to a remote device. The transceiver can map the bits of data to symbols in a constellation according to a modulation scheme and can provide the symbols on one or more subcarriers. The transceiver can include co-located orthogonally polarized antenna elements or spatially separated antenna elements or both. The symbols can be transmitted in packets via one or more of the antenna elements. The transceiver can determine a metric of average transmit energy per bit successfully decoded, and not erased, at the remote device and can adjust transmission powers at the antenna elements to reduce the average transmit energy per successfully decoded and unerased bit.

19 Claims, 33 Drawing Sheets

(51) Int. Cl.

| | |
|---|---|
| ***H04L 5/00*** | (2006.01) |
| ***H04W 40/16*** | (2009.01) |
| ***H04L 29/06*** | (2006.01) |
| ***H04B 7/10*** | (2017.01) |
| ***H04L 1/00*** | (2006.01) |
| ***H04W 28/04*** | (2009.01) |
| *H04W 92/18* | (2009.01) |

(52) U.S. Cl.
CPC .............. *H04L 1/00* (2013.01); *H04L 5/0051* (2013.01); *H04L 69/22* (2013.01); *H04W 28/04* (2013.01); *H04W 40/16* (2013.01); *H04W 92/18* (2013.01); *Y02D 70/00* (2018.01); *Y02D 70/144* (2018.01); *Y02D 70/22* (2018.01); *Y02D 70/442* (2018.01); *Y02D 70/444* (2018.01)

(58) Field of Classification Search
CPC ........... H04B 7/10; H04L 1/00; H04L 5/0051; H04L 69/22; Y02B 60/50
See application file for complete search history.

(56) References Cited

U.S. PATENT DOCUMENTS

| | | | | |
|---|---|---|---|---|
| 2008/0139136 A1* | 6/2008 | Shtrom | H01Q 3/242 | 455/101 |
| 2011/0069774 A1* | 3/2011 | Wang | H04B 7/0417 | 375/267 |
| 2013/0215996 A1* | 8/2013 | Boutros | H03M 13/1102 | 375/295 |
| 2017/0093948 A1* | 3/2017 | Leong | H04L 65/607 | |

OTHER PUBLICATIONS

Agilent Technologies, "Infiniium 90000 X-Series Oscilloscopes," Data Sheet, Mar. 25, 2013, pp. 37, http://cp.literature.agilent.com/litweb/pdf/5990-5271EN.pdf, as accesed Jun. 3, 2013.
Agilent Technologies, "Agilent MIMO Channel Modeling and Emulation Test Challenges," Application Note, Jan. 22, 2010, pp. 60, http://cp.literature.agilent.com/litweb/pdf/5989-8973EN.pdf, as accessed Jun. 3, 2013.
Abichar et al., "WiMAX vs. LTE: Who Will Lead the Broadband Mobile Internet?" IT professional, May/Jun. 2010, pp. 26-32.
Agrawal et al., "Space-Time Coded OFDM for High Data-Rate Wireless Communication Over Wideband Channels," 48th IEEE Vehicular Technology Conference in VTC 98, 1998, vol. 3, pp. 2232-2236.
Almers et al., "Survey of Channel and Radio Propagation Models for Wireless MIMO Systems," EURASIP Journal on Wireless Communications and Networking, vol. 2007, pp. 19.
Asplund et al., "Propagation Characteristics of Polarized Radio Waves in Cellular Communications," 2007 IEEE 66th Vehicular Technology Conference, pp. 839-843, 2007.
Bahai et al., "Multi-Carrier Digital Communications: Theory and Applications of OFDM," Second Edition, Springer, 2004, pp. 422.
Balasubramanian et al., "Energy consumption in mobile phones: a measurement study and implications for network application," in Proceedings of the 9th ACM SIGCOMM conference on Internet measurement conference, ACM, 2009, pp. 280-293.
Benedetto et al., "Design of Parallel Concatenated Convolutional Codes," IEEE Transactions on Communications, vol. 44, No. 5, May 1996, pp. 591-600.
Benedetto et al., "Unveiling Turbo Codes: Some Results on Parallel Concatenated Coding Schemes," IEEE Transactions on Information Theory, vol. 42, No. 2, accepted September, pp. 47.
Benini, L., et al., "A survey of design techniques for system-level dynamic power management," IEEE Transactions on Very Large Scale Integration (VLSI) Systems, vol. 8, No. 3, pp. 299-316, 2000.
Biswas et al., "Vehicle-to-Vehicle Wireless Communication Protocols for Enhancing Highway Traffic Safety," IEEE Communications Magazine, Jan. 2006, vol. 44, No. 1, pp. 74-82.
Boyd et al., Convex Optimization. Cambridge University Press, First Published 2004; Seventh printing with corrections 2009, pp. 730.
Brink, Stephan ten, "Convergence Behavior of Iteratively Decoded Parallel Concatenated Codes," IEEE Transactions on Communications, vol. 49, No. 10, Oct. 2001, pp. 1727-1737.
Burr, Alister G., "Capacity Bounds and Estimates for the Finite Scatterers MIMO Wireless Channel," IEEE Journal on Selected Areas in Communications, vol. 21, No. 5, Jun. 2003, pp. 812-818.
Chalasani et al., "A Survey of Energy Harvesting Sources for Embedded Systems," in IEEE Southeastcon., 2008, pp. 442-447.
Chan et al., "Asymptotically Minimum BER Linear Block Precoders for MMSE Equalisation," in IEE Proceedings Communications, Aug. 2004, vol. 151, No. 4, pp. 297-304.
Chan et al., "The Available Capacity Computation Model Based on Artificial Neural Network for Lead-Acid Batteries in Electric Vehicles," Journal of Power Sources, 2000, vol. 87, No. 1, pp. 201-204.
Chen et al., "Fundamental Trade-offs on Green Wireless Networks," IEEE Communications Magazine, Jun. 2011, vol. 49, No. 6, pp. 30-37.
Chen et al., "Energy Efficiency of Adaptive Transmission for MIMO-OFDM Systems Over Polarization-Sensitive Channels", in National Wireless Research Collaboration Symposium (NWRCS), Idaho National Laboratory, 2014.
Chen et al., "Energy Efficiency of Co-polarized and Space-polarization MIMO Architectures in Packet-based Communication Systems", Department of Electrical Engineering, University of Notre Dame, pp. 6.
Chen et al., "Optimization of Transmit Energy Efficiency in Packet-based MIMO Systems Using Adaptive Transmission," pp. 35.
Chen, J., et al., "Energy Efficiency of Linearly Precoded MIMO for Wireless Communications from Battery-Powered Transceivers," Submitted for Publication on IEEE Transactions on Aerospace and Electronic Systems, Jun. 17, 2014, pp. 29.
Chen, J., et al., "Energy Efficiency of Space and Polarization MIMO Communications with Packet Erasures over Wireless Fading Channels," IEEE Transactions on Wireless Communications, pp. 17, 2014.
Chen, Jun, "Energy Efficiency Analysis of Packet-Based MIMO Communications Systems Over Space and Polarization Radio Channels", University of Notre Dame, Doctor of Philosophy, Graduate Program in Department of Electrical Engineering, Sep. 2015, pp. 163.
Chizhik et al., "Effect of Antenna Separation on the Capacity of Blast in Correlated Channels," IEEE Communications Letters, Nov. 2000, vol. 4, No. 11, pp. 337-339.
Correia et al., "Challenges and Enabling Technologies for Energy Aware Mobile Radio Networks," IEEE Communications Magazine, Nov. 2010, vol. 28, No. 11, pp. 66-72.
Debbah et al., "MIMO Channel Modeling and the Principle of Maximum Entropy," IEEE Transactions on Information Theory, May 2005, vol. 51, No. 5, pp. 1667-1690.
El Gamal et al., "Energy-Efficient Scheduling of Packet Transmissions over Wireless Networks," IEEE Infocom 2002, vol. 3, pp. 1773-1782.
Forenza et al., "Pattern Diversity with Multi-mode Circular Patch Antennas in Clustered MIMO Channels," in 2005 IEEE Antennas and Propagation Society International Symposium, vol. 3, pp. 438-441.
Foschini et al., "Simplified Processing for High Spectral Efficiency Wireless Communication Employing Multi-Element Arrays," IEEE Journal on Selected Areas in Communications, Nov. 1999, vol. 17, No. 11, pp. 1841-1852.
Foschini et al., "On Limits of Wireless Communications in a Fading Environment when Using Multiple Antennas," Wireless Personal Communications, 1998, vol. 6, No. 3, pp. 311-335.
Fuhl et al., "Unified Channel Model for Mobile Radio Systems with Smart Antennas," in IEE Proceedings-Radar, Sonar and Navigation, Feb. 1998, vol. 145, No. 1, pp. 32-41.

(56) References Cited

OTHER PUBLICATIONS

Gamal et al., "Analyzing the Turbo Decoder Using the Gaussian Approximation," IEEE Transactions on Information Theory, Feb. 2001, vol. 47, No. 2, pp. 671-686.
Rose et al., "Wireless Systems and Interference Avoidance," IEEE Transactions on Wireless Communications vol. 1, No. 3, Jul. 2002, pp. 415-428.
Ye et al., "An Energy-Efficient MAC Protocol for Wireless Sensor Networks," INFOCOM 2002. Twenty-First Annual Joint Conference of the IEEE Computer and Communications Societies. Proceedings. IEEE, 2002, vol. 3, pp. 1567-1576.
Ye et al., "Medium Access Control With Coordinated Adaptive Sleeping for Wireless Sensor Networks," IEEE/ ACM Transactions on Networking, vol. 12, No. 3, Jun. 2004, pp. 493-506.
Yoo et al., "Capacity and Power Allocation for Fading MIMO Channels with Channel Estimation Error," IEEE Transactions on Information Theory, vol. 52, No. 5, 2006, pp. 2203-2214.
Zhang et al., "Power-Efficient Opportunistic Amplify-and-Forward Single-Relay Aided Multi-User SC-FDMA Uplink," 2010 IEEE 71st Vehicular Technology Conference: VTC2010-Spring May 16-19, 2010, Taipei, Taiwan, pp. 24.
Zhou et al., "Optimal Transmitter Eigen-Beamforming and Space-Time Block Coding Based on Channel Mean Feedback," IEEE Transactions on Signal Processing, vol. 50, No. 10, pp. 2599-2613, Oct. 2002.
Zivkovic et al., "Preamble-based SNR Estimation in Frequency Selective Channels for Wireless OFDM Systems," IEEE 69th Vehicular Technology Conference, 2009. VTC Spring 2009, pp. 1-5, May 2009.
Zwick et al., "A Stochastic Multipath Channel Model Including Path Directions for Indoor Environments," IEEE Journal on Selected Areas in Communications vol. 20, No. 6, pp. 1178-1192, 2002.
Anreddy, V,R., et al., Capacity of measured ricean and rayleigh indoor MIMO channels at 2.4 GHz with polarization and spatial diversity, IEEE Wireless Communications and Networking Conference, vol. 2, Apr. 2006, pp. 946-951.
Arm et al., "Low-power 32-bit dual-MAC 120/LWIMHz 1.0 v icyftex DSPIMCU core," in 2008. ESSCIRC 2008. 34th European Solid-State Circuits Conference, pp. 190-193, IEEE, 2008.
Bae et al., "Energy and Bandwidth Efficiency in Wireless Networks", 2006 International Conference on Communications, Circuits and Systems Proceedings, IEEE, 2006, vol. 2, pp. 1297-1302.
Bahl et al., "Optimal decoding of linear codes for minimizing symbol error rate," 284 IEEE Transactions on Information Theory, Mar. 1974.
Behzad et al., "A fully integrated MIMO multiband direct conversion CMOS transceiver for WLAN applications (802.11n)," IEEE Journal of Solid-State Circuits vol. 42, pp. 2795-2808, Dec 2007.
Bello, P. "Aeronautical channel characterization," IEEE Transactions on Communications. vol. 21, No. 5. pp. 548-563, 1973.
Bernardi, M., et al., "Specific absorption rate and temperature increases in the head of a cellular-phone user," IEEE Transactions on Microwave Theory and Techniques, vol. 48, No. 7, pp. 1118-1126, 2000.
Berry, R.A., et al., "Communication over fading channels with delay constraints," IEEE Transactions on Information Theory, vol. 48, No. 5, pp. 1135-1149, 2002.
Boicskei et al., "Impact of the propagation environment on the performance of space-frequency coded MIMO-OFDM." Selected Areas in Communications, IEEE Journal on, vol. 21, No. 3, pp. 427-439, 2003.
Bourdoux, A., et al., "Non-reciprocal transceivers in OFDM/SDMA systems: Impact and mitigation," in Proceedings of Radio and Wireless Conference, 2003. RAWCON'03., pp. 183-186, IEEE, 2003.
Bouzekri et al., "An upper bound on turbo codes performance over quasi-static fading channels," IEEE Communications Letters, vol. 7, No. 7, pp. 302-304, 2003.
Bruninghaus et al., "Multi-carrier spread spectrum and its relationship to single-carrier transmission," in Vehicular Technology Conference, 1998. VTC 98. 48th IEEE, vol. 3, pp. 2329-2332, IEEE, 1998.
Caire et al., "On the capacity of some channels with channel state information," IEEE Transactions on Information Theory. vol. 45, pp. 2007-2019, Sep. 1999.
Calin, D., et al., "femto deployment architectures and macrocell offloading benefits in joint macro-femto deployments," IEEE Communications Magazine, vol. 48, No. 1, pp. 26-32, 2010.
Carek, et al., "Packet-based protocol efficiency for wireless communications," Journal of Aerospace Computing, Information, and Communication, vol, 2, No. 5, pp. 238-251, 2005.
Chen et al., "Network Energy Saving Technologies for Green Wireless Access Networks," IEEE Wireless Communications, vol. 18, No. 5, pp. 30-38, 2011.
Chen et al., "Transmit Energy-Efficiency for Long-Range Wireless Communications from Battery-Powered Unmanned Systems," IEEE Transactions on Aerospace and Electronic Systems, Oct 2015.
Chen, J.. et al., "Energy efficiency of space and polarization MIMO communications with packet erasures over wireless fading channels," IEEE Transactions on Wireless Communications, vol. 13, pp. 6557-6569, Dec. 2014.
Chizhik et al,, "Spatial and polarization characterization of MIMO channels in rural environment," in Vehicular Technology Conference, 2005. VTC 2005—Spring. 2005 IEEE, vol. 1. pp. 161-164, IEEE. 2005.
Cho et al., "On the general BER expression of one-and two-dimensional amplitude modulations," IEEE Transactions on Communications, vol. 50, No. 7, pp. 1074-1080, 2002.
Chuah et al., "Capacity of multi-antenna array systems in indoor wireless environment," in IEEE Global Telecommunications Conference. 1998. GLOBECOM 1998. The Bridge to Global integration, vol. 4, pp. 1894-1899, IEEE, 1998.
Claussen, H., et al., "Effects of joint macrocell and residential picocell deployment on the network energy efficiency," in International Symposium on IEEE 19th Personal, Indoor and Mobile Radio Communications, 2008 PIMRC 2008, pp. 1-6, IEEE, 2008.
Coldrey, "Modeling and capacity of polarized MIMO channels," in Vehicular Technology Conference, 2008. VTC Spring 2008. IEEE, pp. 440-444, IEEE, 2008.
Cui et al., "Energy-constrained modulation optimization," IEEE Transactions on Wireless Communications vol. 4, No. 5, pp. 2349-2360, 2005.
Cui et al., "Energy-efficiency of MIMO and cooperative MIMO techniques in sensor networks," IEEE journal on Selected Areas in Communications, vol. 22, No. 6, pp. 1089-1098, 2004.
Cui et al., "Modulation optimization under energy constraints," in ICC '03. IEEE International Conference on Communications, 2003, vol. 4, pp. 2805-2811, IEEE, 2003.
Degen et al., "Performance evaluation of MIMO systems using dual-polarized antennas," in 10th International Conference on Telecommunications, 2003. ICT 2003, vol. 2, pp, 1520-1525, IEEE, 2003.
Deng et al., "Performance of MIMO systems with combined polarization multiplexing and transmit diversity," in 2005 IEEE 61st Vehicular Technology Conference, 2005. VTC 2005-Spring., vol. 2, pp. 869-873, IEEE, 2005.
Elnoubi, "A simplified stochastic model for the aeronautical mobile radio channel," in IEEE 42nd Vehicular Technology Conference, 1992, pp. 960-963, IEEE, 1992.
Etkin et al., Dynamics of flight: stability and control, vol. 3. Wiley New York, 1996.
Federal Communications Commission, "Specific absorption rate (sar) for cell phones: What it means for you," Mar. 2014.
Filiol et al., "A 22 mw Bluetooth RF transceiver with direct RF modulation and on-chip IF filtering," in 2001 IEEE International Solid-State Circuits Conference, 2001. Digest of Technical Papers. ISSCC., pp. 202-203, IEEE, 2001.
Frenger, P., et al., "Convoiutionai codes with optimum distance spectrum." IEEE Communications Letters, vol. 3, No. 11, pp. 317-319, 1999.

(56) References Cited

OTHER PUBLICATIONS

Frew et al., "Airborne communication networks for small unmanned aircraft systems," Proceedings of the IEEE, vol. 96, No. 12, 2008.
Fund, T,G,D., "Green power for mobile: Top ten findings," 2009. [Oniine; accessed Jul. 31, 2014].
Gesbert et al. "Outdoor MIMO Wireless Channels: Models and Performance Prediction," IEEE Transactions on Communications, vol. 50, No. 12, pp. 1926-1934, 2002.
Goldsmith et al., "Capacity of fading channels with channel side information," IEEE Transactions on Information Theory, vol. 43, No. 6, pp. 1986-1992, 1997.
Gomadam et al., "A Distributed Numerical Approach to Interference Alignment and Applications to Wireless Interference Networks," IEEE Transactions on Information Theory, vol. 57, No. 6, pp. 3309-3322, 2011.
Goyal, M., et al., "Power constrained and delay optimal policies for scheduling transmission over a fading channel," in INFOCOM 2003. Twenty-Second Annual Joing Conference of the IEEE Computer and Communications, IEEE Societies, vol. 1, pp. 311-320, IEEE, 2003.
Gresset et al., "Interference-avoidance techniques: Improving ubiquitous user experience," IEEE Vehicular Technology Magazine vol. 7, No. 4, pp. 3745, 2012.
Gulati al "Statistical modeling of co-channel interference," in IEEE Global Telecommunications Conference, 2009. GLOBECOM 2009, pp. 1-6, IEEE, 2009.
Gupta, I.J., et al., "Effect of mutual coupling on the performance of adaptive arrays," IEEE Transactions on Antennas and Propagation, vol. 31, No. 5, pp. 785-791, 1983.
Haas. "Aeronautical channel modeling," IEEE Transactions on Vehicular Technology, vol. 51, No, 2, pp. 254-264, 2002.
Haccoun, D., et al., "High-rate punctured convolutional codes for viterbi and sequential decoding," IEEE Transactions on Communications,. vol. 37, No, 11, pp. 1113-1125, 1989.
Halbauer et al., "Interference avoidance with dynamic vertical beamsteering in reai deployments," in 2012 IEEE Wireless Communications and Networking Conference Workshops (WCNCW) pp. 294-299, IEEE, 2012.
Han et al., "Green radio: radio techniques to enable energy-efficient wire-less networks," IEEE Communications Magazine, vol. 49, No. 6, pp. 46-54. 2011.
Hartenstein et al., "A Tutorial Survey on Vehicular Ad Hoc Networks," IEEE Communications Magazine vol, 46, No. 6, pp. 164-171, 2008.
Hasan et al,, "Green Cellular Networks: A Survey, Some Research issues and Challenges," Communications Surveys & Tutorials, IEEE, vol. 13, No. 4, pp. 524-540, 2011.
Hoeher et al., "Aeronautical channel modeling at VHF-band," in IEEE VTS 50th Vehicular Technology Conference, 1999. VTC 1999—Fall., vol. 4, pp. 1961-1966, IEEE, 1999.
Hoeher, P., "A statistical discrete-time model for the WSSUS multipath channel," IEEE Transactions on Vehicular Technology, vol. 41, No. 4, pp. 461-468, 1992.
Hsieh et al.et al., "Channel Estimation for OFDM Systems Based on Comb-Type Pilot Arrangement in Frequency Selective Fading Channels", IEEE Transactions on Consumer Electronics. vol. 44, No. 1, pp. 217-225, 1998.
Huh et al., "Network MIMO with Linear Zero-Forcing Beamforming: Large System Analysis, Impact of Channel Estimation, and Reduced-Complexity Scheduling", IEEE Transactions on Information Theory, vol. 58, No. 5, pp. 2911-2934, 2012.
Hutter et al., "Channel estimation for mobile OFDM systems," in Vehicular Technology Conference, 1999. VTC 1999—Fall. IEEE VTS 50th, vol. 1, pp. 305-309, IEEE, 1999.
Ispas et al., "Modeling and performance evaluation for dual-polarized Ricean MIMO channels," in Global Communications Conference (GLOBECOM), 2012 IEEE, pp. 3577-3582, Dec. 2012.
Jorswieck et al., "Optimal transmission strategies and impact of correlation in multiantenna systems with differencet types of channel state information," IEEE Transactions on Signal Processing, vol. 52, No. 12, pp, 3440-3453, 2004.
Jung et al., "Energy efficiency of load balancing in Manet routing protocols," in Software Engineering, Artificial Inteiiigence, Networking and Parallel/Distributed Computing, 2005 and First ACIS International Workshop on Self-Assembling Wireless Networks. SNPD/SAWN 2005. Sixth International Conference on, pp. 476-483, IEEE, 2005.
Kalliola, K., et al., "Real-time 3-D spatial-temporal dual-polarized measurement of wideband radio channel at mobile station," IEEE Transactions on instrumentation and Measurement, vol. 49, No. 2, pp. 439-448, 2000.
Kaitenberger et al., "Relative channel reciprocity calibration in MIMO/TDD systems," in Future Network and Mobile Summit, 2010, pp. 1-10, IEEE, 2010.
Kang, Y., et al., "Efficient DFT-based channel estimation for OFDM systems on multipath channels," Communications, JET, vol. 1, No. 2. pp. 197-202, 2007.
Kermoal, L., et al., "A stochastic MIMO radio channel model with experimental validation," IEEE Journal on Selected Areas in Communications, vol. 20, No. 6, pp. 1211-1226, 2002.
Kosta et al., "On interference avoidance through inter-cell interference coordination (ICC) based on OFDMA mobile systems," IEEE Communications Surveys 8 Tutorials vol. 15, No. 3, pp. 973-995, 2013.
Kotterman et al., "Cross-correlation values for dual-polarised indoor MIMO links and realistic antenna elements," in Wireless Communication Systems, 2006. ISWOS'06. 3rd international Symposium on, pp. 505-509, IEEE, 2006.
Kouyoumjian et al., "A uniform geometrical theory of diffraction for an edge in a perfectly conducting surface," Proceedings of the IEEE, vol. 62, No. II, pp. 1448-1461, 1974.
Kozono et al., "Base station polarization diversity reception for mobile radio," Vehicular Technology, IEEE Transactions on. vol. 33, No. 4, pp. 301-306, 1984.
Krikidis et al., "Cooperative relaying withfeedback for lifetime maximization," in 2010 IEEE International Conference on Communications Workshops (ICC), pp. 1-6, IEEE, 2010.
References Kwon et al., "Channel capacity in bits per joule," IEEE Journal of Oceanic Engineering, vol. II, No. II , pp. 97-99. 1986.
Kyristi et al., "Effect of Antenna Polarization on the Capacity of a Multiple Element System in an Indoor Environment", IEEE Journal on Selected Areas in Communications, vol. 20, No. 6, Aug. 2002, pp. 1227-1239.
Kyristi et al., Propagation Characteristics of Horizontally and Vertically Polarized Electric Fields in an Indoor Environment: Simple Model and Results, in 2001. VTC 2001 Fall. IEEE VTS 54th Vehicular Technology Conference, vol. 3, pp. 1422-1426, IEEE, 2001.
Lahiri, K., et al., "Battery-driven system design: A new frontier in lower power design," in Proceedings of the 2002 Asia and South Pacific Design Automation Conference, p. 261. IEEE Computer Society, 2002.
Lee, "Effects on correlation between two mobile radio base-station antennas," IEEE Transactions on Communications vol. 21, No. 11, pp. 1214-1224, 1973.
Lempiainen, J.J., et al., "The performance of polarization diversity schemes at a base station in small/micro cells at 1800 MHz," IEEE Transactions on Vehicular Technology, vol. 47, No. 3, pp. 1087-1092, 1998.
Li et al., "Energy-efficient wireless communications: tutorial, survey, and open issues." IEEE Wireless Communications, vol, 18, No. 6, pp. 28-35, 2011.
Liang et al., "Resource allocation with interference avoidance in OFDMA femtocell networks," IEEE Transactions on Vehicular Technology vol. 61, No. 5, pp. 2243-2255, 2012.
Liberti et al., "A geometrically based model for line-of-sight multipath radio channels," in IEEE 46th 'Mobile Technology for the Human Race' Vehicular Technology Conference, 1996., vol. 2, pp. 844-848, IEEE, 1996.

(56) References Cited

OTHER PUBLICATIONS

Lotse et al. "Base station polarization diversity reception in macro cellular systems at 1800 mhz," in IEEE 46th Vehicular Technology Conference, 1996. Mobile Technology for the Human Race's, vol. 3, pp. 1643-1646, IEEE. 1996.
Lozano et al., "Multiple-antenna capacity in the low-power regime," IEEE Transactions on Information Theory vol. 49, No. 10, pp. 2527-2544, 2003.
Luebbers, "Finite conductivity uniform GTD versus knife edge diffraction in prediction of propagation path loss," IEEE Transactions on Antennas and Propagation vol. 32, No. 1, pp. 70-76, 1984.
Magoon et al., "A single-chip quad-band (850/900/1800/1900 MHz) direct conversion GSM/GPRS RF transceiver with integrated VCOs and fractional-N synthesizer," IEEE Journal of Solid-State Circuits, vol. 37, No. 12, pp. 1710-1720. 2002.
Marsan, M.A., et al., "Optimal energy savings in cellular access networks," in IEEE International Conference on Communications Workshops, 2009. ICC Workshops 2009, pp, 1-5, IEEE, 2009.
Meyer et al., "A 2.5-GHz BiCMOS transceiver for wireless Lan's." IEEE Journal of Solid-State Circuits, vol. 32, No. 12, pp. 2097-2104, 1997.
Miao et al., "Energy efficient design in wireless OFDMA." in 2008. ICe08. IEEE International Conference on Communications, pp. 3307-3312, IEEE, 2008.
Miao et al., "Energy-efficient link adaptation in frequency-selective channels," IEEE Transactions on Communications, vol. 58, No. 2, pp. 545-554. 2010.
Miao, G., et al., "Cross-layer optimization for energy-efficient wireless communications: a survey," Wireless Communications and Mobile Computing, vol. 9, No. 4, pp. 529-542, 2009.
Middleton, "Non-Gaussian noise models in signal processing for telecommunications: new methods an results for class A and class B noise models," IEEE Transactions on Information Theory vol. 45, No. 4, pp. 1129-1149, 1999.
Middleton, "Statistical-physical models of electromagnetic interference," IEEE Transactions on Electromagnetic Compatibility, No. 3, pp. 106-127, 1977.
Morelli et al., "An improved frequency offset estimator for OFDM applications," in Communication Theory Mini-Conference, 1999, pp. 106-109, IEEE, 1999.
Morelli et al., "Synchronization techniques for orthogonal frequency division multiple access (OFDMA): A tutorial review," Proceedings-IEEE, vol. 95, No. 7, p. 1394, 2007.
Morelli et al.. "A comparison of pilot-aided channel estimation methods for OFDM systems." IEEE Transactions on Signal Processing, vol. 49, No. 12, pp. 3065-3073, 2001.
Nabar et al., Performance of multiantenna signaling techniques in the presence of polarization diversity, IEEE Transactions on Signal Processing, vol. 50, No. 10, 2002, pp. 2553-2562.
Narklit et al., "Diffuse channel model and experimental results for array antennas in mobile environments," IEEE Transactions on Antennas and Propagation vol. 46, No. 6, pp. 834-840, 1998.
Oestges et al., "Propagation modeling of MIMO multipolarized fixed wireless channels," IEEE Transactions on Vehicular Technology, vol. 53, No. 3, pp. 644-654, 2004.
Oestges, C., et al., "Dual-polarized wireless communications: from propagation models to system performance evaluation," IEEE Transactions on Wireless Communications, vol. 7, No. 10, pp. 4019-4031, 2008.
Oestges, O., "A stochastic geometrical vector model of macro-and megacellular communication channels," IEEE Transactions on Vehicular Technology, vol. 51, No. 6, pp. 1352-1360, 2002.
Orsatti et al., "A 20-ma-receive, 55-ma-transmit, singiechip GSM transceiver in 0.25p CMOS," IEEE journal of Solid-State Circuits vol. 34, pp. 1869-1880, Dec. 1999.
Patti, "Three-dimensional integrated circuits and the future of system-on-chip designs," Proceedings of the IEEE, vol. 94, No. 6, pp. 1214-1224, 2006.
Petrus et al.,"Geometrical-based statistical macrocell channel model for mobile environments," Communications, IEEE Transactions on, vol. 50, No. 3, pp. 495-502, 2002.
Pclyanskiy et al., "Minimum energy to send k bits with and without feedback," in 2010 IEEE International Symposium on Information Theory Proceedings (ISIT), pp. 221-225, IEEE, 2010.
Polyanskiy, Y., et al, "Channel coding rate in the finite blocklength regime," IEEE Transactions on Information Theory, vol. 56, No. 5, pp. 2307-2359, 2010.
Poor et al., "Probability of error in MMSE multiuser detection," IEEE Transactions on information Theory, vol. 43, No, 3, pp, 858-871, 1997.
Popescu et al., "Interference avoidance for capacity optimization in mutually interfering wireless systems," in IEEE Vehicular Technology Conference, vol. 62, p. 593, IEEE; 1999, 2005.
Raleigh et al.. "Spatic-temporal coding for wireless communication," IEEE Transactions on Communications, vol. 46, No. 3, pp. 357-366. 1998.
Razavi, B., "Challenges in portable RF transceiver design," IEEE Circuits and Devices Magazine, vol. 12, No. 5, pp. 12-25, 1996.
Richter et al., "Energy efficiency aspects of base station deployment strategies for cellular networks," in IEEE 70th Vehicular Technology Conference Fall (VTC 2009-Fall), 2009, pp. 1-5, IEEE, 2009.
Rodoplu, V., et al., "Bits-per-Joule capacity of energy-limited wireless networks," IEEE Transactions on Wireless Communications, vol. 6, No. 3, pp. 857-865, 2007.
Rodricues et al., "Performance analysis of turbo codes in quasi-static fading channels," IET communications, vol. 2, No. 3, pp. 449-461, 2008.
Sampath et al., "Generalized linear precoder and decoder design for MIMO channels using the weighted MMSE criterion," Communications, IEEE Transactions on Communications, vol. 49, No. 12, pp. 2198-2206, Dec. 2001.
Saraydar et al., "Pricing and power control in a multicell wireless data network." IEEE Journal on Selected Areas in Communications vol. 19, No. 10, pp. 1883-1892, 2001.
Sayeed, "Deconstructing multiantenna fading channels," IEEE Transactions on Signal Processing vol. 50, No. 10, pp. 2563-2579, 2002.
Scagiione et al., "Filterbank transceivers optimizing information rate in block transmissions over dispersive channels," IEEE Transactions on information Theory, vol. 45, No. 3, pp. 1019-1032, 1999.
Scagilone et al., "Redundant .filterbank precoders and equalizers Part I: unification and optimal designs." IEEE Transactions on Signal Processing, vol, 47, No. 7, pp. 1988-2006, 1999.
Schulman et al., "Bartendr: a practical approach to energy-aware cellular data scheduling," in Proceedings of the sixteenth annual international conference on Mobile computing and networking, pp. 85-96, ACM, 2010.
Schumacher, L., et al., "Closed-form expressions for the correlation coefficient of directive antennas impinged by a multimodal truncated laplacian PAS," IEEE Transactions on Wireless Communications, vol. 4, No. 4, pp. 1351-1359, 2005.
Shall, M., et al., Polarized MIMO Channels in 3-0: Models, Measurements and Mutual Information, IEEE Journal on Selected Areas in Communications, vol. 24, No. 3. Mar. 2006, p. 514-527.
Shannon, C.E., "A mathematical theory of communication," ACM SIGMOBILE Mobile Computing and Communications Review, vol. 5, No. I, pp. 3-55, 2001.
Shi et al., "TDMA scheduling with optimized energy efficiency and minimum delay in clustered wireless sensor networks," IEEE Transactions on Mobile Computing, vol. 9, No. 7, pp. 927-940, 2010.
Shiu, D.-S., et al., "Fading correlation arid its effect on the capacity of multielernent antenna systems," IEEE Transactions on Communications, vol. 48, No. 3, pp. 502-513, 2000.
Slew et al., "Packet data transmission over mobile radio channels." IEEE Transactions on Vehicular Technology, vol. 38, No. 2, pp. 95-101, 1989.
Skoglund et al., "On the capacity of a multiple-antenna communication link with channel side information," IEEE Journal on Selected Areas in Communications. vol. 21, pp. 395-405. Apr. 2003.
Smith, G., "A direct derivation of a single-antenna reciprocity relation for the time domain," IEEE Transactions on Antennas and Propagation, vol. 52, No. 6, pp. 1568-1577, 2004.

(56) References Cited

OTHER PUBLICATIONS

Soma, P., et al., "Analysis and modeling of multiple-input multipleoutput (MIMO) radio based on outdoor measurements conducted at 2.5 ghz for fixed BWA applications," in IEEE International Conference on Communications 2002. ICC 2002, vol. 1, pp. 272-276, IEEE, 2002.
Soysal et aie "Optimality of beamforming in fading MIMO multiple access channels," IEEE Transactions on Communications vol. 57, No. 4, pp. 1171-1183, 2009.
Spencer et ale "Zero-forcing methods for downlink spatial multiplexing in multiuser Mimo channels," IEEE Transactions on Signal Processing vol. 52, No. 2, pp. 461-471, 2004.
Stefanov et al., "Turbo-coded modulation for systems with transmit and receive antenna diversity over block fading channels: system model, decoding approaches, and practical considerations," IEEE Journal on Selected Areas in Communications vol. 19, No. 5, pp. 958-968, 2001.
Stuber et al., "Broadband MIMO-OFDM wireless communications," Proceedings of the IEEE, vol. 92, No. 2, pp. 271-294, 2004.
Sullivan, "Revolution or evolution? the rise of the UAVs," in Proceedings. 2005 international Symposium on Technology and Society, 2005. Weapons and Wires: Prevention and Safety in a Time of Fear. ISTAS 2005, pp, 94-101, IEEE, 2005.
Sun et al., "Multilevel peukert equations based residual capacity estimation method for lead-acid battery," in IEEE International Conference on Sustainable Energy Technologies, 2008, ICSET 2008, pp. 101-105, IEEE, 2008.
Tarokh, V., "Space-time codes for high data rate wireless communication: Performance criterion and code construction," Information Theory, IEEE Transactions on, vol. 44, No. 2, pp. 744-765, 1998.
Tarokh, V., et al., "Space-time block codes from orthogonal designs," IEEE Transactions on Information Theory, vol. 45, No. 5, pp. 1456-1467, 1999.
Telatar, "Capacity of multi-antenna gaussian channels," European transactions on telecommunications, vol. 10, No. 6, pp. 585-595, 1999.
Tobol et al., "Three-dimensional integrated circuits," IBM Journal of Research and Development, vol. 50, No. 4.5, pp. 491-506, 2006.
Traub, "Range and endurance estimates for battery-powered aircraft," Journal of Aircraft, vol. 48, No. 2, pp. 703-707, 2011.
Tse et al., "Linear multiuser receivers in random environments," IEEE Transactions on Information Theory, vol. 46, No. 1, pp. 171-188, 2000.
Van de Beek, J.-J., et al., "On channel estimation in OFDM systems," in 1995 IEEE 45th Vehicular Technology Conference. vol. 2, pp. 815-819, IEEE, 1995. [81] M.-H. Hsieh and C.-H, Wei, Channel estimation for OFDM systems based on comb-type.

* cited by examiner

Figures 7a-d

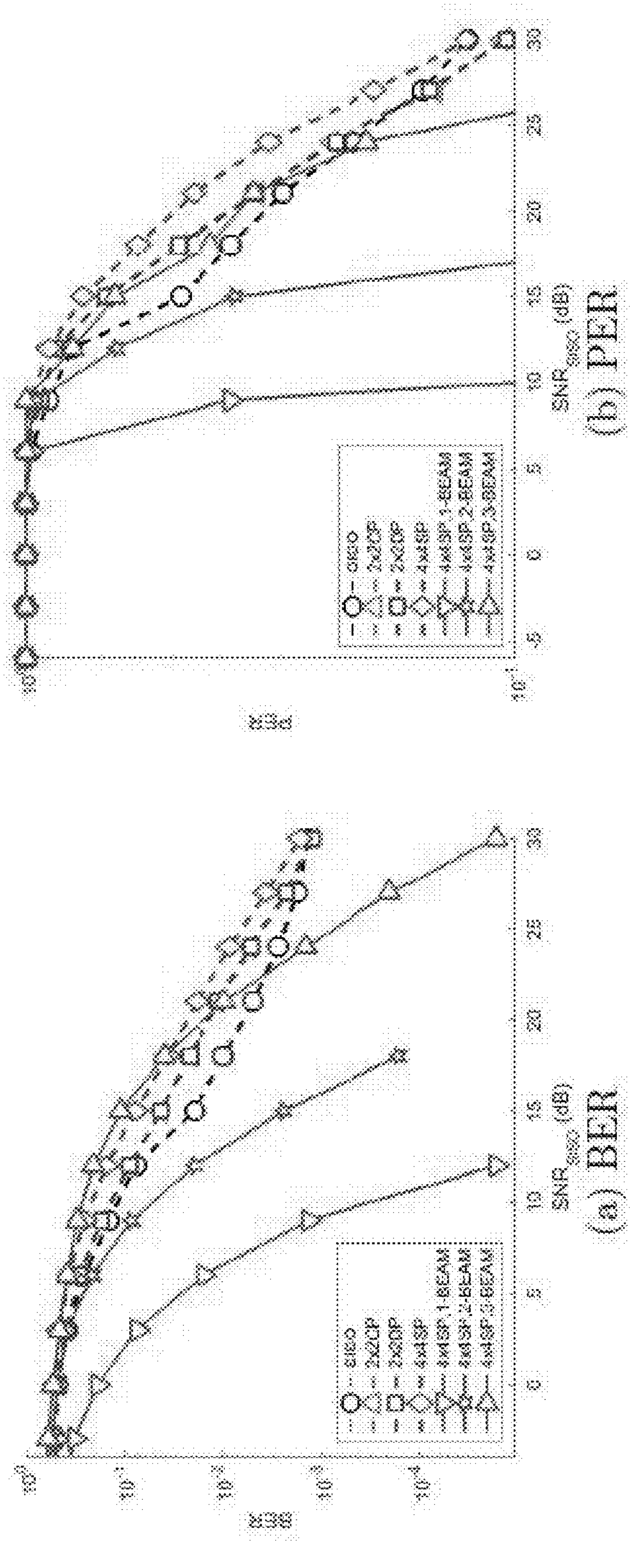
Figures 16a-b

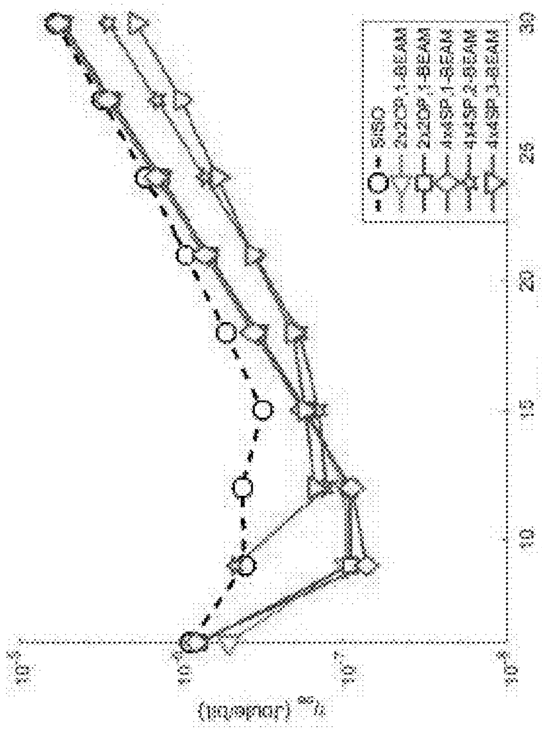
(b) SISO vs CP-, DP- and SP-MIMO 1/2/3-beam
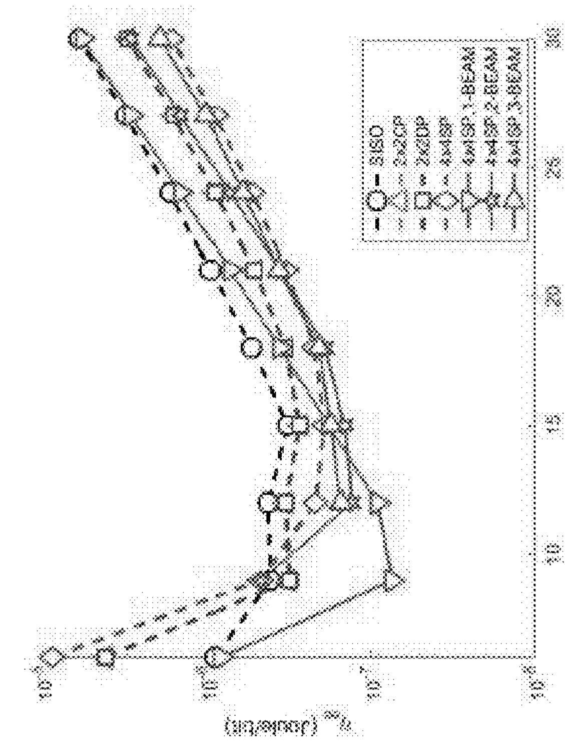
(a) Non-precoded vs SP-MIMO 1/2/3-beam
Figures 17a-b

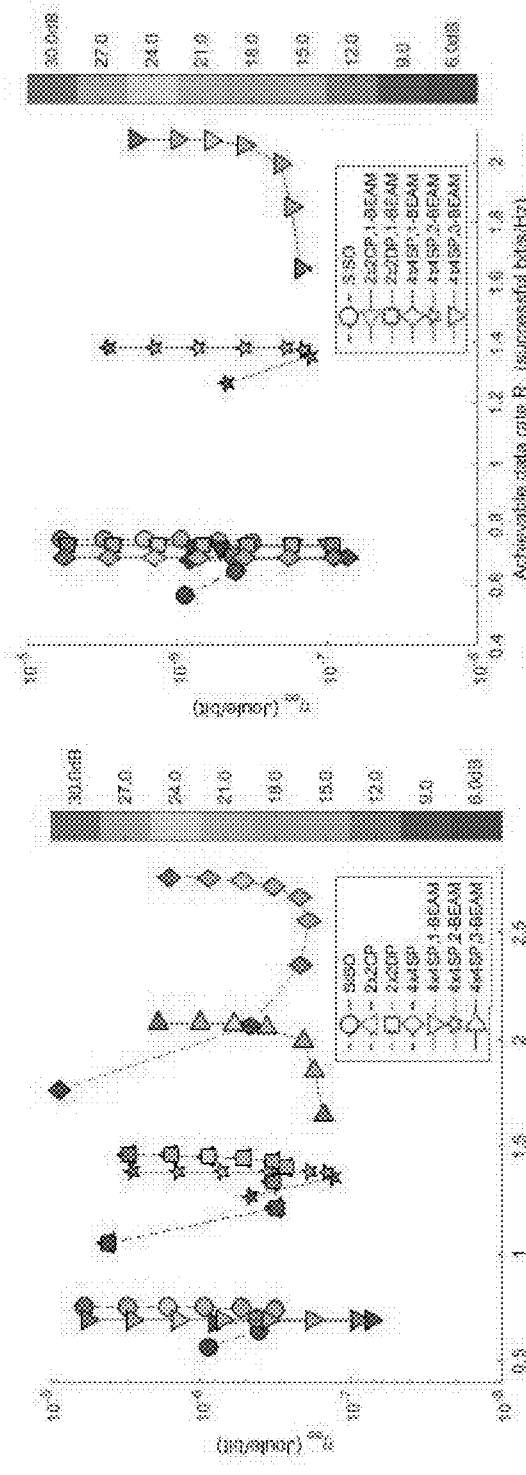
(a) Non-precoded vs SP-MIMO 1/2/3-beam
(b) SISO vs CP-, DP- and SP-MIMO 1/2/3-beam
Figures 18a-b

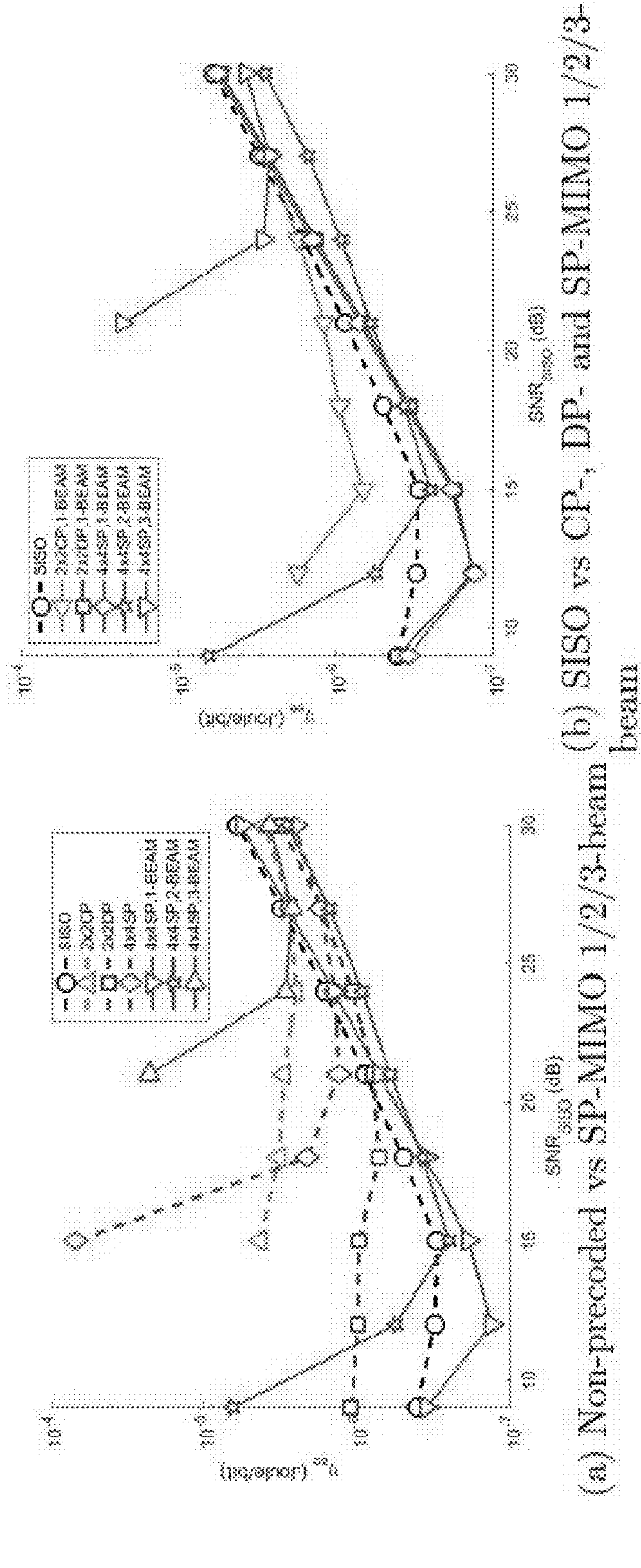
(a) Non-precoded vs SP-MIMO 1/2/3-beam
(b) SISO vs CP-, DP- and SP-MIMO 1/2/3-beam
Figures 19a-b

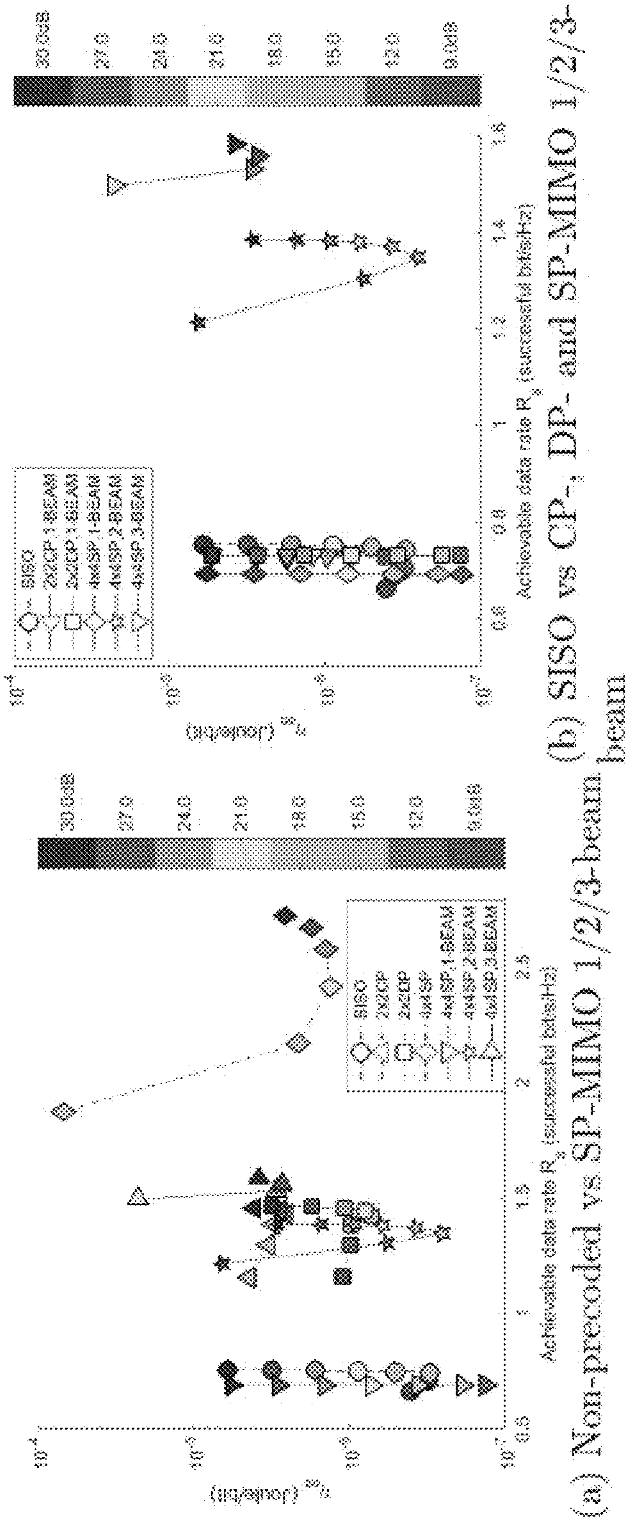
(a) Non-precoded vs SP-MIMO 1/2/3-beam
(b) SISO vs CP-, DP- and SP-MIMO 1/2/3-beam
Figures 20a-b

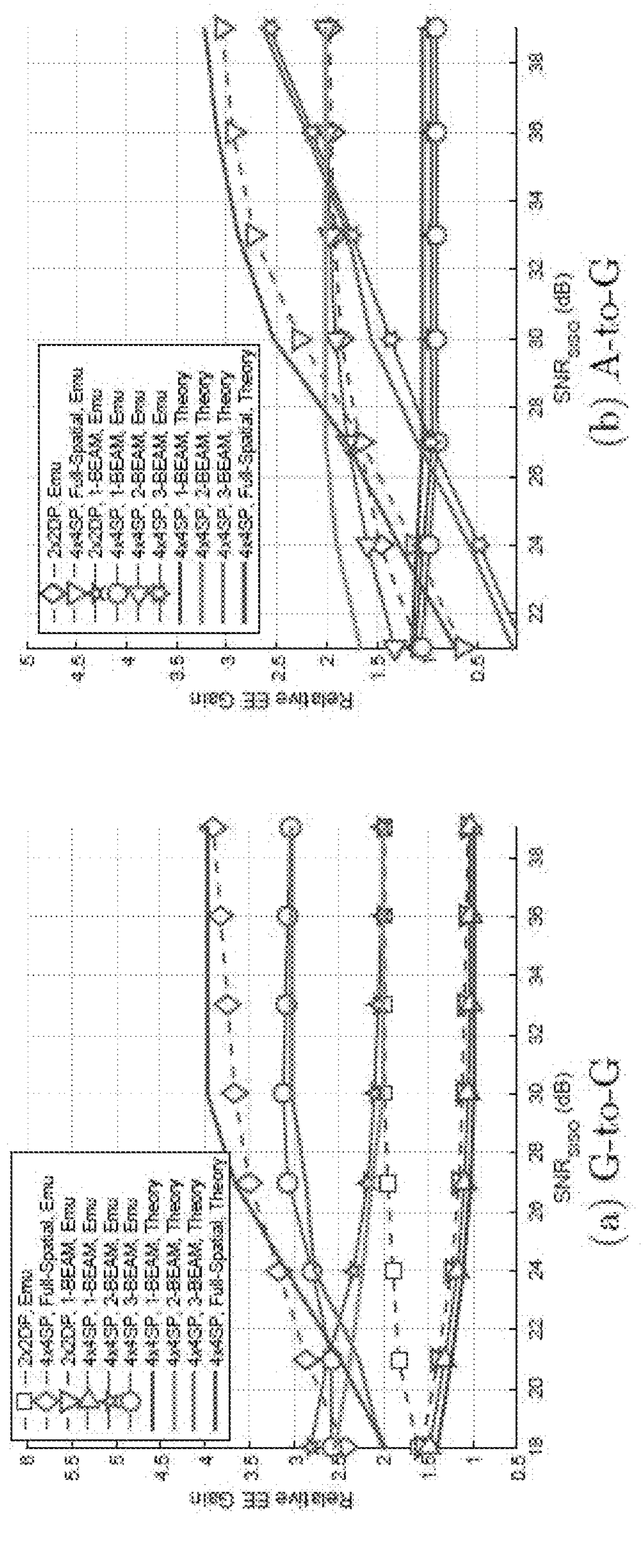
Figures 21a-b

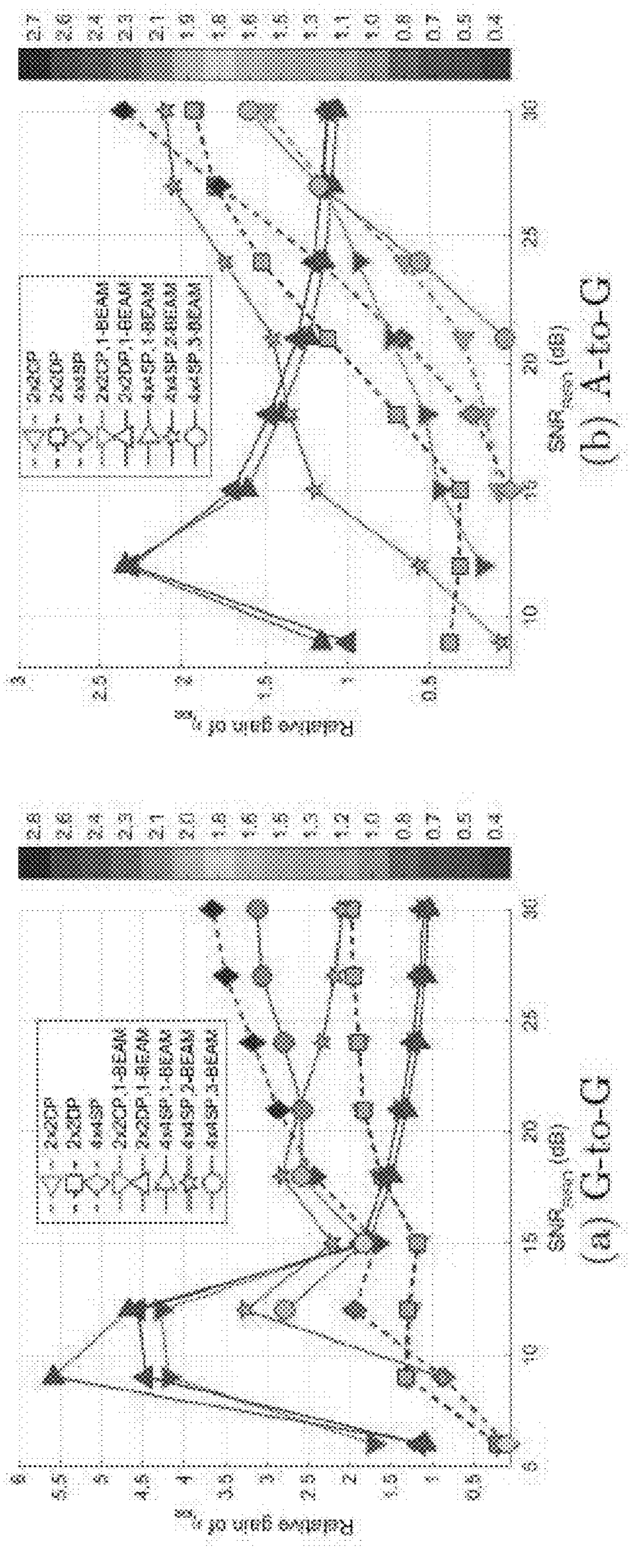
Figures 22a-b

Figures 26a-b

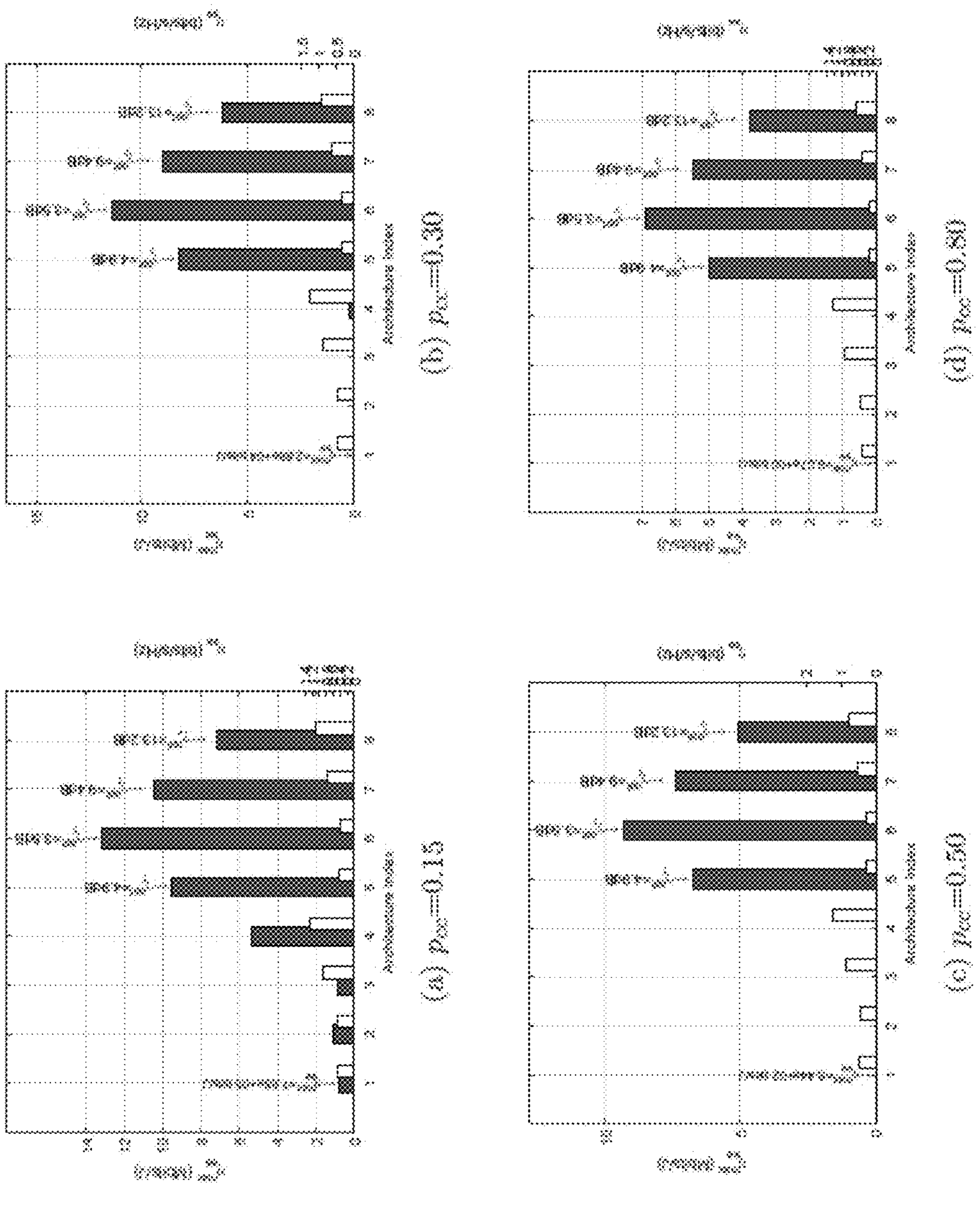
Figures 32a-d

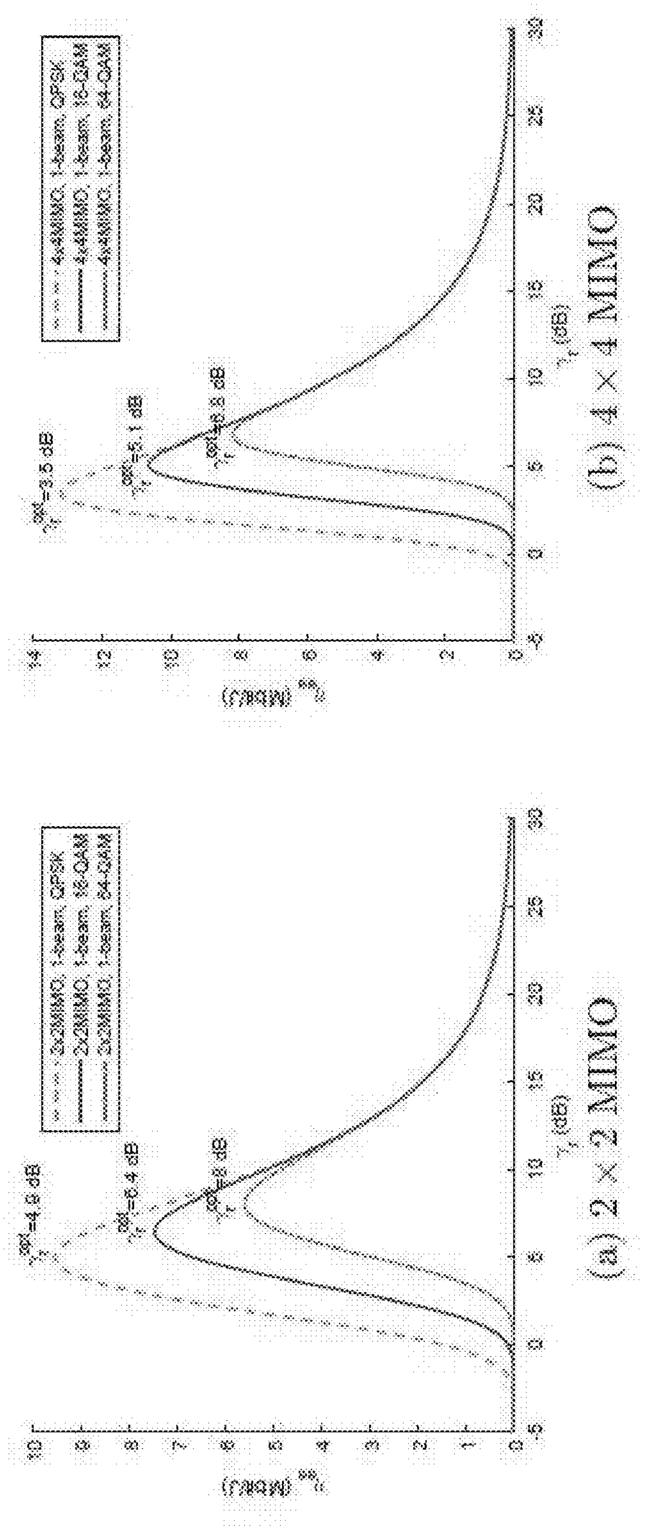
Figures 33a-b

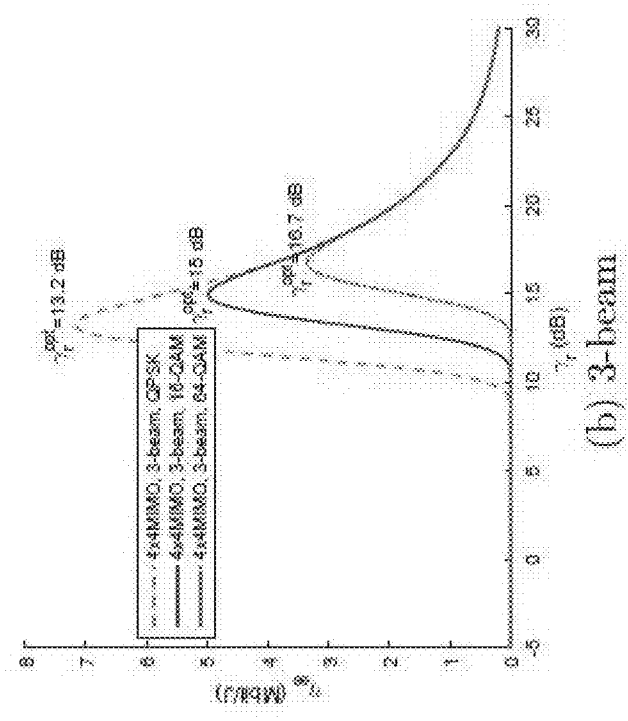
(b) 3-beam
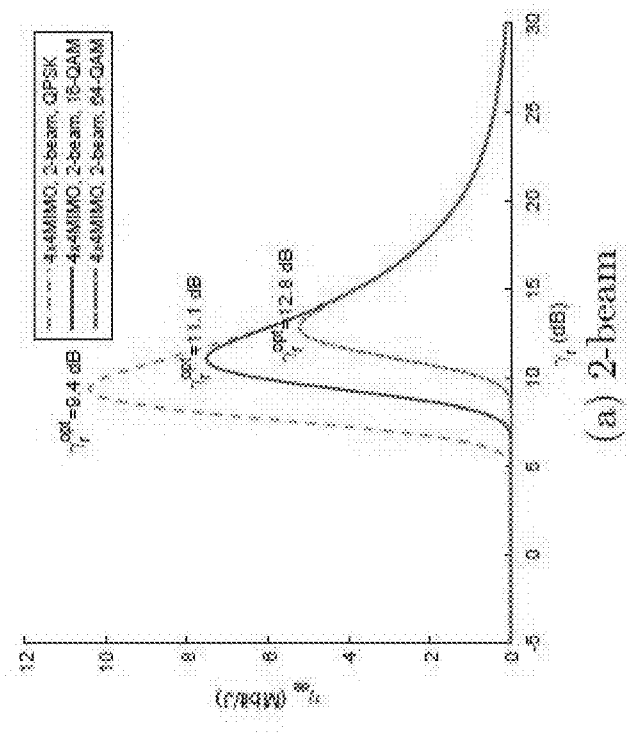
(a) 2-beam
Figures 34a-b

ENERGY EFFICIENT COMMUNICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. Namely, this application claims priority to U.S. Provisional Patent Application Nos. 62/080,917, filed on Nov. 17, 2014, and 62/256,592, filed Nov. 17, 2015, the entire contents of which are hereby incorporated by reference herein.

STATEMENT REGARDING FEDERALLY SPONSORED R&D

This invention was made with government support under Grant No. N00014-11-1-0607 awarded by the United States Office of Naval Research. The government has certain rights in this invention.

BACKGROUND OF THE INVENTION

Field

This invention relates to architectures and methods for energy efficient communication.

Description of the Related Art

Energy-efficient operation of battery-powered radios is becoming more important to improve device operational times on a battery charge. This issue becomes all the more significant as radios of the future are used with greater frequency and for applications requiring transfer of larger quantities of data. Future radios will also likely take on a more active role in coordinated monitoring and use of the spectrum in shared spectrum environments, placing additional demands on energy management.

Meanwhile, because of increasing demands on spectrum resources, spectral efficiency (SE) is becoming a more crucial design specification of future radio systems. Hence, multiple-input multiple-output (MIMO) technology is expected to be fundamental to future radios. As spectrum sharing policies evolve to widespread practice in the future, the ability of a radio to operate with interference tolerance is expected to also become more critical.[1]

[1] This application is based on a dissertation which is provided in U.S. Provisional Patent Application No. 62/256,592, which has been incorporated by reference herein in its entirety. The dissertation includes citations to references listed in a bibliography. These references provide additional background information.

SUMMARY

In some embodiments, a transceiver for use in a point-to-point packet-based communication link with packet erasures comprises: a data source to provide bits of data for transmission to a remote device via a channel; a processor to map the bits of data to symbols in a constellation according to a modulation scheme and to provide the symbols on one or more subcarriers; and multiple antenna elements, the multiple antenna elements comprising co-located orthogonally polarized elements or spatially separated elements or both, wherein the symbols are transmitted to the remote device in packets via one or more of the multiple antenna elements, and wherein the processor is further configured to determine a metric of average transmit energy per bit successfully decoded, and not erased, at the remote device and to adjust transmission powers at the one or more antenna elements to reduce the average transmit energy per successfully decoded and unerased bit.

The processor can be configured to form one or more weighted combinations of data that are transmitted via multiple ones of the antenna elements. The one or more weighted combinations of data can comprise eigenmodes. The processor can select the one or more weighted combinations of data and determine the transmit power for the selected ones based on channel state information. The channel state information can be received from the remote device or determined by the processor from preamble or pilot signals transmitted by the remote device. The processor can select the one or more subcarriers based on interference information provided by the remote device.

average spectral efficiency $\eta_{se}$ vs. SNRs over a low correlated Rayleigh channel model.

Figure 13:
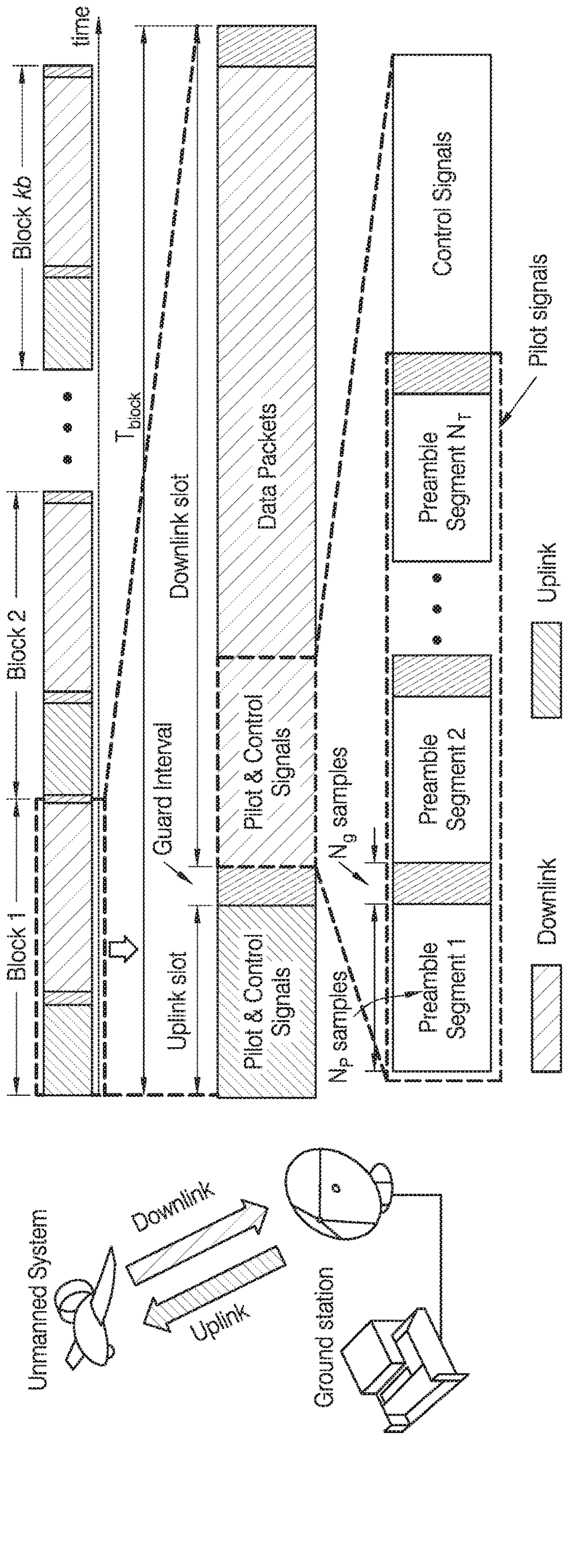

FIG. 13 is an illustration of uplink (UL) and downlink (DL) between the unmanned station (US) and the ground station (GS) (blue and orange blocks show UL and DL slots respectively).

Figure 14:
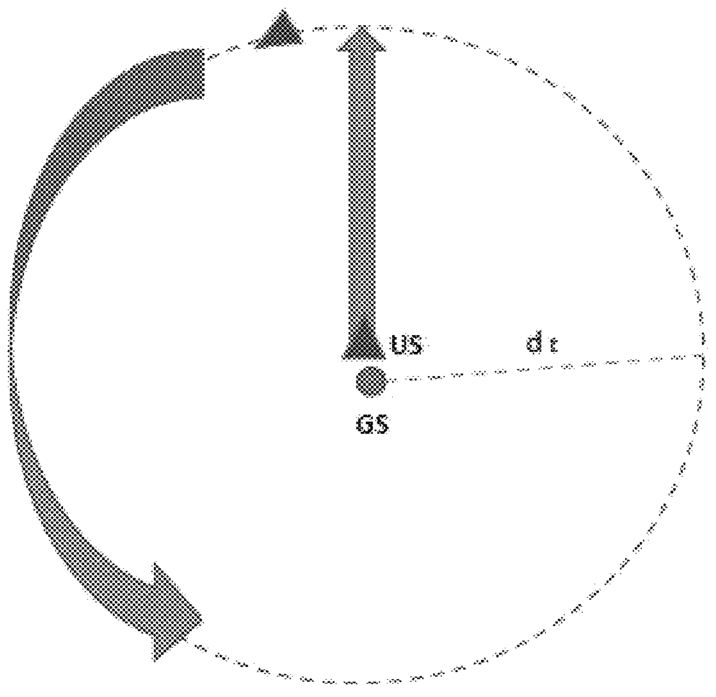

FIG. 14 is an illustration of steady flight routes for the US.

Figure 15:
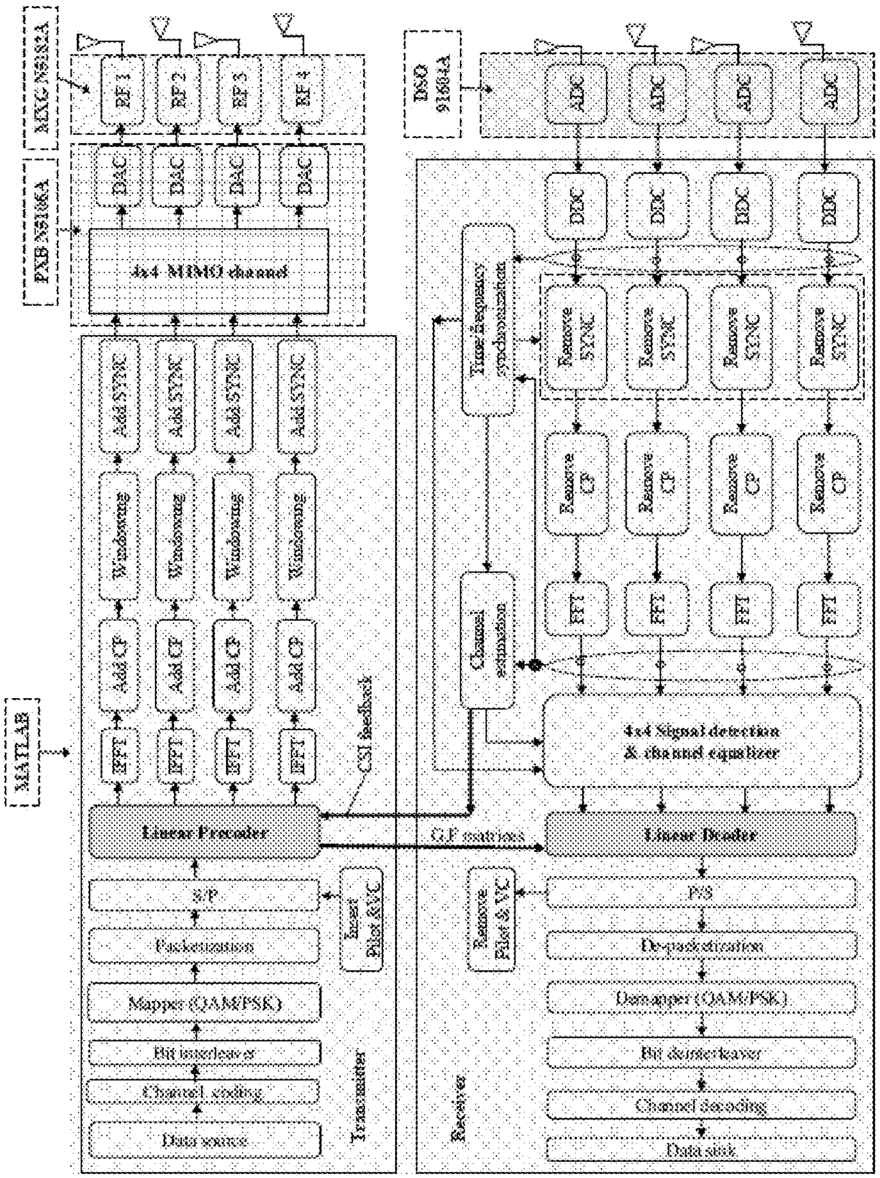

FIG. 15 shows signal processing blocks of a 4×4 adaptive SP-MIMO communications testbed platform.

FIGS. 16*a-b* shows BER and PER of non-precoded SISO, CP-, DP-, SP-MIMO and precoded SP-MIMO 1/2/3-beam schemes vs. SNRs over a G-to-G Rayleigh channel model.

FIGS. 17*a-b* shows average energy efficiency (EE) $\eta_{ee}$ of non-precoded and precoded SISO, CP-, DP- and SP-MIMO schemes vs SNRs over a G-to-G Rayleigh channel model.

FIGS. 18*a-b* shows average EE $\eta_{ee}$ of non-precoded and precoded SISO, CP-, DP- and SP-MIMO schemes vs average spectral efficiency (SE) $\eta_{se}$ vs SNRs over a G-to-G Rayleigh channel model. The color bar shows the average SNRs.

FIGS. 19*a-b* shows average EE $\eta_{ee}$ of non-precoded and precoded SISO, CP-, DP- and SP-MIMO schemes vs SNRs over a A-to-G Rician channel model.

FIGS. 20*a-b* shows average EE $\eta_{ee}$ of non-precoded and precoded SISO, CP-, DP- and SP-MIMO schemes vs average SE $\eta_{se}$ vs SNRs over a A-to-G Rician channel model. The color bar shows the average SNRs.

FIGS. 21*a-b* shows relative EE gains of theoretical ("Theory" labels) vs emulation ("Emu" labels) results for non-precoded and precoded DP- and SP-MIMO schemes with respect to the SISO link over the G-to-G Rayleigh and A-to-G Rician channel models.

FIGS. 22*a-b* shows relative gains of average EE $\eta_{ee}$ of non-precoded and precoded CP-, DP- and SP-MIMO schemes with respect to the SISO link over G-to-G Rayleigh and A-to-G Rician channel models. The color bar shows the SE.

Figure 23:
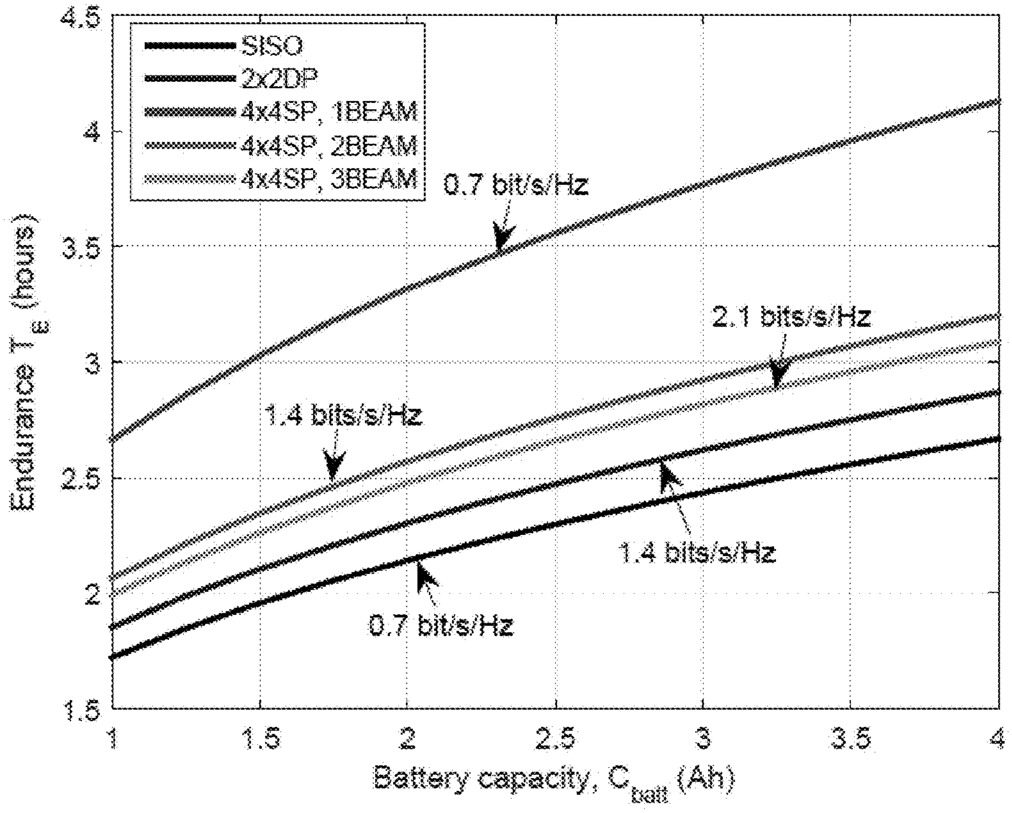

FIG. 23 shows the effect of battery capacity on estimated operating time (endurance) with various MIMO architectures, assuming optimal received SNR values.

Figure 24:
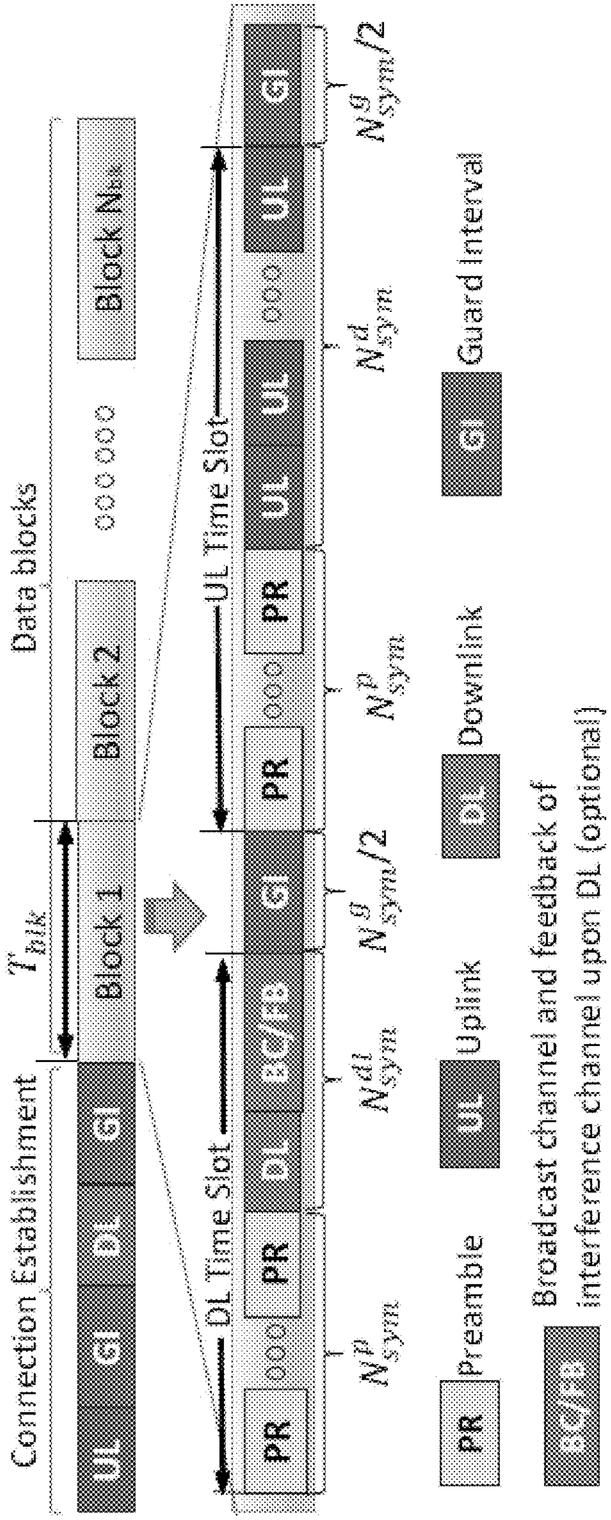

FIG. 24 is a block diagram in the time division duplexing (TDD) mode. $N_{sym}^{ul}$, $N_{sym}^{p}$, $N_{sym}^{dl}$ and $N_{sym}^{g}$ are the numbers of orthogonal frequency-division multiplexing (OFDM) symbols for the UL data, the preamble, the DL data, and guard intervals in a block respectively.

Figure 25:
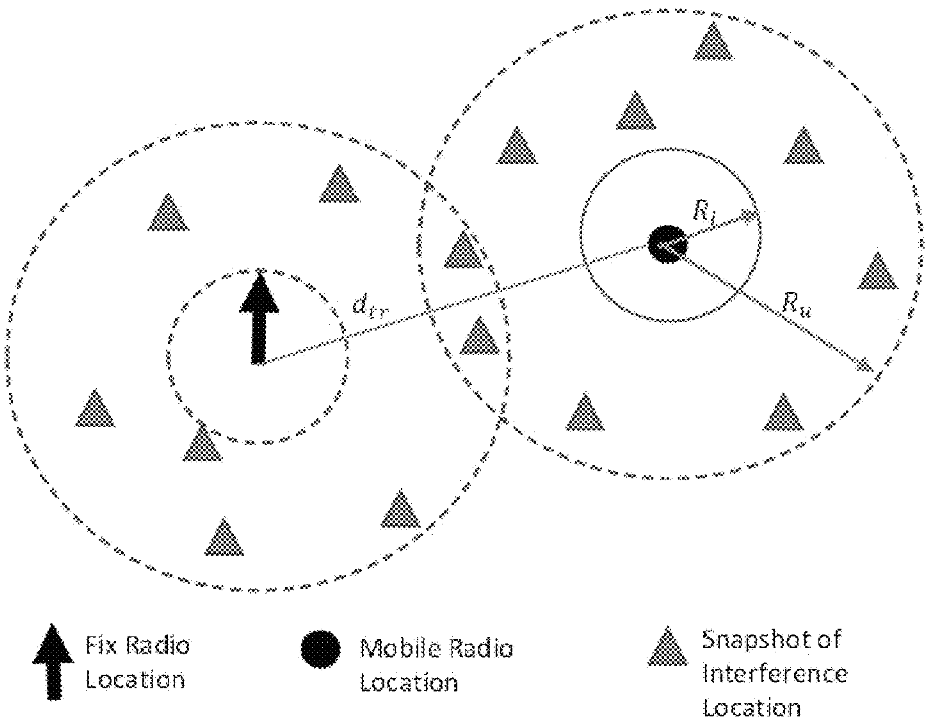

FIG. 25 shows interference space and fixed radio (FR)/mobile radio (MR) locations in a wireless system. $d_{tr}$ is the distance between the FR and the MR.

FIGS. 26*a-b* is an illustration of (a) interference plus noise power (INP) map and (b) interference avoidance map (IAM) at the FR side. $\Gamma_j$ is positioned at the beginning of a block and $T_{II}$ contains multiple block periods.

Figure 27:
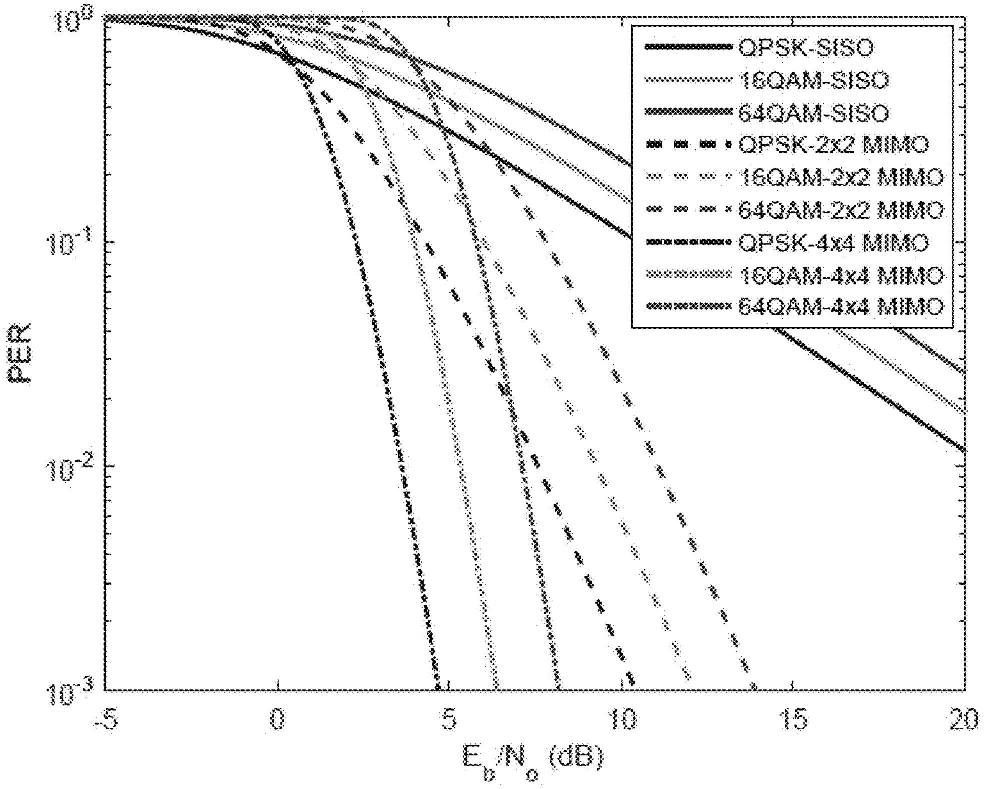

FIG. 27 shows packet error rates (PERs) of SISO, 2×2 and 4×4 MIMO systems with QPSK, 16-QAM and 64-QAM modulation schemes vs. $E_b/N_o(\gamma_b)$ on the additive white Guassian noise (AWGN) channel. Convergence threshold $\gamma_{th}$ are shown in Table 5.1.

Figure 28:
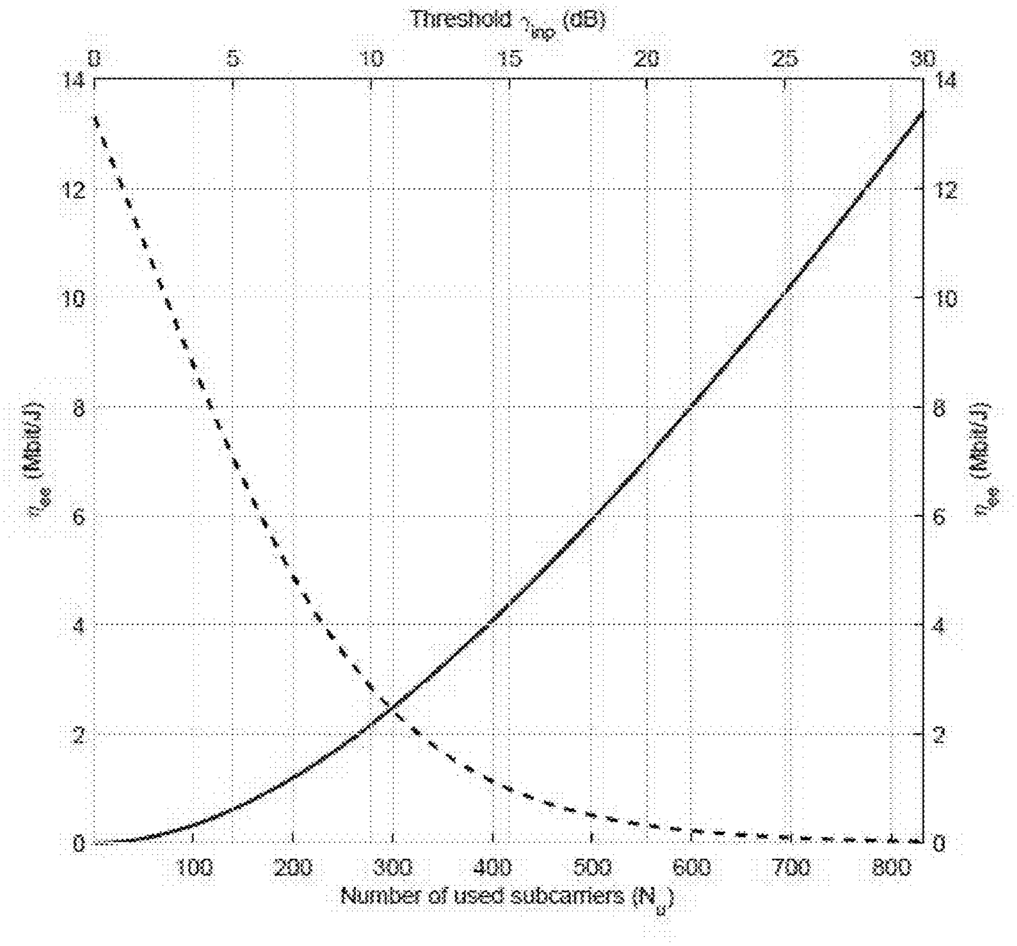

FIG. 28 shows transmit EE $\eta_{ee}$ (left y-axis) vs the number of used subcarriers $N_u$ (bottom x-axis) for 4×4 MIMO with 1-spatial beam $N_B$=1. Transmit EE $\eta_{ee}$ (right y-axis) vs threshold $\gamma_{inp}$ (top x-axis) for 4×4 MIMO with 1-spatial beam $N_B$=1.

Figure 29:
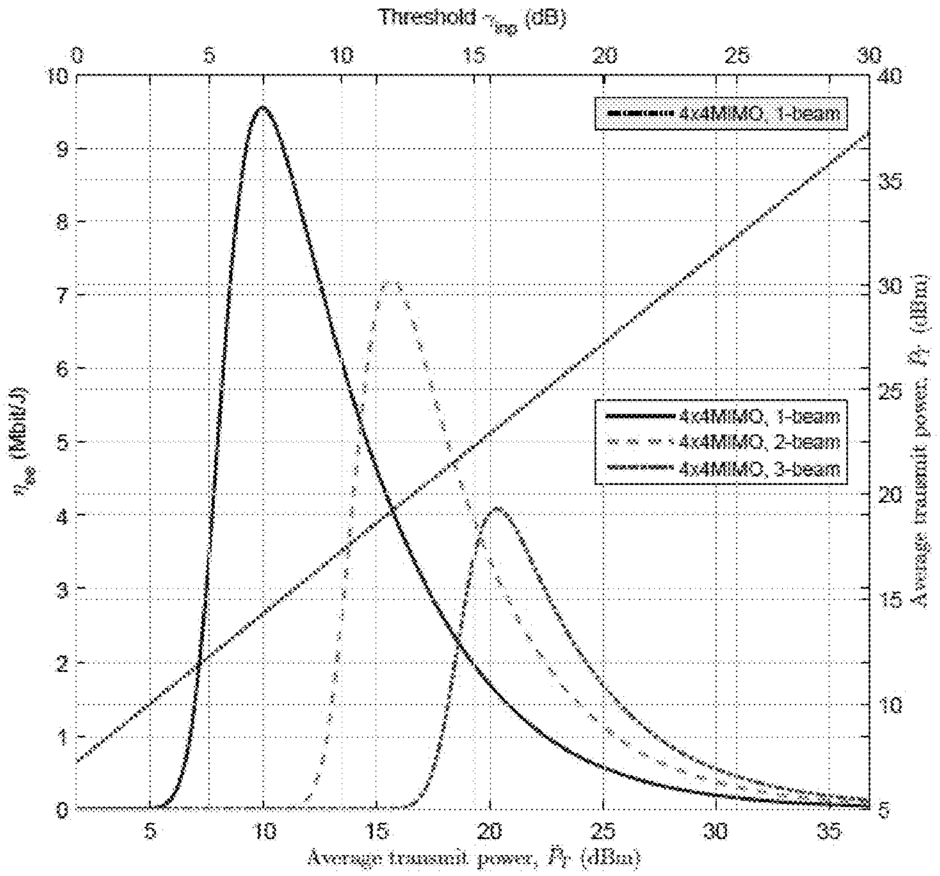

FIG. 29 shows transmit EE $\eta_{ee}$ (left y-axis) of 4×4 MIMO vs average transmit power $P_T$ (bottom x-axis). $P_T$ (right y-axis) vs threshold $\gamma_{inp}$ (top x-axis) for 4×4 MIMO with 1-spatial beam ($N_B$=1).

Figure 30:
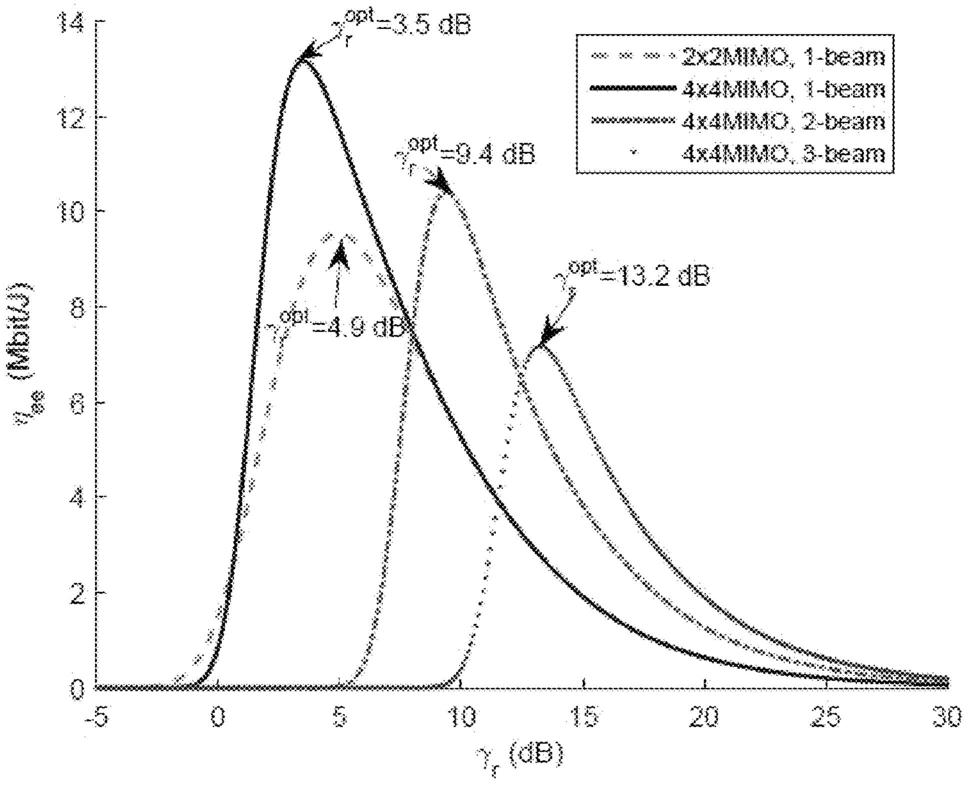

FIG. 30 shows transmit EE $\eta_{ee}$ of 2×2 and 4×4 MIMO systems with 1/2/3-spatial beam ($N_B$=1, 2 and 3) vs. signal plus interference to noise ratio (SINR) $\gamma_r$ over a low correlated Rayleigh channel model.

Figure 31:
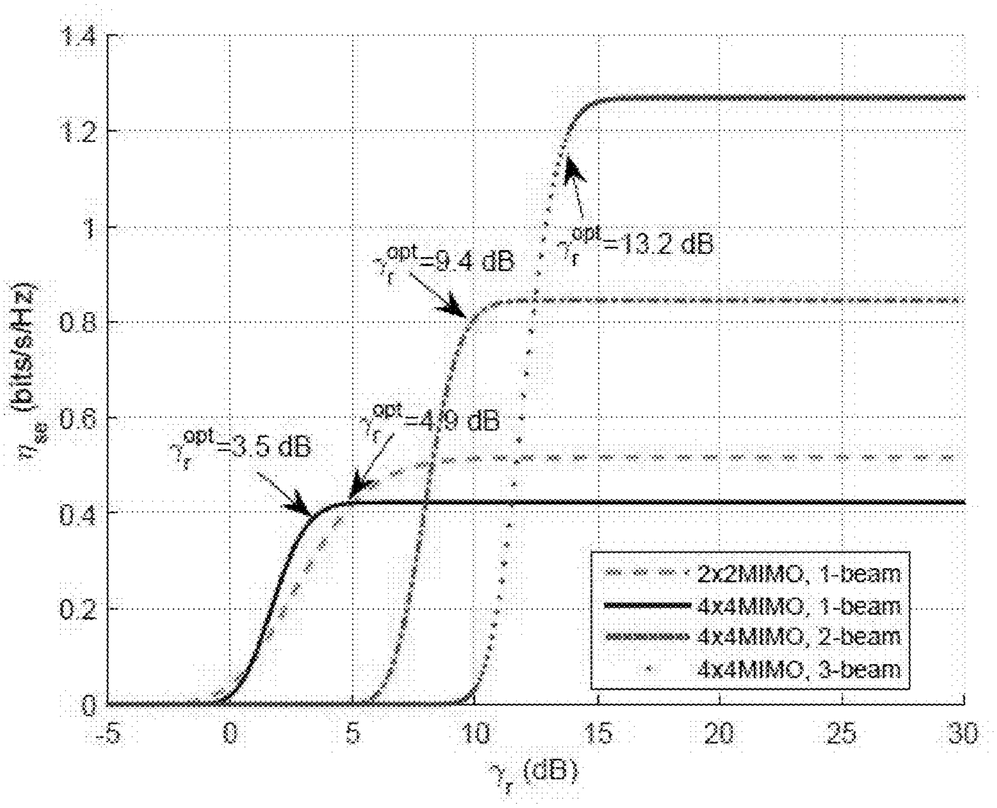

FIG. 31 shows SE $\eta_{se}$ of 2×2 and 4×4 MIMO systems with 1/2/3-spatial beam ($N_B$=1, 2 and 3) vs. SINR $\gamma_r$ over a low correlated Rayleigh channel model.

FIGS. 32*a-d* shows maximum transmit EE $\eta_{ee}^{max}$ (on the left y-axis), corresponding SE $\eta_{se}$ (on the right y-axis) and optimal SINR $\gamma_r^{opt}$ of 2×2 MIMO 1-spatial beam and 4×4 MIMO with 1-/2-/3-spatial beam architectures for Non-IA and IA schemes varying with the probability of CCI $p_{cc}$ over the Rayleigh channel model.

FIGS. 33*a-b* shows transmit EE $\eta_{ee}$ of 2×2 MIMO and 4×4 MIMO with 1-spatial beam ($N_B$=1) vs. $\gamma_r$ vs. modulation schemes over a low correlated Rayleigh channel model.

FIGS. 34*a-b* shows transmit EE $\eta_{ee}$ of 4×4 MIMO with 2/3-spatial beam ($N_B$=2 and 3) vs. $\gamma_r$ vs. modulation schemes over a low correlated Rayleigh channel model.

Figure 35:
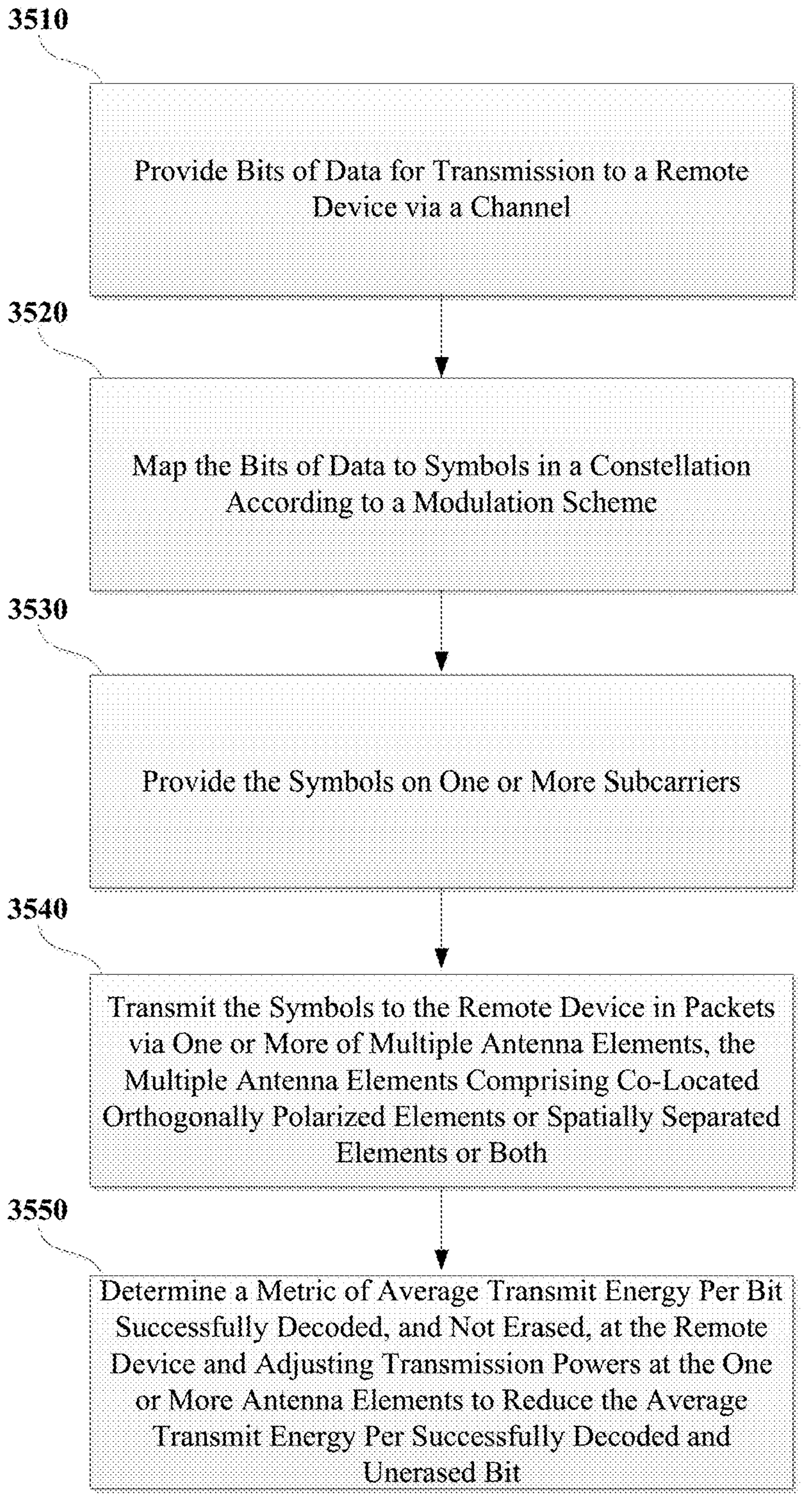

FIG. 35 is a flowchart which illustrates an example method for use in a point-to-point packet-based communication link with packet erasures.

DETAILED DESCRIPTION

Anticipating the need for energy-efficient, spectral-efficient, and interference-tolerant MIMO systems, this application analyzes the energy efficiency (EE) and spectral efficiency (SE) of full multiplexed MIMO systems and adaptive MIMO systems under diverse channel and interference conditions. The analysis begins with the considering of full multiplexing systems in the absence of interference, and assumes that channel state information is not available at the transmitter. Systems that take advantage of channel state information at the transmitter (CSIT) are considered next, again in the absence of interference. These adaptive transmission systems employ linear precoding and power control to optimize EE while operating at near-maximum SE for the selected number of beams, symbol rate, and constellations. Finally, systems that operate in environments with co-channel interference are considered. These MIMO systems employ an interference avoidance strategy followed by adaptive transmission to optimize EE on the available subcarriers.

The analysis considers MIMO systems with space diversity, polarization diversity, and combined space-polarization diversities. Architectures include co-polarized MIMO (CP-MIMO) arrays, dual-polarized MIMO architectures (DP-MIMO), and space-polarization MIMO (SP-MIMO) architectures. Since MIMO system performance is generally known to depend on the diversities associated with the antenna architecture and corresponding propagation channel characteristics, the EE and SE performance of different MIMO architectures is analyzed and compared under diverse propagation channel realizations in the context of packet-based communications.

Initially, the architectures were assumed to utilize full-multiplexing, i.e., parallel independent data streams transmitted with equal power on the transmit antenna ports. This approach is typically employed in the absence of CSIT. To support a comparative analysis of the techniques, a state-of-the-art 4×4 wideband MIMO wireless communications testbed with channel emulation capability was integrated and used in comparative performance studies, where metrics included SE (bit/s/Hz), bit error rate (BER), packet error rate (PER) and EE (Joule/bit or bit/Joule). Emulation results revealed that SP-MIMO offers a significant EE performance shift relative to SISO and CP-MIMO system at high signal-to-noise-ratios (SNRs). In this region of operation, SP-MIMO provides average transmit EEs that are nearly four times and two times less than for SISO and for CP-MIMO architectures respectively. For all of the architectures, operating points are identified that provide near the maximum SE (given the given symbol rate and the constellation) while operating at a local minimum in energy consumption.

When CSIT is available, adaptive transmission and receive processing based on linear precoding and decoding can be employed in combination with adaptive power allocation among the resulting modes. EEs and SEs for the various MIMO architectures are considered in the context of long-range wireless communications from battery-powered unmanned systems. In this case, it is found that 4×4 MIMO architectures with precoding can offer significant EE gains relative to non-precoded MIMO systems over all SNR regimes, where the gains depend upon the number of precoding beams that are employed. In the lower SNR regime, it is also found that operating points exist for the different MIMO architectures and precoding beams employed that provide near maximum SEs for the given symbol rate, the constellation and the number of beams while operating at a local minimum in energy consumption. At these operating points, transceiver operating times are determined for a range of battery capacities.

Such strategies are seen to be effective in isolated links, where co-channel interference is negligible. However, when co-channel interference (CCI) is present, packet erasures will be more prevalent, and the EE of MIMO radio communications can deteriorate sharply. To improve the EE in CCI environments, an efficient interference avoidance (IA) technique is proposed that relies on the conveyance of interference statistics derived at the receiver. Using the IA information, which incurs very small overhead, the transmitter selects the subchannels to be used for communications and on these subchannels, CSIT is applied in linear precoding strategies to minimize transmit energy consumption. The minimum energy solution is conditioned on various factors such as channel coding characteristics, linear precoding, IA schemes and channel realizations. A method to identify the optimal transmit power is derived and simulation results show the effectiveness of the IA techniques over MIMO fading channels with different CCI statistics.

Chapter 1

Introduction

1.1 Motivation and Goals

In the early development of multiple-input multiple-output (MIMO) communication techniques, co-polarized (CP) antenna arrays were typically employed at both the transmitter (Tx) and receiver (Rx). These systems were shown to provide improved spectral efficiencies in multipath fading environments relative to the single input single-output (SISO) architecture. More recently, the integration of alternative antennas has been receiving attention including those with spatially separated orthogonally-polarized antenna elements and co-located orthogonally-polarized antenna elements, the latter which are referred to herein as dual-polarized (DP) antennas. These architectures are motivated by the fact that the MIMO subchannels associated with orthogonally-polarized antenna elements often exhibit uncorrelated fading responses that can improve diversity and multiplexing gains, particularly in Rician channels. In this application, extensions of conventional SISO systems and CP antenna arrays are considered by replacing each co-polarized antenna element with a DP antenna, doubling the number of ports in each case without substantially increasing the antenna footprint. Utilization of a DP antenna in place of the transmit and receive antennas in a SISO system leads to a 2×2 dual-polarized MIMO (DP-MIMO) system architecture. Similarly, employing a DP antenna in place of each CP antenna in a 2×2 co-polarized MIMO (CP-MIMO) system leads to a 4×4 space and polarization MIMO (SP-MIMO) architecture which has the advantage of diversity in both space and polarization dimensions.

A primary focus of the application is to investigate reliable, energy-efficient communications strategies to extend the operating times of battery-powered radios equipped with multiple antennas. In literature, energy efficiency (EE) has been considered from various perspectives. At the systems and network level, load balancing, system reconfiguration, multi-domain (time, frequency and spatial domains) scheduling, and cross layer design/optimization have been studied.

EE studies associated with the physical link layer have also been considered. For example, energy efficiencies have been compared among several transmission schemes including direct wireless links and relay links with average channel knowledge and instantaneous feedback of the channel states. The EE of opportunistic cooperative relaying using a single relay amplify-and-forward scheme (AF) has been proposed for single-carrier frequency-division multiple access (SC-FDMA). Tradeoffs associated with EE involving deployment and spectral efficiencies, bandwidth, power and delay have been considered. The EE definition with packet erasures is also employed in network optimization with power control, where the EE is defined as the transmit energy required per successful bit. However, prior work apparently has not investigated the impact of packet erasures on the EE in MIMO communications systems employing adaptive precoding and operating in co-channel interference (CCI).

This application focuses on how MIMO architectures, associated packet designs and adaptive signal transmission strategies in different fading channel realizations and interference environments impact the EE and spectral efficiency (SE) of MIMO radios when packet erasures are considered. Strategies for optimizing EE and improving performance in the presence of CCI are also developed.

The approach taken for the analysis was to characterize the transmit EE of different MIMO system architectures over frequency-selective and polarization-sensitive channels so that the relative energy efficiencies of these different MIMO communications modes could be compared in packet-based communications. The EE of the communications architectures is explored in terms of successfully received bits after packet erasures, i.e. average transmit energy per successfully received bit or successfully received bit per transmit energy unit. This performance metric is relevant especially to battery-powered radios to prolong radio operation on a battery charge.

An energy-efficient analysis is conducted that assumes packets containing bit errors result in packet erasures, thus requiring retransmission. Using a channel emulation testbed, the EE and SE can be estimated and optimized for each of the MIMO architectures over various channel realizations and interference environments.

In the application, various numerical analyses were conducted, including the following: The average bit error rate (BER) for the linear precoding in the high signal to noise ratio (SNR) regime was derived in order to evaluate the transmit EE and EE gains of MIMO systems with spatial and polarization diversity relative to the SISO system. The packet error rate (PER) of the turbo code with random interleavers of sufficiently long codeword length in the MIMO systems were approximated for the quasi-static fading channel. Optimal linear precoding were employed with the interference avoidance (IA) approach on subbands determined to be available. An analytical framework used to analyze the transmit EE as a function of practical broadband communications system parameters, including packet structure, modulations, channel coding characteristics, transmit power profile, adaptive transmission schemes, IA and physical channel models in networks with packet erasures. Methods were developed for use at the Tx to optimize the transmit EE by identifying optimal transmit powers for adaptive MIMO systems to achieve energy-efficient operations for battery-powered radios.

For the empirical analyses, a SP-MIMO testbed was developed to emulate various radio propagation environments of SP-MIMO channels and to analyze the relative performance measures of the techniques to characterize CP-MIMO, DP-MIMO, and SP-MIMO architectures such as BER, PER, SE, and EE. This testbed enables control over transmitted waveforms, channel configurations, and signal processing algorithms at the transmitter and the receiver, and also enables the implementation of adaptive transmission architectures. The developed testbed provides a very powerful and flexible platform to evaluate the proposed communications and signal processing methods in a hybrid hardware/software environment. In the next sections, the concept of transmit EE and packet-based EE are introduced.

A summary of the transmit EE analysis is then presented for SP-MIMO communications with spatial multiplexing and linearly precoding over various fading channel realizations and interference environments. Following this overview, the chapter concludes with an outline of the remainder of the application.

1.2 Fundamentals of Transmit Energy Efficiency

In the literature, the EE is traditionally defined as the ratio of the capacity to the rate of energy consumption or the capacity per unit cost. In an energy constrained communications system, the EE can also be defined as the ratio of the maximum amount of bits delivered by the system to the total supplied energy in Joules, usually reported in terms of bit-per-Joule (bit/J). Other metrics for EE have also been considered such as Joule-per-bit and energy-per-bit to the noise power spectral density ratio, i.e. $E_b$=$N_o$. The information theoretic (IT) transmit EE metric of a band-limited communications system in additive white Gaussian noise (additive white Gaussian noise (AWGN)) can be modeled as $$\eta_{ee}^{IT} = \frac{R_b}{P_T} = \frac{B_w}{P_T}\log_2\left(1 + \frac{P_R}{B_w N_o}\right) = \frac{B_w}{P_T}\log_2\left(1 + \frac{P_T\|h\|_F^2}{B_w N_o}\right) = \frac{\|h\|_F^2}{SNR_r N_o}\log_2(1 + SNR_r)\text{(bit/Joule or bit/J)} \tag{1.1}$$

where $R_b$ is the bit rate of information, $P_T$ is the total transmit power, $P_R$ is the received power, h is the complex channel gain, $B_w$ is the 3-dB noise bandwidth in Hertz, $N_o$ is the power spectral density of the noise in units of watts per Hertz and $\|\bullet\|_F$ denotes the Frobenius norm. $SNR_r$ is the received signal to noise ratio (SNR), i.e. $SNR_r = P_R/(B_w N_o)$. The IT-based EE metric indicates the information bits delivered per energy unit at the transmit side. The EE bounds derived from information theory might not be achieved in practical communications systems due to the performance loss of non-optimal finite blocklength channel codes and imperfect CSI estimation.

In digital communications with error-correcting coding and decoding, the transmit EE can be defined as a ratio of the number of successfully decoded bits to the total transmit energy. The re-defined EE bound in this case is a function of the BER and the SNR:

$$\eta_{ee}^{BE} = \frac{N_{good}}{E_T} = \frac{(1-\overline{p_b})R_b\|h\|^2}{SNR_r B_w N_o}\text{(bits/J).} \tag{1.2}$$

where $E_T$ is the transmit energy (Joule) excluding circuit power consumption, $N_{good}$ is the total number of data bits successfully decoded at the Rx excluding errorcorrecting codes and $p_b$ is the average BER evaluated at the Rx.

However, the EE definitions above do not accommodate efficiency losses due to erased packets in lossy packet networks, where packets received in error are dropped. The data structure of a packet is typically composed of a header, data payloads and a checksum. In a band-limited, latency-constrained and packetized system, the packet-based transmit EE metric has been defined as the ratio of the number of successfully received bits in unerased packets to the total transmit energy $$\eta_{ee}^{PK} = \frac{N_{good}^{pkt}}{E_T} = \frac{N_{good}^{pkt} R_b\|h\|^2}{N_b SNR_r B_w N_o}\text{(bits/J).} \tag{1.3}$$

where $N_{good}^{pkt}$ is the total number of data bits in good/successful packets decoded at the Rx excluding error-correcting codes and the packet overhead and Nb is the number of coded data symbols delivered from the Tx.

Figure 1:
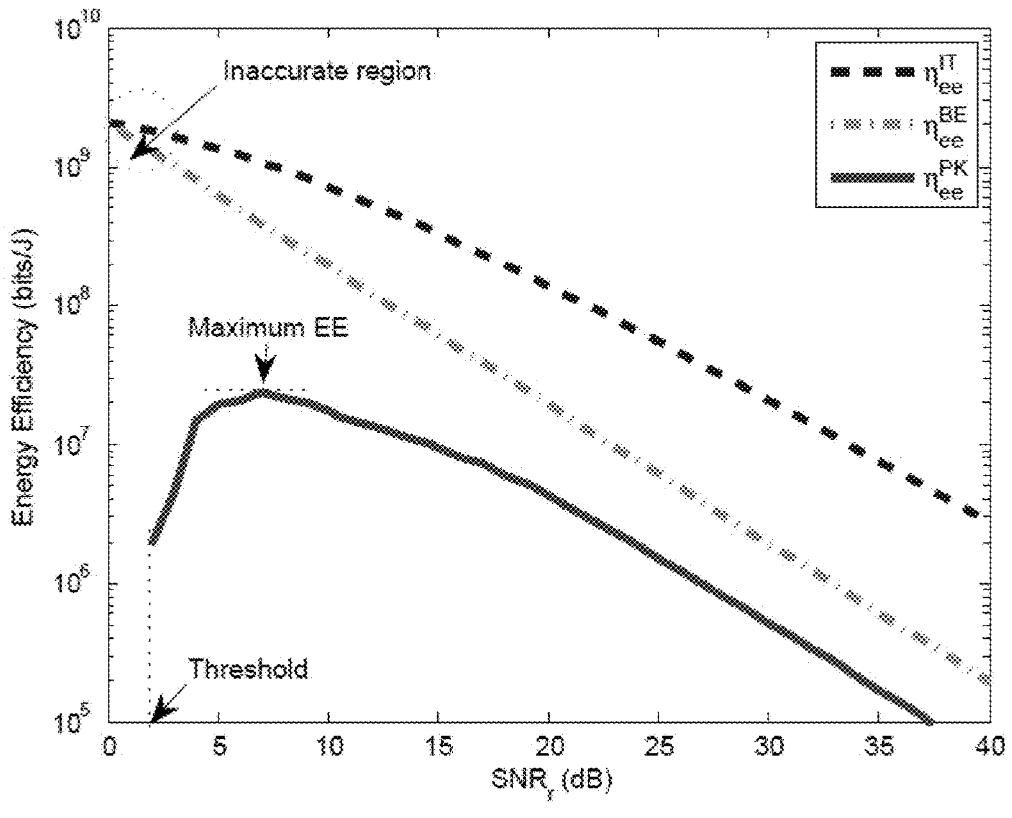
FIG. 1 shows numerical results of information theoretic (IT)-based $\eta_{ee}^{IT}$ (blue dotted line), BER-based $\eta_{ee}^{BE}$ (green dotted line) and packet-based $\eta_{ee}^{PK}$ (red solid line). Zero values of $\eta_{ee}^{PK}$ are not shown due to logarithm scale on the y-axis.

To illustrate a comparison between the various EE definitions, a Monte Carlo simulation over the SISO link was conducted involving the parameters listed in Table 1.1. The simulations employed the [171 133] convolutional code with rate 1/2 and constraint length 7 to encode the input data. Viterbi decoding with hard decision was accordingly applied at the decoder. A free-space path loss model with loss exponent 2 was assumed along with a distance $d_{tr}$ between the Tx and the Rx of 10 km. A uniformly distributed pseudo-random binary sequence was generated at the Tx and AWGN was digitally added to the received signals to achieve SNRrranging between 0 dB and 40 dB. FIG. 1 illustrates $\eta_{ee}^{IT}$, $\eta_{ee}^{BE}$and $\eta_{ee}^{PK}$ as a function of $SNR_r$. FIG. 1 shows numerical results of information theoretic (IT)-based $\eta_{ee}^{IT}$ (blue dotted line), BER-based $\eta_{ee}^{BE}$ (green dotted line) and packet-based $\eta_{ee}^{PK}$ (red solid line). Zero values of $\eta_{ee}^{PK}$ are not shown due to logarithm scale on the y-axis. The following are observed from (1.1)~(1.3) and FIG. 1: $\eta_{ee}^{IT}$ and $\eta_{ee}^{BE}$ monotonically decrease with $SNR_r$. The EE performance of $\eta_{ee}^{BE}$ based on convolutional codes with Viterbi decoding is inferior to that of $\eta_{ee}^{IT}$ since non-optimal error-correcting codes with finite blocklength degrade the BER and thus reduce $\eta_{ee}^{BE}$. From both the IT-based and BER-based EE definitions, maximizing the EE conflicts with optimizing the data throughput of a system, and suggests a tradeoff between the EE and the spectral efficiency. The packet-based EE $\eta_{ee}^{PK}$ is a convex function of $SNR_r$ (the convex property is detailed in Chapter 5 and proven in Appendix A). When $SNR_r$ is less than a threshold (approximately 2 dB on the plot), the EE approaches zero since only a few bits are successfully decoded and retained at the Rx due to packet erasures. When $SNR_r$ is raised above the threshold, $\eta_{ee}^{PK}$ monotonically increases with $SNR_r$ until the maximum EE is achieved after which it monotonically decreases with $SNR_r$.

TABLE 1.1

Simulation parameters for EE metrics

| Parameter | Value | Parameter | Value |
|---|---|---|---|
| Data bit rate, $\eta_b$ | 1 Mbits/s | Number of symbols, $N_b$ | $1 \cdot 10^7$ |
| Carrier frequency, $f_c$ | 1 GHz | Bandwidth, $B_w$ | 500 KHz |
| Distance, $d_{tr}$ | $10^5$ m | Path loss exponent, | 2 (free-space) |
| Tx&Rx antenna gain | 3 dBi | Modulation | QPSK |
| Packet length, $L_{pkt}$ | 128 bits | Head length, $L_{head}$ | 16 bits |
| Checksum length, $L_{crc}$ | 32 bits | Noise spectral density, $N_o$ | −173.83 dBm/Hx |
| Convolutional codes | [171 133], rate R = ½ | Channel model | Rayleigh fading |

1.3 Packet Structure and Design

The packet structure includes a header, one or more data payload symbols and a checksum. A data-payload size of $L_d$ bits is used in SISO packets and the packet (including the header and the checksum) size is $L_p$ bits. For $N_r$x$N_t$ MIMO configurations, $N_t$ streams, or sub-packets, are generated, each containing $L_d$=$N_t$ data bits. Hence each sub-packet conveys a factor of 1=$N_t$ of the data payload message.

Figure 2:
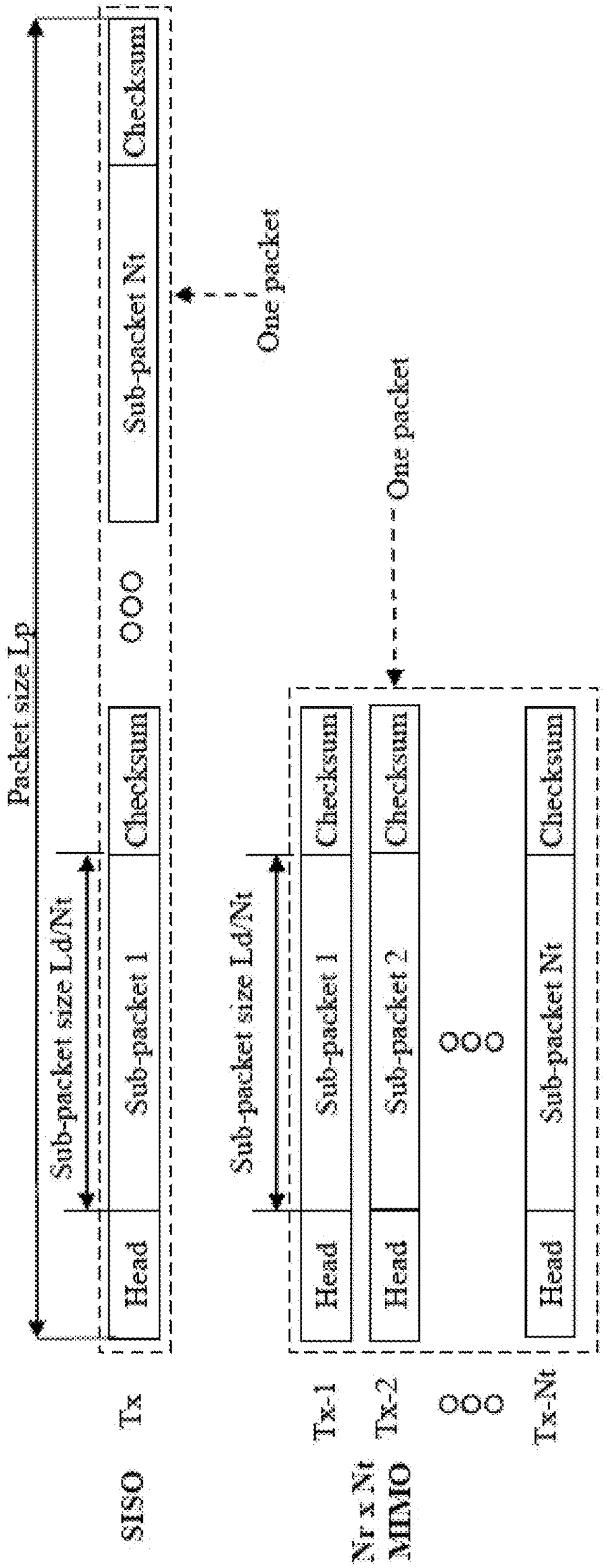
FIG. 2 is an illustration of packet and sub-packet data allocations for single-input single-output (SISO) and multiple-input multiple-output (MIMO) architectures.

To compare the relative performance between the architectures, two packet erasure methods are considered: packet and sub-packet methods. FIG. 2 is an illustration of packet and sub-packet data allocations for single-input single-output (SISO) and multiple-input multiple-output (MIMO) architectures. As shown in FIG. 2, it is assumed that the data message to be conveyed requires $L_d$ bits (exactly the data-payload of one packet) and the symbol rate is the same for SISO and $N_r$x$N_t$ MIMO schemes. When SISO is employed, all $L_d$ bits are arranged in a single packet. For $N_r$x$N_t$ MIMO systems, $N_t$ sub-packets each with an $L_d/N_t$-bit data payload are equally split over $N_t$ antennas. In the packet-based erasure method, a packet error is assumed if any one of the $N_t$ received sub-packet exhibits an error. When a packet error occurs, all $N_t$ sub-packets must be retransmitted. However, in the subpacket erasure method, erasures are applied only to those sub-packets containing a bit error. Erased sub-packets have to be retransmitted, but not necessarily all $N_t$ subpackets. The sub-packet erasure approach has the advantage of reducing the number of bits that have to be retransmitted when erasures occur, but has the disadvantage of additional overhead since each sub-packet contains a header and a checksum. A comparison between packet and sub-packet erasure schemes with different modulation schemes (data rates) for a fixed data payload is shown in Section 3.1. The MIMO architectures show EE improvements in sub-packet erasure approach due to fewer retransmissions of packets.

1.4 Packet-Based Transmit Energy Efficiency and Spectral Efficiency

Typically, several subsystems will consume non-negligible power in a transceiver. These include the power amplifier (PA), which amplifies the signal to produce the required radio frequency (RF) transmit power $P_T$; the baseband (BB) signal processing block which handles digital signal processing and system controls; the transmit (TX) block, which is responsible for modulation and up-conversion; and the receive (RX) block, which includes the low noise amplifier (LNA), down-conversion and demodulation. The power consumption of all the PAs, $P_{pa}$, can be approximated as $$P_{pa}=\eta_t P_T, \tag{1.4}$$

Where $\eta_t=\eta_{papr}/\eta_{pa}$, $\eta_{pa}$ is the drain efficiency of the RF PA, and $\eta_{papr}$ is the peakto-average power ratio (PAPR).

In this application, a fixed payload is assumed to facilitate performance comparisons among the communications architectures. The total energy required for delivery of the payload can be derived from the number of successful bits per average energy unit. The average transmit EE $\eta_{ee}$ is defined by a ratio of the number of successfully received bits to the total energy consumption after erasures (successful bit per Joule).

$$\eta_{ee} = \frac{N_{good}^{pkt}}{E_{all}} = \frac{N_{good}^{pkt}}{T_{tx}(P_{pa}+P_{tx}+P_{bb})+T_{rx}(P_{rx}+P_{bb})}, \tag{1.5}$$

where $E_{all}$ is the total transmit energy (Joule) of all the subsystems, $T_{tx}$ is the total transmit time for a given number of bits, $T_{rx}$ is the total receive time for a given number of bits, and $N_{good}^{pkt}$ depends on successfully decoded packets or sub-packets at the receiver. $P_{tx}$, $P_{rx}$ and $P_{bb}$ represent the average power consumption of the TX, RX and BB subsystems respectively.

Transmission electronic circuit energy consumption exhibits fundamental tradeoffs between the EE and the data rate. However the power consumption with electronic circuit energy is often neglected in system analysis, since energy consumption due to transmission is expected to dominate in long-range wireless communications. Transmit energy consumption for the subsystems are compared in Chapter 3.1.2 and confirm that the transmit energy is dominant over circuit consumption in longer range communications systems. Therefore, energy consumption due to transmission is exclusively used to compute the relative EE performance between the communications architectures considered in this work. As a result, the average transmit EE $\eta_{ee}$ may be computed as a ratio of the number of successfully received bits to the total transmit energy (successful bit per Joule).

$$\eta_{ee} = \frac{N_{good}^{pkt}}{E_{tot}} = \frac{N_{good}^{pkt}}{P_{pa}T_{tx}} \tag{1.6}$$

where $E_{tot}$ is the total transmit energy (Joule) over all transmit antennas. Equivalently, the average transmit EE $\eta_{ee}$ can be also defined by a ratio of the total transmit energy to the number of successfully received bits after erasures (Joule per successful bit) as follows:

$$\eta_{ee} = \frac{E_{tot}}{N_{good}^{pkt}} = \frac{P_{pa}T_{tx}}{N_{good}^{pkt}}. \quad (1.7)$$

The SE measured in bit/s/Hz is often used to characterize the maximum throughput divided by the bandwidth in hertz of a digital communication system on a given communication channel. In the application, the SE $\eta_{se}$ quantifies the successful data rate that can be reliably achieved at the receiver over the occupied bandwidth. It is expressed in terms of successful bit/s/Hz:

$$\eta_{ee} = \frac{N_{good}^{pkt}}{T_{tot} \cdot B_w} \quad (1.8)$$

where $T_{tot}$ is the total time to transmit all the data bits (excluding the overhead) and $B_w$ is the bandwidth (typically 3-dB bandwidth) occupancy of the transmitted signals.

1.5 Transmit Energy Efficiency of Space and Polarization MIMO Communications

In Chapter 3 of this application, the total average transmit energy required for the successful delivery of each bit (Joule per successful bit) is considered, including the impact of packet erasures, for different antenna architectures. The relative energy efficiencies of SISO, CP-MIMO, DP-MIMO, and SP-MIMO architectures are studied over both flat fading and frequency selective channels for different signal constellations, packet sizes and erasure strategies. It is found that the EE, as defined, is impacted by the packet size and erasure scheme, the signal constellation, the MIMO antenna architecture, and channel conditions. The analysis is based on the presumption of full multiplexing MIMO schemes without channel state information at the transmitter (CSIT). The use of CSIT for adaptive transmission schemes, including precoding, is not considered in this part, but is considered in a later chapter. Adaptive strategies are anticipated to help improve efficiencies because the precoded transmit signals can substantially decrease the resulting BER and PER, yielding reducing packet retransmissions and overall power consumption.

Full spatial multiplexing involves simultaneous transmission of independent data streams, typically with equal power, on each of the MIMO transmit antennas. In this analysis, four independent streams are used for SP-MIMO; two independent streams are used for CP-MIMO and DP-MIMO; and a single stream is used for SISO, with uniformly distributed power among the data streams for any one architecture. A sub-packet erasure method introduced in Section 1.3 is used to improve the EE over MIMO channels for full spatial multiplexing MIMO systems. This strategy leads to improved EE by reducing the number of successfully decoded bits that are erased by MIMO systems. To compare the EE of these different architectures, numerical studies are initially conducted to compare the performance for different modulation levels, packet sizes, and erasure schemes in a flat-fading channel. The EE is then evaluated in four different frequency-selective channels using a hybrid hardware/software SP-MIMO testbed. The testbed is configured to generate 10 MHzwide MIMO streams using orthogonal frequency-division multiplexing (OFDM) over various emulated radio propagation environments with different space and polarization correlation properties. A coherent multi-channel receiver is used to receive the analog signals, and signal processing algorithms are applied to the received signals using MATLAB-based algorithms in the server to demodulate the received bits. The EE performance is estimated in different frequency-selective channel realizations (as opposed to at fading environments) with different spatial correlation and polarization correlation characteristics by using a sophisticated MIMO emulation testbed. For each architecture an operating point is also identified in the SE-EE plane corresponding to near-maximum data rates with a corresponding local minimum in energy consumption for the given symbol rate and the constellation. Tradeoffs among the architectures are reported in terms of SNR, SE, and EE.

1.6 Transmit Energy Efficiency of Linearly Precoded MIMO Systems

In Chapter 4, adaptive MIMO transmission techniques based on linear precoding and power control strategies are used to achieve energy efficiencies in packet erasure channels. Linear precoding enables exploitation of the channel eigenmodes to achieve improved EE relative to corresponding architectures without linear precoding, while power control enables setting transmission power levels to optimize transmit EE in a way that balances transmit energy minimization with resulting efficiency losses due to packet erasures. The work assumes that the channel changes slowly and is reciprocal, so that the unmanned system (US) can acquire CSIT through the transpose of channel state information matrix, for example in a time division duplexing (time-division duplexing (TDD)) mode without utilizing spectral and temporal resources, e.g. channel feedback methods. The use of CSIT, however, does not appear to have been considered in the context of EE performance in packet erasure channels, where capacity maximization is not synonymous with optimal EE. In this application, linear precoding techniques are considered for a number of MIMO configuration modes derived from a SP-MIMO architecture with the goal of evaluating EE at near maximum SE. Battery capacities are also used to estimate transceiver operational times for the operating point minimizing energy consumption.

To compare the EE of different MIMO architectures, experiments to validate the performance of the MIMO-OFDM systems are conducted using a hybrid software/hardware testbed detailed in Chapter 3.2 that incorporates CSIT to analyze the relative performance of linear precoding schemes for different MIMO architectures in polarization-sensitive channels. It has been demonstrated that substantial EE gains in packet erasure channels are possible using linearly precoded MIMO modes. Adaptive strategies are applied in both simulated air-to-ground (A-to-G) and ground-to-ground (G-to-G) communications channels. Various tradeoffs are quantified in terms of achieved rates, EE, and SNR. Operating points for each adaptive architecture and channel realization are identified from the experimental results that minimize energy consumption and provide near-maximum data rate for the given symbol rate, the constellation and the number of beams. The operating points in various architectures provide different operating time performance of battery-powered USs. In particular, it is shown that the EE metric and spectral efficiency for these MIMO modes in packet erasure channels depend on the SNR. It is also found that the EE of transceiver operation impacts the operating time or endurance of the battery-powered transceiver on board the US.

1.7 Transmit Energy Efficiency of MIMO Systems with Interference Avoidance

Energy-efficient techniques can play a crucial role to reduce energy consumption and preserve battery life of radios, and this may become more important, especially for mobile radios (mobile radio (MR)), as radios evolve in their sensing role in spectrum sharing environments. Literature on mobile radio MR technologies focusing on EE have included device, physical (PHY), medium access control (MAC) and network levels, such as low power transmitter (Tx) design, advanced fabrication technologies, energy-efficient communication techniques via coding and modulation, decreasing the transmission duty cycle, collision avoidance scheduling in the MAC layer, system-level power management, and energy-aware scheduling.

However, in spectrum sharing schemes, CCI from primary, secondary users and from other radio frequency systems within range of the Rx can sharply degrade the BER, PER and EE performances of battery-powered radios. To deal with interference, a variety of interference-tolerant and IA techniques have been considered in the past. Techniques that have been reported in literature include the use of an ensemble of optimal waveforms to maximize the signal plus interference to noise ratio (SINR), dynamic vertical beam-steering, radio resource allocation with IA in small cells, interference coordination mechanisms, IA through inter-cell interference coordination and interference alignment. However, these interference methods require complex algorithms to reduce the impact of interference, e.g. greedy interference algorithm, interference coordination and radio resource optimization. One link-based method that appears to be less complex involves minimizing radio transmit energy employed in communications. In Chapter 5, an efficient IA technique is proposed to minimize energy consumption in packet-based communications when the link is subject to CCI, frequency-selective fading, and packet erasures. As part of the solution, an efficient link-based, dynamic IA approach is used in which a fixed radio (FR) periodically measures the interference plus noise power (INP) on subcarriers in the frequency domain and generates an interference avoidance map (IAM) marking the subcarriers to be avoided based on interference plus noise power (INP) levels. The IAM information and the average INP are sent to a MR with very small bandwidth overhead, which then employs linear precoding and power control on the unmarked subcarriers for interference-tolerant communications. The ability to operate in interference while simultaneously using near-minimum energy consumption to transfer data results in low energy footprints and serves to promote spectrum sharing.

MIMO architectures are utilized that employ IA and optimal linear precoding on the available subbands and identify transmit powers that minimize the energy consumption for battery-powered MRs in a dynamic interference environment. Assuming the channel changes slowly and is reciprocal, the MR can obtain CSIT through the matrix transpose of channel information when the MR and the FR operate in a TDD mode. The EE is modeled as a function of communications system parameters, including channel coding characteristics, modulations, PER, packet structure, transmit power profile, power consumption in subsystems, adaptive transmission schemes, IA and physical interference channel models in networks with packet erasures. The techniques being proposed provide an effective means to balance SE demands and EE over widely different channel conditions when the CCI is present.

1.8 Application Structure

The rest of the application is organized as follows. First, Chapter 2 reviews the background information on MIMO channel modeling, describes MIMO architectures, and proposes correlation-based analytical models employed as fundamentals for characterizing, synthesizing and simulating SP-MIMO channels. Chapter 3 continues with the transmit EE analysis of SP-MIMO, DP-MIMO, CP-MIMO schemes over frequency-selective MIMO channels. In particular, a sophisticated hardware/software MIMO testbed is described in Chapter 3.2 that is used to compare the BER, PER and EE performance metrics among various MIMO architectures. Chapter 4 analyzes transmit EE of long-range wireless communications from battery-powered USs over packet erasure channels for SP-MIMO architectures with and without adaptive transmission schemes utilizing linear precoding. Chapter 5 investigates the packet-based EE of battery-powered MIMO mobile radio communications with an efficient IA technique over frequency-selective fading channels in the presence of interference. Finally Chapter 6 summarizes the contributions of this research and identifies directions of future work.

Chapter 2

MIMO Architectures and Channel Models

In the last twenty years, MIMO architectures have become an important technology in broadband wireless communication systems because of their potential to achieve high capacities. However, it is recognized that the performance of MIMO systems is highly dependent on the antenna architectures employed and also on the corresponding propagation channel characteristics associated with the resulting MIMO subchannels. In this chapter, MIMO system architectures considered in this work are first introduced. These include architectures that exploit space and/or polarization diversities. Next, MIMO propagation models described in literature are presented. MIMO channel models may be roughly classified into two groups: physical models and analytical models. Physical models are based on multipath ray propagation and associated mechanisms such as the propagation delay, reflection coefficients, the direction of departure (DoD), the direction of arrival (DoA) and the Doppler shift of these paths. In contrast, analytical models focus on characterizations of the impulse response (equivalently the transfer function) of the channel between the transmitter and receive antennas in a statistical or analytical way without taking wave propagation into account. The chapter concludes with a detailed description of a correlation-based time-domain modeling approach employed for frequency-selective channel representation that is used for the analysis of space-polarization MIMO architecture and associated sub-architectures such as dual-polarization MIMO and copolarized MIMO architectures.

2.1 MIMO Architectures

2.1.1 SISO Architecture

Figure 3:
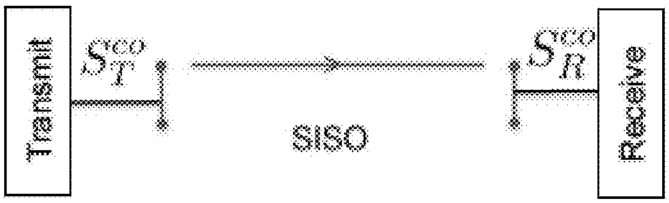
FIG. 3 is an illustration of SISO system architecture. $s_T^{co}(t)$ and $s_R^{co}(t)$ represent the transmitted and the receive signals respectively.

The MIMO architectures to be considered in the analysis will be compared against a SISO system, which involves a transmitter and receiver with CP antennas over a time-varying linear channel, as shown in FIG. 3. FIG. 3 is an illustration of SISO system architecture. $s_T^{co}(t)$ and $s_R^{co}(t)$ represent the transmitted and the receive signals respectively. The received signal is the convolution of the transmitted signal with the channel impulse response. The capacity of a SISO link is log [2(1+ρ)], where ρ is the signal to noise ratio.

2.1.2 Co-Polarized MIMO

Figure 4:
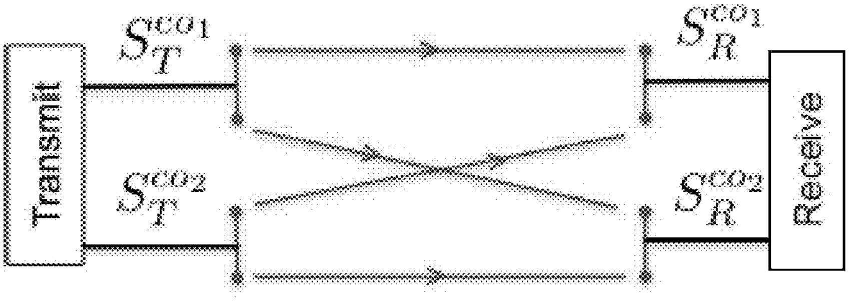
FIG. 4 is an illustration of co-polarized MIMO (CP-MIMO) system architecture. $s_T^{co1}(t)$ and $s_T^{co2}(t)$ represent transmitted signals at the 1$^{st}$ and the 2$^{nd}$ co-polarized (CP) antenna elements at the Tx respectively. Similarly, $s_R^{co1}$ (t) and $s_R^{co2}(t)$ are defined for received signals at the Rx CP antennas.

A conventional MIMO system (shown in FIG. 4 for a 2×2 CP-MIMO architecture), incorporates copolarized antennas that are spatially separated at both the transmitter and at the receiver. FIG. 4 is an illustration of co-polarized MIMO (CP-MIMO) system architecture. $s_T^{co1}(t)$ and $s_T^{co2}(t)$ represent transmitted signals at the $1^{st}$ and the $2^{nd}$ co-polarized (CP) antenna elements at the Tx respectively. Similarly, $s_R^{co1}(t)$ and $s_R^{co2}(t)$ are defined for received signals at the Rx CP antennas. The average power of elements in the channel matrix for the CP-MIMO architecture has the same. A channel matrix may be constructed to represent the channel response of four links in the system. The received signal is comprised of the convolutions of the transmitted signals with the respective channel impulse responses indexed by time. Under ideal fading conditions, the capacity of this MIMO system is approximately N times the capacity of the SISO link, where N is the number of antennas (which is assumed to be the same at the transmitter and the receiver).

2.1.3 Dual-Polarized MIMO

Figure 5:
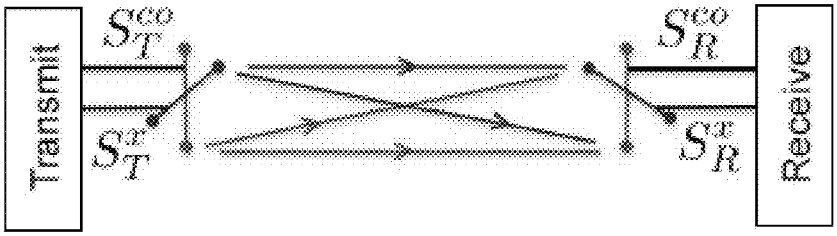
FIG. 5 is an illustration of dual-polarized MIMO (DP-MIMO) system architecture.

Most of the analyses associated with MIMO systems have involved the consideration of CP-MIMO systems, although there is a growing interest in polarization-based architectures for a number of reasons. First, in space-constrained applications, there may be limits on the number of antennas that can be deployed (e.g., one or two spatially separated antennas), restricting achievable capacities that could be achieved through the space dimension. In such cases, one strategy for increasing system capacity is to employ a co-located DP antenna instead of a CP array, yielding a DP-MIMO system, shown in FIG. 5. FIG. 5 is an illustration of dual-polarized MIMO (DP-MIMO) system architecture.

In the figure, $s_T^{co}$ and $s_T^{x}$ denote transmitted signals from co-located orthogonally polarized antenna elements at the Tx respectively. $s_R^{co}$ and $s_R^{x}$ are defined as received signals from co-located orthogonally polarized antenna elements at the Rx respectively. Similar to the conventional counterpart, a channel matrix can be used to describe the polarimetric MIMO channel. Unlike conventional MIMO, the average powers of the channel matrix are not identical. There are several parameters that are used to help characterize the power asymmetries in channels for DP-MIMO systems including the cross polarization discrimination (XPD) (needed for both transmit polarizations), and also the co-polarized power ratio (CPR). The definitions of XPD and CPR are described in (2.9) and (2.10) respectively within Section 2.3. Researchers have considered DP-MIMO architectures for both space-constrained and line-of-sight (LOS) applications.

Another important reason is that the joint channel statistics of DP-MIMO systems are different than for conventional MIMO arrays. One early paper in cellular systems describes a CP antenna array at a base station requires antenna spacing of up to about 20 wavelengths for the broadside case, and more for the in-line case in order to achieve independent fading channels, whereas with orthogonally-polarized elements, the antennas could be virtually co-located. This example illustrates that DP systems offer possibilities of improving performance where conventional MIMO might be highly disadvantaged simply because of channel statistics.

2.1.4 Space-Polarization MIMO

Figure 6:
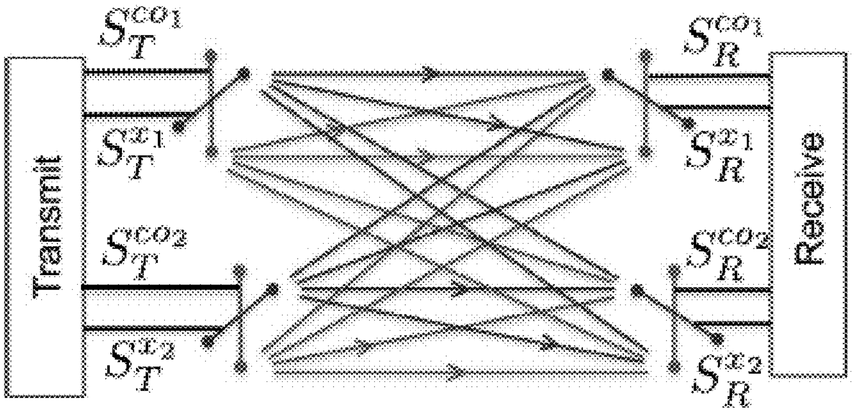
FIG. 6 is an illustration of space and polarization MIMO (SP-MIMO) system architecture. $s_T^{co1}(t)$ and $s_T^{co2}(t)$ represent transmitted signals at the 1st and the 2nd CP antenna elements at the Tx respectively. $s_T^{x1}(t)$ and $s_T^{x2}(t)$ represent transmitted signals at the 1$^{st}$ and the 2$^{nd}$ orthogonally-polarized antenna elements at the Tx respectively. Similarly, $s_R^{co1}(t)$, $s_R^{co2}(t)$, $s_R^{x1}(t)$ and $s_R^{x2}(t)$ are defined as received signals at the Rx for CP and orthogonally-polarized antenna elements.

The DP-MIMO architecture can be extended to incorporate additional space channels, as shown in FIG. 6 to yield a 4×4 SP-MIMO system. FIG. 6 is an illustration of space and polarization MIMO (SP-MIMO) system architecture. $s_T^{co1}(t)$ and $s_T^{co2}(t)$ represent transmitted signals at the 1st and the 2nd CP antenna elements at the Tx respectively. $s_T^{x1}(t)$ and $s_T^{x2}(t)$ represent transmitted signals at the $1^{st}$ and the $2^{nd}$ orthogonally-polarized antenna elements at the Tx respectively. Similarly, $s_R^{co1}(t)$, $s_R^{co2}(t)$, $s_R^{x1}(t)$ and $s_R^{x2}(t)$ are defined as received signals at the Rx for CP and orthogonally-polarized antenna elements. In this case, the channel matrix has dimension 4×4, with 16 individual paths (and 256 correlations) that help to characterize the MIMO channel. Relative to conventional MIMO with CP antenna elements, this type of architecture can yield benefits from the additional degree of freedom (DOF) at each antenna without substantially increasing the deployment footprint. This results in a more compact 4×4 MIMO system (relative to conventional 4×4 spatially-separated MIMO with CP antennas) that achieves benefits associated with both DP-MIMO and conventional 2×2 CP-MIMO architectures.

2.2 MIMO Channel Models

A MIMO channel matrix can be used to describe the propagation response for all transmit/receive antenna pairs, providing a fundamental characterization to facilitate the evaluation of MIMO system performance. Let us consider an $N_r$x$N_t$ MIMO system, where $N_r$ and $N_t$ are the number of transmit and receive antennas, respectively. A linear time-varying MIMO channel is represented by an $N_r$x$N_t$ matrix of time-varying channel impulse responses, $$H(t,\tau)=\begin{pmatrix} h_{11}(t,\tau) & h_{12}(t,\tau) & \dots & h_{1N_t}(t,\tau) \\ h_{21}(t,\tau) & h_{22}(t,\tau) & \dots & h_{2N_t}(t,\tau) \\ \vdots & \vdots & \ddots & \vdots \\ h_{N_r1}(t,\tau) & h_{N_r2}(t,\tau) & \dots & h_{N_rN_t}(t,\tau) \end{pmatrix} \tag{2.1}$$

where $h_{ij}(t,\tau)$ denotes the time-variant impulse response between the jth transmit antenna and the ith receive antenna. In this section, we present various models used to determine the channel impulse responses and then provide a description of the frequency-selective modeling approach applied in this work.

2.2.1 Physical Models

There are various modeling approaches to represent the time-varying channel impulse responses associated with a MIMO system. These modeling approaches may roughly be classified as either physical models or analytical models. Physical channel models are based on electromagnetic wave propagation modeling between the transmit array and the receive array. These types of models are characterized by wave propagation parameters such as the complex amplitude, the DoD, the DoA and delays of multiple path components (MPC)s. Some advanced models also incorporate polarization and time variation. Physical MIMO channel models can be subdivided into deterministic models, geometry-based stochastic channel model (GSCM)s, and non-geometric stochastic models. Deterministic models describe the physical propagation in a deterministic fashion, typically employing ray tracing and stored measurements. Ray-tracing algorithms have the disadvantage of high computational complexity when the number of reflections and refractions is large and when the wavelengths are small. Details of ray-tracing models and methods may be found in the literature.

GSCMs represent an alternative approach that reduces the computation load associated with ray tracing. In GSCMs, the channel impulse response is characterized by the superposition of waves propagating through Tx, Rx and scatterers, which are chosen using a statistical distribution (rather than their exact locations as in the deterministic approach). In simulations, the scatterer distribution is chosen in such a way that the resulting power delay profile (PDP), angular delay power spectrum (ADPS), etc. agree reasonably well with typical values from measurement campaigns.

In contrast to GSCM, nongeometric stochastic models determine physical parameters such as DoD, DoA and delay in a completely stochastic fashion without assuming an underlying geometry. Two classes of non-geometrical stochastic models are reported in the literature: the Saleh-Valenzuela (S-V) model and the Zwick model.

2.2.2 Analytical Models

Analytical channel models characterize the impulse response of the channel between the transmit and receive antennas in a mathematical or analytical way without explicitly representing electromagnetic wave propagation. Analytical models are helpful for synthesizing and simulating MIMO channel matrices to support systems analysis, algorithm development and verification. They can be classified into propagation-based models and correlation-based models. Examples of the first subclass are the finite scatterer model, the maximum entropy model, and the virtual channel representation. Correlation-based models describe the MIMO channel matrix statistically in terms of the correlations between the matrix entries. The most popular correlation-based analytical channel models are the Kronecker model and the Weichselberger model.

2.2.2.1 Narrowband MIMO Analytical Model

Referring to (2.1), narrowband analytical models are based on H(t; τ) for channels that do not exhibit a delay spread, and hence the dependence on τ is removed. The resulting channel matrix will exhibit power and correlation properties that are dependent upon the antenna architectures. For example, a CP-MIMO system will yield channel matrix with identical average powers, whereas a DP-MIMO configuration will yield an asymmetric power structure. CP-MIMO systems will exhibit correlations that are dependent upon the angular spectrum of the multipath, whereas DP-MIMO systems will typically exhibit largely uncorrelated behavior.

A channel matrix with $N_t$ transmit and $N_r$ receive antennas can be represented using LOS and non-line-of-sight (NLOS) components.

$$H = \sqrt{\frac{1}{1+K}}\,H_{NLOS} + \sqrt{\frac{1}{1+K}}\,H_{LOS} \tag{2.2}$$

where the time dependence has been suppressed and where K≥0 denotes the Rician factor. The matrix $H_{LOS}$ is the LOS components and the other $H_{NLOS}$ accounts for NLOS contribution.

Some widely accepted analytical MIMO channel models with NLOS components are described in the following subsections.

2.2.2.2 i.i.d. Model

For independent and identically distributed (i.i.d.) Rayleigh fading (K=0) environments, the zero-mean multivariate complex Gaussian distribution of h=vec{H} is given by $$f(h) = \frac{1}{\pi^{N_r \cdot N_t} det\{R_H\}} \exp(-h^H R_H^{-1} h) \tag{2.3}$$

where $R_H$=E{$hh^H$} is known as the full correlation matrix and can be influenced by the MIMO antenna architecture, space and polarization statistics. The simplest analytical MIMO model for the NLOS component is the i.i.d. model with $R_H=\rho^2 I$, where ρ is the channel power and I is the identity matrix. With this model, all elements of the MIMO channel matrix H are uncorrelated or statistically independent with an equal variance $\rho^2$. Physically, this model represents a spatially rich scattering environment with independent MPCs uniformly distributed in all directions.

2.2.2.3 Kronecker Model

The Kronecker model can be expressed as $$H_{kr} = \frac{1}{\sqrt{\mathrm{tr}(R_{Rx})}} R_{Rx}^{1/2} G (R_{Tx}^{1/2})^T \tag{2.4}$$

where $R_{Tx}$=E{$H^H H$} and $R_{Rx}$=E{$HH^H$} denote the transmit and receive correlation matrices. G is an i.i.d. random matrix with unity-variance, circularly symmetric complex Gaussian entries. The Kronecker is quite popular for theoretical analysis because its separability of Tx and Rx allows for independent array optimization at Tx and Rx. The main drawback of the Kronecker model is that it separates DoD and DoA spectra.

2.2.2.4 Weichselberger Model

The basic idea of Weichselberger model is to build arbitrary coupling between the transmit and receive eigenmodes and model the correlation properties at the receiver and transmitter jointly. Transmit and receive correlation matrices are written in terms of their eigenvalue decomposition $$R_{Tx}=U_{Tx}\Lambda_{Tx}U_{Tx}^H$$

$$R_{Rx}=U_{Rx}\Lambda_{Rx}U_{Rx}^H \tag{2.5}$$

where $U_{Tx}$ and $U_{Rx}$ are unitary matrices whose columns are the eigenvectors of $R_{Tx}$ and $R_{Rx}$, respectively, and where $\Lambda_{Tx}$ and $\Lambda_{Rx}$ are diagonal matrices with the corresponding eigenvalues. The Weichselberger model is given by $$H_{weich}=U_{Rx}(\tilde{\Omega}\odot G)U_{Tx}^T \tag{2.6}$$

Here, G is an $N_r$x$N_t$ i.i.d. MIMO matrix, ⊗ denotes the Schur-Hadamard product (element-wise multiplication) and $\tilde{\Omega}$ is the element-wise square root of an $N_r$x$N_t$ coupling matrix Ω whose elements determine an average power coupling between the Tx and Rx eigenmodes. This coupling matrix allows for joint modeling of the Tx and Rx channel correlations.

The above analytical models are intended for narrowband channels and do not account for correlation behaviors in the frequency domain that are inherent in multipath channels. In this application, a time-domain correlation-based analytical model is employed instead that is able to represent frequency selective channels, including inherent correlations across subcarriers, through the use of a delay-based characterization, where narrowband characterizations are independently applied to each tap delay component in the channel's power-delay profile. The modeling approach, which is used to characterize, synthesize, and simulate space and polarization MIMO channels and their respective correlation properties, is described in the next section.

2.3 Frequency-Selective Analytical Model

The linear time-varying MIMO channel matrix described in (2.1) is capable of representing frequency selective channels characterized by time-varying impulse responses, temporal dispersion (delay spread), power asymmetries, and fading correlations in time, fading correlations across subcarriers, and fading correlations between MIMO subchannels.

The discrete-time channel impulse response of a MIMO channel with $N_t$=2·p (p=1, 2, . . . ) transmit antennas and $N_r = N_t$ receive antennas can be modeled as a linear time-varying system using the subchannel response h[l, k], where k corresponds to the time instant and l to the delay, where l=0, 1, . . . , $L_D-1$ with $L_D$ representing the number of uniformly spaced delay taps used to represent the channel impulse response. A block-fading channel model is assumed where h[l, k] remains invariant over the duration of the transmission block. Denoting the impulse response at the lth-tap between the jth transmit and the ith receive antenna by $h_{i,j}[l, k]$ with i=1, 2, . . . , $N_r$ and j=1, 2, . . . , $N_t$, the received signal vector $y_k$ at time instant k is given by $$y_k = \sum_{i=0}^{L_D-1} H[l, k]\sqrt{P_i}\, x_{k-l} + n_k, \tag{2.7}$$

where H[l, k] is the $N_r \times N_t$ channel matrix having $h_{i,j}[l; k]$ as its (i,j) element, $x_{k-1}$ is the $N_t \times 1$ transmitted symbol vector at time index k−1 and $n_k$ is an $N_r \times 1$ vector of additive white Gaussian noise (AWGN) whose elements $n[k] \sim C(0, \sigma^2)$ are independent identically-distributed zero-mean complex Gaussian random variables with independent real and imaginary parts that have equal variance. $x_{k-1}$ is a vector of zero mean Gaussian entries having covariance $E[x_{k-1}x_{k-1}^H] = I_{N_t}$, where $I_{Nt}$ is an identity matrix with size $N_t$, E{ } is the expectation operator and $(\ )^H$ denotes Hermitian operation of a matrix. $\sqrt{A}=X$ is the principal square root of the matrix A, i.e. $X^*X=A$. $P_t \in \Re_{\geq 0}^{N_t \times N_t}$ is a diagonal matrix whose jth entry on the diagonal $P_{t,j} \geq 0$ designates the power transmitted by the jth antenna.

2.3.1 Channel Matrix Power Structure

In MIMO systems, the power structure of the channel matrix will depend upon the antenna configuration and associated channel effects. For CP systems, the average powers of the subchannels are approximately identical. However, for DP-MIMO and SP-MIMO systems, the use of orthogonally-polarized antennas usually leads to power imbalances between the various MIMO subchannels. In a system incorporating multiple DP antennas at both Tx and Rx ends, the channel impulse response matrix H[l, k] may be represented as $$H[l, k] = \begin{bmatrix} h_{vv}^{(1,1)}[l,k] & h_{vh}^{(2,1)}[l,k] & \dots & h_{vv}^{\left(1,\frac{N_t}{2}\right)}[l,k] & h_{vh}^{\left(1,\frac{N_t}{2}\right)}[l,k] \\ h_{hv}^{(1,1)}[l,k] & h_{hh}^{(1,1)}[l,k] & \dots & h_{hv}^{\left(1,\frac{N_t}{2}\right)}[l,k] & h_{hh}^{\left(1,\frac{N_t}{2}\right)}[l,k] \\ \vdots & \vdots & \ddots & \vdots & \vdots \\ h_{vv}^{\left(\frac{N_r}{2},1\right)}[l,k] & h_{vh}^{\left(\frac{N_r}{2},1\right)}[l,k] & \dots & h_{vv}^{\left(\frac{N_t}{2},\frac{N_t}{2}\right)}[l,k] & h_{vh}^{\left(\frac{N_r}{2},\frac{N_t}{2}\right)}[l,k] \\ h_{hv}^{\left(\frac{N_r}{2},1\right)}[l,k] & h_{hh}^{\left(\frac{N_r}{2},1\right)}[l,k] & \dots & h_{hv}^{\left(\frac{N_r}{2},\frac{N_t}{2}\right)}[l,k] & h_{hh}^{\left(\frac{N_r}{2},\frac{N_t}{2}\right)}[l,k] \end{bmatrix}, \tag{2.8}$$

where $h_{vv}^{(n,m)}[l, k]$ and $h_{hh}^{(n,m)}[l, k]$ $$\left(m = 1, 2, \dots , \frac{N_t}{2}, n = 1, 2, \dots \frac{N_r}{2}\right)$$

are the discrete-time channel impulse responses between the vertically (horizontally) polarized antenna element of the m-th transmit DP antenna and the vertically (horizontally) polarized antenna element of the n-th receive DP antenna at time instant k and delay l respectively. Similarly, $h_{vh}^{(n,m)}[l,k]$ and $h_{hv}^{(n,m)}[l, k]$ are the discrete-time channel impulse responses between the vertically (horizontally) polarized Tx antenna element and the horizontally (vertically) polarized Rx antenna element at time instant k and delay l respectively. The index v represents vertical polarization and h horizontal polarization.

For a given pair of DP antennas (n,m) in a block-fading channel, the relative power difference between the polarized antenna elements at the receiver can be quantified by the XPD, which is a ratio of the co- and cross-polarized power levels and depends on the transmit polarization. Also, the average power through the vv link may be different than through the hh link. This power ratio is reflected by the CPR, which is defined as the ratio of average channel powers in the vv and the hh subchannels. Using the channel matrix form in (2.8), the parameters XPD and CPR can be computed based on time-averaged values. The XPD values in this chapter are modeled as a function of both sub-channels and delay path, but others in literature are defined simply based on sub-channels, i.e., $$\begin{aligned} XPD_h^{(n,m)}[l] &= E\{|h_{hh}^{(n,m)}[l]|^2 / |h_{vh}^{(n,m)}[l]|^2\}, \\ XPD_e^{(n,m)}[l] &= E\{|h_{ee}^{(n,m)}[l]|^2 / |h_{hv}^{(n,m)}[l]|^2\}, \end{aligned} \tag{2.9}$$

for a vertical transmission and a horizontal transmission, respectively. The CPR is given by $$CPR^{(n,m)}[l] = E\{|h_{vv}^{(n,m)}[l]|^2 / |h_{kk}^{(n,m)}[l]|^2\}. \tag{2.10}$$

Some experimental results have shown statistical analyses of XPD in indoor [89, 90], macrocell/microcell [91], suburban [6, 92], urban [6, 90, 93] scenarios. For example, downlink (from base station to mobile station) XPD levels are typically equal (or at least close), with measured values of 1.5 to 8 dB in NLOS outdoor cases, up to 15 to 19 dB in LOS urban and rural areas; 2 to 8 dB in NLOS indoor cases, and up to 15 dB in LOS indoor scenarios. For this application, the XPDs and CPR are modelled as non-zero mean Gaussian distributions. The theoretical analysis considers a low spatially correlated Rayleigh fading channels with XPD=15 dB and CPR=0 db, while the emulation analysis considers channels with CPR=0 dB and with different XPD profiles.

2.3.2 Correlation Properties

The correlations among subchannels play an important role in MIMO system performance. SISO, CP-MIMO, and DP-MIMO channel behaviors are subsets of the resultant SP-MIMO channel, a feature that facilitates comparisons among the architectures for a given SP-MIMO channel realization. An $N_r \times N_t$ SP-MIMO system has $N_t=2$ and $N_r=2$ DP antennas at the transmit and receive sides respectively.

Two forms of antenna correlation, spatial correlation and polarization correlation, are modeled using a factored structure. This approach is based on the premise that spatial and polarization correlation effects in compound antenna systems are independent and multiplicative.

2.3.2.1 Polarization Correlation Properties

Due to power assymetries between the polarized antenna elements at the receiver, the polarization correlation matrix associated with the l-th path is defined as $$R_\Gamma^{(l)} = E\{vec(\Gamma_l)vec(\Gamma_l)^H\}, \tag{2.11}$$

where vec(A) denotes a column vector obtained by stacking the columns of the matrix A, and where the channel polarization matrix $\Gamma_l \in C^{N_r \times N_t}$ between $$\frac{N_r}{2} x \frac{N_t}{2} DP$$

antenna pairs associated with the l-th tap is given by $$\Gamma_l = \begin{bmatrix} \Gamma_l^{(1,1)} & \Gamma_l^{(1,2)} & \dots & \Gamma_l^{\left(1,\frac{N_t}{2}\right)} \\ \vdots & \ddots & \ddots & \vdots \\ \Gamma_l^{\left(\frac{N_r}{2},1\right)} & \Gamma_l^{\left(\frac{N_r}{2},2\right)} & \dots & \Gamma_l^{\left(\frac{N_r}{2},\frac{N_t}{2}\right)} \end{bmatrix}. \tag{2.12}$$

Normalizing the channel gains based on the common vv link, which is done to enable comparisons between the different architectures, the 2×2 channel polarization submatrix $\Gamma_l^{(n,m)} \in C^{2\times 2}$ between two pairs of DP antennas associated with the l-th path is given by $$\Gamma_l^{(n,m)} = \begin{bmatrix} e^{j\phi_{hv}^{(n,m)}}[l] & \chi_h^{(n,m,l)}\beta^{(n,m,l)}e^{j\phi_{vh}^{(n,m)}}[l] \\ \chi_v^{(n,m,l)}e^{j\phi_{hv}^{(n,m)}}[l] & \beta^{(n,m,l)}e^{j\phi_{hh}^{(n,m)}}[l] \end{bmatrix}, \tag{2.13}$$

where $\phi_{vv}^{(n,m)}[1]$, $\phi_{vh}^{(n,m)}[1]$, $\phi_{hv}^{(n,m)}[1]$ and $\phi_{hh}^{(n,m)}[1]$ are random phase shifts between the v(h) components of the m-th transmit antenna and the n-th receive antenna along the l-th path, $$\chi_v^{(n,m,l)} = \sqrt{\frac{1}{XPD_v^{(n,m)}[l]}},\ \chi_h^{(n,m,l)} = \sqrt{\frac{1}{XPD_h^{(n,m)}[l]}} \text{ and}$$

$$\beta^{(n,m,l)} = \sqrt{\frac{1}{CPR^{(n,m)}[l]}}.$$

Note that DP-MIMO, CP-MIMO and SISO channel models are subsets of the described SP-MIMO channel model.

2.3.2.2 Spatial Correlation Properties

For expedience, spatial correlations are modeled using a Kronecker product model in which the transmit antenna correlations and the received antenna correlations are assumed to be separable and independent. While this assumption will not always be true in practice, it is recognized to apply to cases in which the main scatterers are near either the transmitter or the receiver and also simplifies channel implementation. For the l-th path, the spatial correlation matrix can be represented as.

$$R_s^{(l)} = R_{Tx}^{(l)} \otimes R_{Rx}^{(l)}, \tag{2.14}$$

where $R_{Tx}^{(l)} \in C^{N_t \times N_t}$ and $R_{Rx}^{(l)} \in C^{N_r \times N_r}$ are the spatial correlation matrices at the Tx and Rx respectively, where $\otimes$ is the Kronecker product.

In the case of a 4×4 SP-MIMO architecture consisting of two spatially separated DP antennas, the spatial correlation matrices for the Tx and Rx antenna arrays for the lth delay may be represented as:

$$R_{Tx}^{(l)} = \begin{bmatrix} 1 & 1 \\ 1 & 1 \end{bmatrix} \otimes \begin{bmatrix} 1 & \rho_t^{(l)} \\ \rho_t^{(l)} & 1 \end{bmatrix}, \tag{2.15}$$

$$R_{Rx}^{(l)} = \begin{bmatrix} 1 & 1 \\ 1 & 1 \end{bmatrix} \otimes \begin{bmatrix} 1 & \rho_r^{(l)} \\ \rho_r^{(l)} & 1 \end{bmatrix},$$

where $\rho_t^{(l)}$ and $\rho_r^{(l)}$ are defined as spatial correlation coefficients associated with the lth delay for neighboring antenna locations at the Tx and Rx respectively. The Kronecker product $\otimes$ indicates that the same spatial correlation structure applies to the vv, vh, hv, and hh responses. Coupling effects between orthogonally polarized neighboring antenna elements are neglected.

2.3.2.3 Combined Spatial and Polarization Correlations

The corresponding spatial and polarization correlation matrices can be derived separately and combined by an element-wise matrix product. The combined spatial and polarization correlations for the l-th path are modeled via the matrix $R_{SP}^{(l)}$ $$R_{SP}^{(l)} = R_s^{(l)} \odot R_\Gamma^{(l)}, \tag{2.16}$$

where $R_S^{(l)} \in C^{N_tN_r \times N_tN_r}$ and $R_\Gamma^{(l)} \in C^{N_tN_r \times N_tN_r}$ are the normalized spatial correlation matrix and the polarization matrix respectively. $\otimes$ is the Hadamard product operation. The forms of both correlation matrices are discussed above. Entries of the combined spatial-polarization correlation matrix $R_{SP}^{(l)}$ in (2.16) are used to configure the Agilent's PxB MIMO channel emulator [97, 98] used in the emulation study.

2.3.2.4 Joint Channel Model

The resulting correlation matrices can be utilized to model a wideband MIMO channel. The channel matrix H[l,k] from (2.8) is modeled using combined spatial correlation and polarization characteristics via:

$$H[l,k] = \underbrace{\Gamma_l \odot K_l^{(FL)} \odot \left[\left(R_{Rx}^{(l)}\right)^{1/2} G \left(R_{Tx}^{(l)}\right)^{1/2}\right]}_{\text{Fluctuating } (FL) \text{ (random) component}} + \underbrace{\Gamma_l \odot K_l^{(NFL)} \odot \Phi_l^{(NFL)} e^{j2\pi f_l k T_s}}_{\text{Non-fluctuating } (NFL) \text{ component}} \tag{2.17}$$

where $K_l^{(FL)}$ has elements of $$K_{l,i,j}^{(FL)} = \sqrt{\frac{1}{1+K_{l,i,j}}} \text{ and } K_{l,i,j}$$

is the Rician K factor from the jth transmit antenna to the ith receiver antenna on the lth delay. The Rician K factor is the ratio of the powers of the non-fluctuating (NFL) component to the diffuse component. $K_l^{(NFL)}$ has elements of $$K_{l,i,j}^{(NFL)} = \sqrt{\frac{K_{l,i,j}}{1+K_{l,i,j}}}$$

for NFL components. G is an uncorrelated Rayleigh channel, where the entries of are i.i.d. Gaussian random variable (r.v.)s with zero-mean, independent real and imaginary parts with equal variance. $\Phi_l^{(NFL)}$ has entries corresponding to phase offsets $\phi_{l,i,j}^{(NFL)}$ along the NFL subchannels. $f_l$ is the signal frequency associated with the l-th delay. $T_s$ is the sample period. The correlation matrices describe only the fluctuating (FL) (random) part of the received signal. When a specular component also exists, the channel matrix can be expressed as a sum of a deterministic NFL component and a random FL component to include the Ricean fading effect.

The time-domain representation is important because it retains the polarization state correlations among sub-carrier responses in frequency-selective environments, and the time domain representations are amenable to the various parameter definitions employed to characterize the SP-MIMO channel, including correlation coefficients, channel polarization and power imbalances, such as XPD and CPR etc., all which are defined as time-averaged values. Details of time-domain multipath fading channel modeling of orthogonal frequency-division multiplexing (OFDM) systems are described in.

In the next chapter, SP-MIMO channel models are utilized in analyses to characterize EE performance in full-multiplexing MIMO systems.

Chapter 3

Transmit Energy Efficiency of Packet-Based MIMO Systems

In this chapter, transmitter energy consumption is considered in the context of MIMO communications. Generally, the average transmit energy consumption depends on circuit energy consumption and on energy consumption due to actual transmission. However, as shown in Section 3.1.2, the latter component, the transmit energy, is dominant over circuit consumption in longer range communications systems, and so in this chapter, energy consumption due exclusively to transmission is used to compute the EE performance for the considered communications architectures considered.

The EE is normally quantified in terms of some form of throughput per unit of energy consumption. In Chapter 1.4, a metric is adopted that is motivated by the need to effectively convey information with as little energy as possible, where the impact of packet erasures is included. Packet erasures result in an effective loss in information and energy efficiency, since successfully demodulated information within an erased packet is discarded. The analysis that is conducted in this chapter is based on the presumption of full multiplexing MIMO schemes without CSIT. Approaches that consider adaptive transmission schemes with CSIT are considered in a later chapter.

The use of CSIT in adaptive transmission schemes can help improve efficiencies because the precoded transmit signals can substantially decrease the resulting BER and PER, reducing packet retransmissions and overall power consumption.

The remainder of the chapter is structured as follows. Section 3.1 provides an analysis of the EE in flat fading channels for both SISO and MIMO architectures. A closed-form approximation for the transmit EE is developed and numerical results are presented that illustrate the dependence of EE on the packet duration, bit errors (or packet erasures), transmit power, data rates and MIMO transmission strategies. Section 3.2, to facilitate the consideration of EE in frequency selective channels, a sophisticated MIMO-OFDM system testbed with real-time and frequency-selective channel emulation is employed that enables comparisons between SISO, CP-MIMO, DP-MIMO, and SP-MIMO architectures. The testbed is described and emulation results from the testbed are presented for different frequency-selective channel realizations. The results quantify the EE and SE for SISO, 2×2 CP-MIMO, 2×2 DP-MIMO and 4×4 SP-MIMO.

3.1 Energy Efficiency in Flat Fading Channels

The EE depends on several factors, including the packet duration, bit errors (e.g., packet erasures), transmit power, data rates, MIMO transmission strategies, and other factors. To illustrate some of the factors that drive energy efficiencies, a closed form expression for the EE is developed and used in a numerical study of energy efficiencies for both SISO and MIMO communications over flat fading channels. Some of the assumptions used in the analysis include the following: a) The symbol data rates $R_s$ are held constant and are identical for all data streams; b) Errors that occur in the preamble and the checksum are neglected and c) The transmit power associated with each packet is constant and identical from packet to packet. In quadrature amplitude modulation (QAM) schemes with modulation order M, if the symbol data rates $R_s$ are identical for all the modulation schemes, the bit data rate $R_b$ is proportional to the square root of the modulation order, i.e. $R_b = \log_2(M) R_s$. Hence, quadrature phase shift keying (QPSK) and M-QAM symbols have half and $1/\log_2(M)$ the energy of binary phase shift keying (BPSK) symbols respectively.

3.1.1 Transmit Power

As indicated in (1.4) and (1.5), the EE primarily depends on the transmit power $P_T$ and energy consumption of other subsystems for specific packet structure, the drain efficiency of the PA, and transmission strategy (e.g. PAPR). The required transmit power $P_T$ for decoding depends on the link-budget in free space and the sensitivity requirement, where the sensitivity denotes the minimum signal level to decode the received data for a specific data rate and a specific SNR per bit value:

$$P_T = \frac{(4\pi)^2 d_{tr}^2}{G_T G_R \lambda^2} \cdot F \cdot R_b \cdot N_o \cdot \left(\frac{E_b}{N_o}\right). \tag{3.1}$$

Here $d_{tr}$ is the transmit distance, $G_T$ and $G_R$ are the transmitter and receiver antenna power gains, λ is the wavelength of center frequency $f_c$, F is the receiver front-end noise factor, $R_b$ is the data rate, $N_o$ is the thermal noise power spectrum density, and $E_b$=$N_o$ is the required SNR per bit for a given PER, where $E_b$ is the energy per bit. $E_b$=$N_o$ is independent of data rate, but $P_{PA}$ linearly depends on the data rate.

3.1.2 Transmit Power Vs. Other Subsystem Power Consumption

To compare the relative power consumption of all components in the system analysis, the ratio of the power consumption of TX, RX and BB subsystems to all of the power consumed in the system is defined as $$\rho_{trb} = \frac{P_{tx} + P_{rx} + P_{bb}}{P_{pa} + P_{tx} + P_{rx} + P_{bb}} \times 100\% \tag{3.2}$$

$$P_{bb} = P_{dsp}^0 f_{clk}$$

where $P_{dsp}^0$ represents the average power consumption per clock cycle for the BB core in active mode and $f_{clk}$ is the clock frequency.

Table 3.1 exemplifies the relative power consumption among these subsystems. The table shows typical power consumption numbers for Wideband CDMA (WCDMA), global system for mobile (GSM), 802.11n, and Bluetooth transceivers. Suppose that a $P_{dsp}^0$=120 μW/MHz DSP/MCU core is used to implement the BB of WCDMA, GSM, Bluetooth and 802.11n respectively. For the comparison, we have assumed a fixed realizable PA efficiency of 40%. The WCDMA and GSM transceivers have a transmission range greater than 10 Km and have the highest RF transmit power 5 Watt (37 dBm). The 802.11n transceiver has an intermediate range on the order of tens of meters. Bluetooth has the shortest transmission range and the lowest power consumption. The power consumption associated with these transceivers is calculated in Table 3.1.

For the WCDMA and GSM transceivers, the transmit power PT is much higher than that of all other circuits and $\rho_{trb}$ is less than 2.5%. In long-range transceivers, power consumption is dominated by the RF transmit power (which consumes more than 97.5% energy budget), but in short range transceivers the power can be dominated by circuit power consumption, e.g., for BB, TX and RX blocks. In either case, circuit power consumption can potentially be reduced by the use of advanced complementary metal-oxide semiconductor (CMOS) fabrication processes. Reductions of one or two orders of magnitude may be possible with three-dimensional (3D)-CMOS technologies. Therefore in terms of energy cost, circuit power consumption of BB, TX and RX subsystems in future systems may become negligible in comparison to RF transmit power consumption. In literature, the energy consumption of electronic circuits is often neglected in systems analysis. Based on the results in the table, this assumption appears to be particularly appropriate in long-range communications where transmit energy consumption is expected to dominate.

TABLE 3.1

Power Consumption of Short and Long-range Transceivers

| Subsystem | GSM | WCDMA | Bluetooth | 802.11n |
|---|---|---|---|---|
| Clock, $f_{clk}$ (MHz) | 400 | 400 | 200 | 400 |
| BB, $P_{bb}$ (mW) | 48 | 48 | 24 | 48 |
| RX, $P_{rx}$ (mW) | 50 | 138 | 30 | 275 |
| TX, $P_{tx}$ (mW) | 138 | 92 | 12 | 280 |
| $P_r$ (W) | 5 | 5 | $10^{-2}$ | 0.1 |
| $\rho_{trb}$ | 1.9% | 2.2% | 96.4% | 70.7% |

3.1.3 Transmit Energy Performance

The transmit energy consumption of a packet-based communications system is a function of PER which in turn depends on various factors, including data rates, $E_b$=$N_o$ and packet size. For SISO system, a fundamental tradeoff exists between EE and SE because although higher data rates for a fixed symbol power leads to more efficient data delivery (but not necessarily successful decoding), the reduced $\gamma_b$=$E_b$/$N_o$ results in higher bit errors and hence increased packet erasures, thus increasing the number of retransmissions and the overall transmit energy required for the successful transmission of data bits.

In coded systems, the BER (and hence PER) depends on the SNR per bit (i.e. $\gamma_b$) and channel coding/decoding schemes. In this analysis, a convolutional code ($k_c$, $n_c$, $\upsilon$) with rate $r_c$=$k_c$/$n_c$, constraint length $\upsilon$ and Viterbi decoders will be assumed in the system. For a coded system with soft decision maximum likelihood (ML) decoding on an AWGN channel, the information bit error rate $p_b$ is bounded by $$p_b \leq \frac{1}{2k_c}\sum_{w=d_{free}}^{\infty} D_w \mathrm{erfc}\left(\sqrt{\frac{wr_cE_b}{N_o}}\right), \tag{3.3}$$

where $d_{free}$ is the minimum free distance of codes and $D_w$ is the weight distribution with the code (Hamming) weight w. erfc( ) function is defined as $$\mathrm{erfc}(x) = \frac{2}{\pi}\int_x^{\infty} \exp - \mu^2\, d\mu.$$

Assuming uniformly distributed errors in the received data, the PERs for the jth signal stream can be calculated for the packet-based erasure scheme (with $L_d$ data payload bits) and the sub-packet-based erasure scheme (with $L_d$/$N_t$ data payload bits) respectively using:

$$\mathrm{PER}^{(j)}-1-(1-p_b)^{L_d}, \mathrm{PER}^{(j)}=1-(1-p_b)^{L_d/N_t}. \tag{3.4}$$

When corrupted packets are detected, from the definition in (1.6) and PA/RF transmit power in (1.4) and (3.1), the average transmit EE $\eta_{ee}$ (Joule per successful bit) for all the data bits (excluding the overhead) is derived as follows:

$$\eta_{ee} = \frac{L_d + N_t(L_p - L_d)}{N_t R_b L_d \sum_{j=1}^{N_t}(1 - PER^{(j)})}\eta_t P_{out} = \frac{[L_d + N_t(L_p - L_d)]\eta_t N_o BW}{N_t R_b L_d \sum_{j=1}^{N_t}(1 - PER^{(j)})}\cdot\frac{(4\pi)^3 d_{tr}^2 F}{G_T G_R \lambda^2}\cdot\gamma_s, \tag{3.5}$$

where $L_d$ is the data-payload size, $L_p$ is the packet size and BW is the noise bandwidth (typically receiver bandwidth) occupancy of the transmitted signals. The SNR $\gamma_s$ is defined as $E_bR_b$/$N_o$BW.

From (3.3), (3.4) and (3.5), approximations for the PER and EE depend on the expressions for the average SNR per bit. In MIMO architectures with full spatial multiplexing, using the linear minimum mean-square error (MMSE) receiver without considering interference signals on AWGN channels, the instantaneous SNR on the s-th (s=1, 2, . . . , $N_t$) spatial stream can be expressed as [64, 107, 108]

$$SNR_s = \frac{1}{\left[\left(I_{N_t} + \frac{1}{N_r}H^{\dagger}H\right)^{-1}\right]_{ss}} - 1, \tag{3.6}$$

where $I_{N_t}$ is an $N_t$x$N_t$ identity matrix, and $H^{\dagger}$ is the Hermitian transpose of H whose (i,j) elements at time instant k at the lth delay are $h_{i,j}$[l, k] shown in (2.17). The average SNR value can be determined by taking the expectation of the instantaneous $SNR_s$ in (3.6).

3.1.4 Numerical Results

A numerical analysis based on (3.5) has been conducted to quantify the energy consumption among packets with different payload sizes and erasure schemes, data rates, and modulation schemes. Following the data structure in Section 1.3, the payload $L_d$ was set to either 128 bits or 256 bits. With the packet and sub-packet erasure methods, Monte Carlo simulations were employed to estimate the average EE. A Rayleigh channel with low spatial correlation was simulated, where $CPR^{(n,m)}$[l]=0 dB in (2.10), $XPD_v^{(n,m)}$[l]=$XPD_h^{(n,m)}$[l]=15 dB in (2.9) and correlation parameters are shown in Table 3.5. Other parameters were set as shown in Table 3.2. The transmit power associated with each packet was constant and the total transmit power employed by the different architectures was identical to the total power of the SISO BPSK case.

TABLE 3.2

System Parameters of Simulation

| Parameters | Value | Parameters | Value |
|---|---|---|---|
| $f_c$ | 2.45 GHz | Convolutional code | $r_c$ = ½, v = 7 |
| $G_tG_r$ | 3 dBi | $\eta_t$ | 0.35 |
| BW | 10 MHz | Symbol rate $R_s$ | 1 Million Symbols/s |
| $N_o$ | −174 dBm/Hz | $d_{tr}$ | 1000 meters |

TABLE 3.2-continued

| System Parameters of Simulation | | | |
|---|---|---|---|
| Parameters | Value | Parameters | Value |
| $L_p$ | $L_d + 32$ | Number of packets, $N_d$ | $10^4$ |

Figure 7:
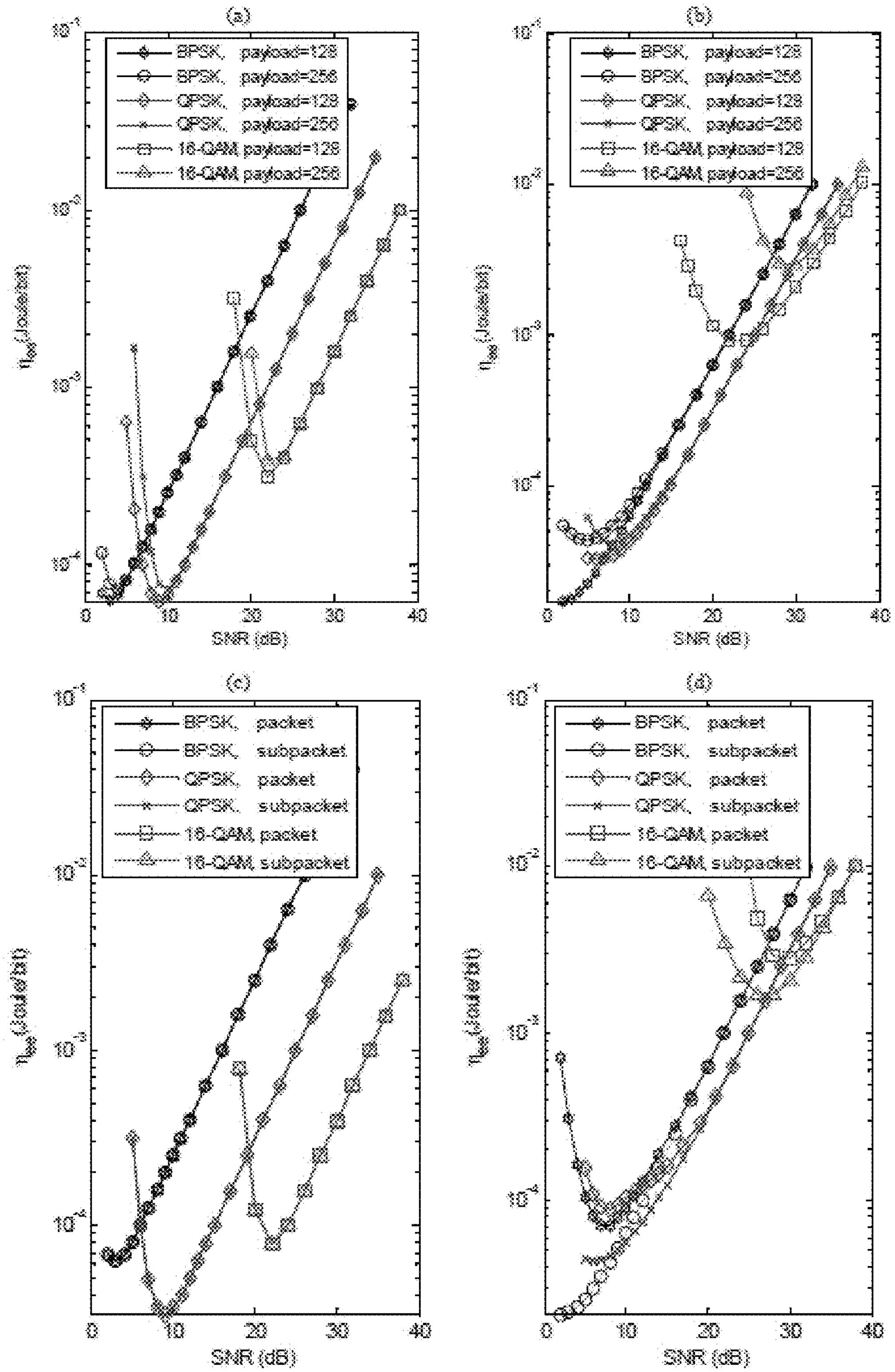
FIGS. 7*a-d* shows average transmit energy efficiencies for 1 Mbps BPSK, 2 Mbps QPSK and 4 Mbps 16-QAM. (a) SISO and (b) 4×4 MIMO with different payloads. (c) SISO with packet erasure scheme with (128-bit payload) and (d) 4×4 MIMO architecture with sub-packet erasure scheme (128-bit payload).

FIG. 7 shows average transmit energy efficiencies for 1 Mbps BPSK, 2 Mbps QPSK and 4 Mbps 16-QAM. (a) SISO and (b) 4×4 MIMO with different payloads. (c) SISO with packet erasure scheme with (128-bit payload) and (d) 4×4 MIMO architecture with sub-packet erasure scheme (128-bit payload). Based on simulations, FIG. 7 (*a*) presents the EE associated with the different packet sizes and different data rates for BPSK, QPSK and 16-QAM respectively for SISO architectures. $\eta_{ee}$ in the plot denotes the energy consumption in Joules per successful bit. A lower $\eta_{ee}$ value in the plot indicates lower energy consumption, or equivalently, a higher energy efficiency. The results indicate that for higher order modulation schemes at high SNRs, better EE is obtained for higher data rates due to the shorter packets (fewer symbols) and fewer retransmissions. FIG. 7 (*b*) shows similar results for the 4×4 MIMO architecture. At lower SNR, shorter packet sizes tend to have improved efficiencies than the longer packets. At lower SNR lower data rates also tend to have improved energy efficiencies. It is also observed that 16-QAM consumes average transmit energies per successful bit that are nearly four times and two times less than for BPSK and QPSK modulation schemes at high SNR levels. FIGS. 7 (*c*) and (*d*) illustrate the numerical results for both SISO and 4×4 MIMO cases based on packet and sub-packet erasure schemes with different modulation schemes (data rates) for a data payload of 128 bits. All of the MIMO architectures show EE improvements due to fewer retransmissions associated with the sub-packet erasure approach.

These numerical results were based on an approximation derived assuming a flat fading channel. To investigate the EE performance in frequency-selective channels, an emulation testbed was employed, which is described in the next section.

3.2 SP-MIMO Testbed

An analysis of EE assuming a sub packet erasure scheme was further considered in frequency-selective channels using a SP-MIMO testbed. The testbed integrates wideband signal generation, polarimetric MIMO channel emulation, coherent receiver channels (needed for polarization processing), and a digital signal processing platform that incorporates a graphics processor unit (GPU). Signal processing is performed in Matlab with signal processing acceleration provided by an NVIDIA GPU. This testbed provides a formidable platform to evaluate MIMO communications and signal processing methods in a hybrid hardware/software environment.

3.2.1 Testbed Architecture

Figure 8:
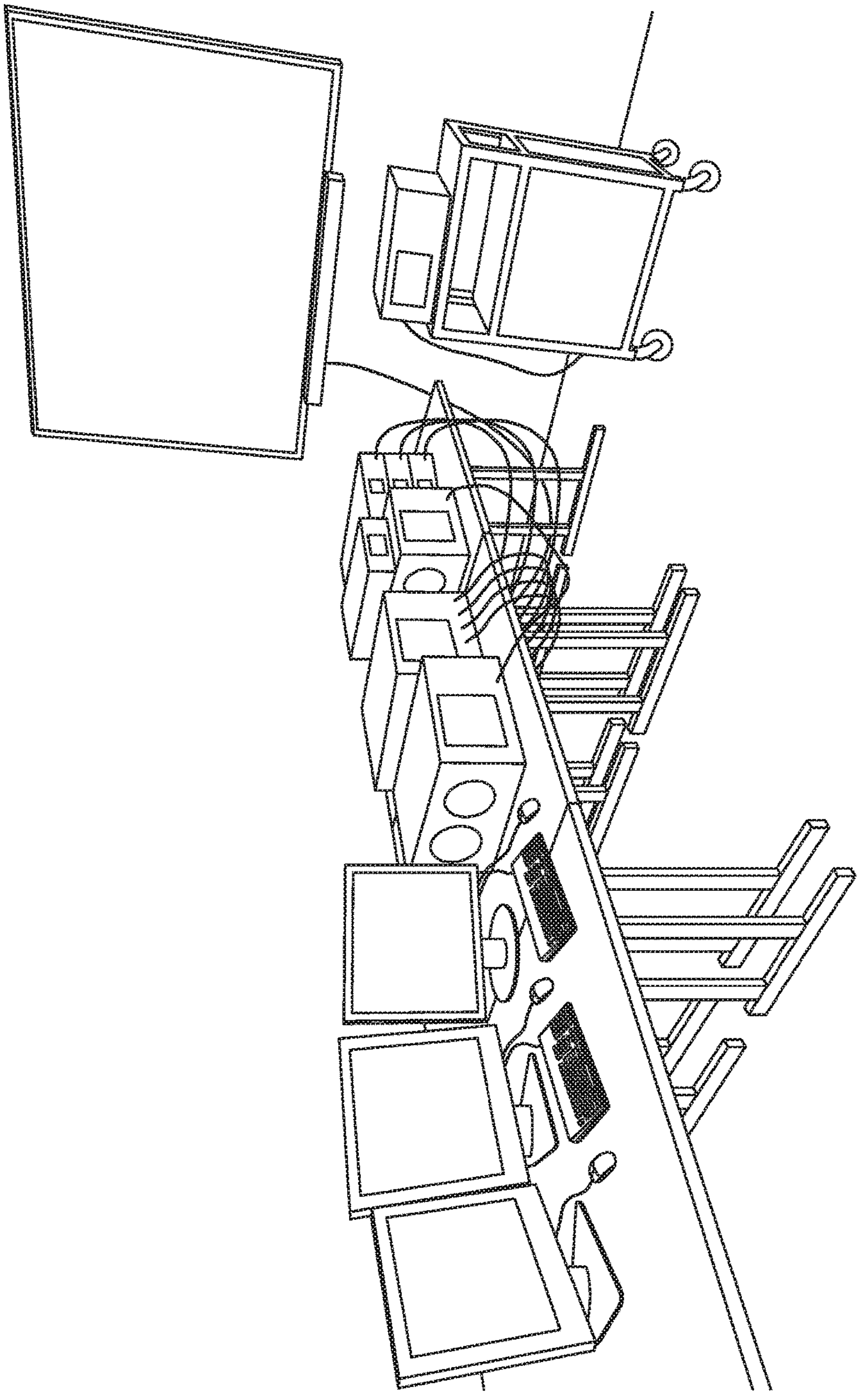
FIG. 8 shows a space-polarization MIMO Communications Testbed.
Figure 9:
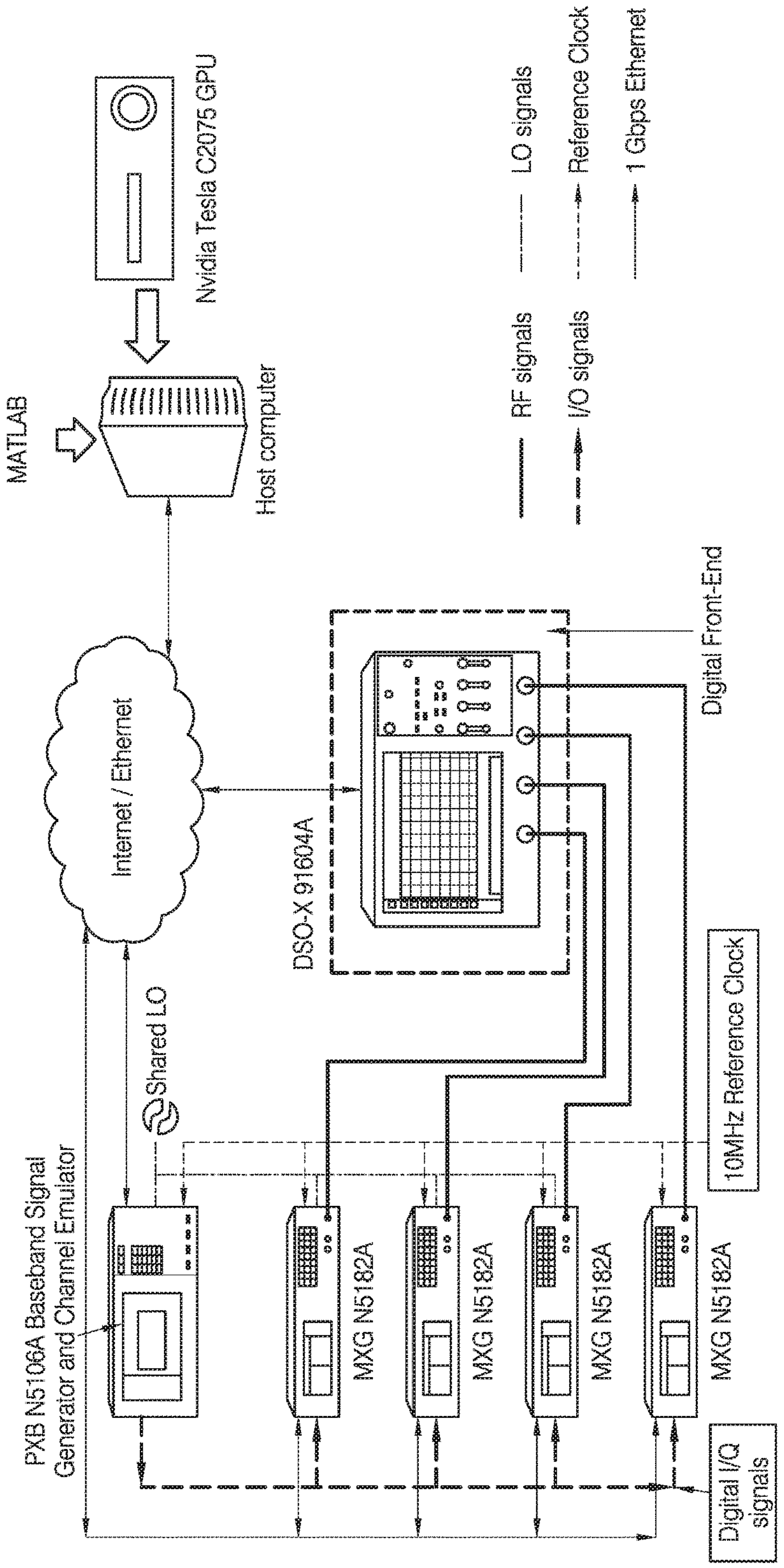
FIG. 9 shows a system architecture of a 4×4 SP-MIMO testbed platform.

A picture of the SP-MIMO communications testbed is shown in FIG. 8. The testbed includes instrumentation for arbitrary waveform signal generation and MIMO channel emulation using the Agilent N5106A system; baseband-to-RF conversion using the inphase and quadrature (IQ) inputs of the Agilent N5182A; coherent reception of up to four RF channels using an Agilent high-performance oscilloscope DSO 91604A; and signal processing using an HP Z800 workstation equipped with an NVIDIA Tesla C2075 GPU board to accelerate signal processing. FIG. 9 shows a system architecture of a 4×4 SP-MIMO testbed platform. FIG. 9 shows the configuration for an RF-based analysis, in which I and Q outputs from each MIMO output channel are used to drive N5182A signal generators that mix the baseband signal to RF. The testbed can simultaneously transmit the data through emulated physical channels associated with four transmit antennas. Frequency synchronization, which is needed to limit intercarrier interference in the demodulation processing, is achieved through use of a high-precision 10 MHz reference generated by a Rubidium atomic clock. The common reference assures that frequency drift between the transmitter and the receiver does not occur. Phase offsets introduced by frequency offsets are compensated via channel estimation and subsequent equalization.

3.2.1.1 MIMO Arbitrary Waveform Generator and Channel Emulator

Four independent baseband signals can be programmed and simultaneously played by the Agilent N5106A PXB baseband generator. It also provides a channel emulation function enabling real-time fading with programmable channel parameters, such as path delays, path gains, angle spread, azimuth power spectrum, correlations, fading Doppler spectrum and antenna configurations etc.

3.2.1.2 RF Front-Ends

The digital baseband signals from IQ ports of the channel emulator are upconverted to an intermediate frequency range using an RF up-converter inside the MXG N5182 RF vector signal generator. MXG N5182 offers 100 kHz to 3 GHz frequency with an electronic attenuator.

3.2.1.3 Coherent Receiver

An Agilent Infiniium DSO-X 91604A oscilloscope with four input channels is used as a phase-coherent receiver to capture the upconverted RF signals from the MXG units. The digital scope provides up to one-billion acquisition samples per channel. The collected samples are then ported to the host computer for signal processing and detection.

3.2.1.4 Host Computer

The host computer connects with the N5106A PXB baseband generator and channel emulator, the MXG N5182 vector signal generators and the Infiniium DSO-X 91604A digital oscilloscope via high speed Ethernet. Using this connectivity, the host computer loads the waveform data to the PXB baseband generator, configures the channel emulator, and commands the PXB instrument to playback the baseband signals. Concurrently the digital oscilloscope is configured and triggered by the host computer to capture waveforms on RF signals from the MXG N5182. When the capture is completed, the host computer fetches the captured data from the digital oscilloscope and processes the data inside the MATLAB signal processing environment. The host computer is additionally equipped with NVIDIA GPU boards to serve as co-processors for parallel computing.

3.2.2 Signal Processing

Figure 10:
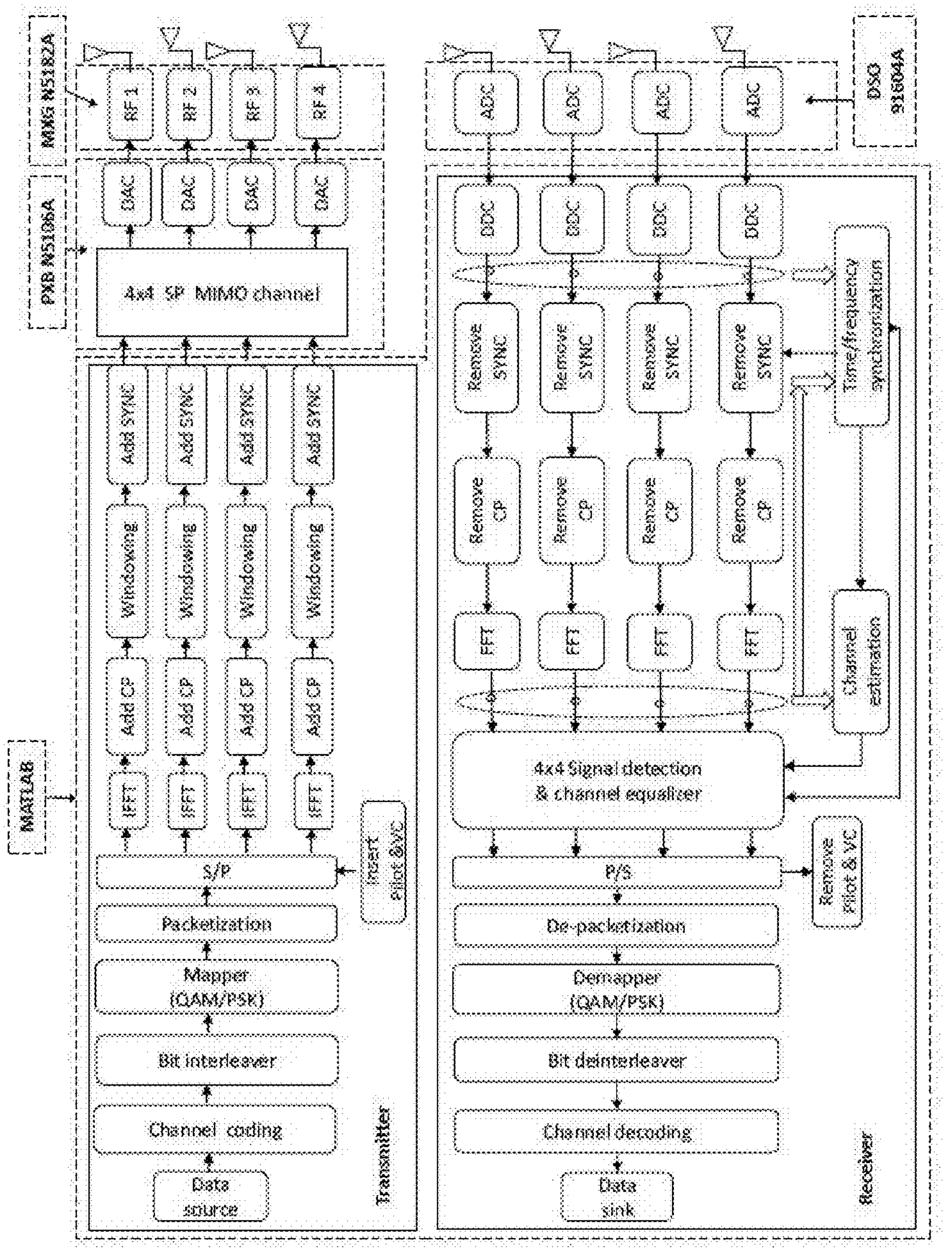
FIG. 10 is a block diagram of implementation of a MIMO-OFDM system.

An OFDM transmission scheme was used to evaluate SP-MIMO and other systems over multipath fading channels. FIG. 10 is a block diagram of implementation of a MIMO-OFDM system. The instantiation of the various processing blocks in the testbed for the SP-MIMO-OFDM system architecture is illustrated in FIG. 10. The data bits to be transmitted may optionally be encoded by a channel encoder block and passed through an optional interleaver. The encoded signals are then mapped into a signal constellation (e.g. QAM, phase-shift keying (PSK) etc.) by a mapper block. The resulting symbols are combined blockwise using a serialto-parallel (S/P) module, and are then loaded onto orthogonal data subcarriers at the input to an N-point inverse fast Fourier transform (IFFT). Pilots and virtual subcarriers (guard subcarriers) are also loaded into reserved subcarriers. Following an inverse fast Fourier transform (IFFT) block, the time-domain signal samples at the output of the IFFT are extended with a cyclic prefix (CP) to minimize the intersymbol interference (ISI). To reduce the out-of-band or leakage power of the OFDM symbols, a time-domain shaping function such as a raised cosine (RC) windowing function can optionally be used to window the OFDM packets. After the parallel to serial (P/S) block, packets of the OFDM signals are framed and then multiplexed to the transmit channels and passed to the N5106A channel emulator and signal generator to be loaded into the transmit signal buffers. Each packet incorporates a preamble at the head of packet to support synchronization and one or more databearing OFDM symbols. A preamble structure and training symbols using pilots for synchronization and channel equalization are applied in the MIMO-OFDM system. $N_t$ preamble segments are used, each having S samples with the guard interval of length $N_g$, where pilots are designed in the preamble structure. Note that an S-sample segment is generated using non-zero pilot subcarriers spaced one or more subcarriers apart, and are transformed to a time domain signal by an N-point IFFT and taking only the first S samples. The framed OFDM packets from $N_t$ transmitters are then "played" through the emulated $N_r$x$N_t$ space-polarization MIMO channels. The resulting analog baseband IQ signals at the output of the channel emulator are up-converted to a high frequency signal which enables coherent reception of up to four signals using the digital sampling scope.

The digital oscilloscope operates as a coherent wide-band receiver. It captures RF signals from $N_r$ channels and converts them into digital samples by high-speed acquisition units. Blocks of samples from acquisition units are transferred to the host computer for processing with the MATLAB programming environment, where the digitized RF signals are digitally down-converted to complex baseband. Time and frequency synchronization modules can optionally be applied to minimize synchronization errors in the baseband OFDM signals due to carrier frequency offsets (CFO), sampling clock offsets (SCO), and symbol timing offsets. After synchronization is achieved, CP removal, fast Fourier transform (FFT), channel estimation and signal detection/equalization are applied. The resulting baseband MIMO-OFDM signals are translated into $N_r$ parallel data streams, which are decoded into digital data by a de-mapper block, an optional de-interleaver and a channel decoder. Finally, the mux block combines and recovers decoded parallel streams to arrive at an estimate of the original data source. The estimated bits from a large number of packets are used to compute various performance metrics, including PER, PER, SE, and transmit energy efficiency.

Most of the signal processing functions, including data source generation, demux/mux, OFDM Tx, digital down conversion (DDC), CP, FFT/IFFT, channel coding/decoding, interleaver/deinterleaver, mapper/demapper, timing/frequency synchronization, channel estimation and signal detection/equalizer are implemented in MATLAB based programming environment. The real-time SP-MIMO channel emulation and signal generation are performed by the PXB N5106. The baseband signals are up-converted RF signals by using the MXG N5182A signal generators. The MXG N5182A signal generator connects with DSO-X 91064A via RF cables (up to $N_r$). The ADC is carried out by high-speed acquisition units inside the DSO-X 91064A, and the digitized RF signals are transferred to the host computer with MATLAB via 1 Gbps Ethernet. AWGN is digitally added in the MATLAB environment.

3.3 Energy Efficiency and Emulation Results in Frequency-Selective Channels

In this section, the relative EE and SE performance among SISO, 2×2 CP-MIMO, 2×2 DP-MIMO and 4×4 SP-MIMO architectures are compared using the frequency selective SP-MIMO channel model described in Section 2 and the SP-MIMO testbed described in Section 3.2. System parameters of the MIMO-OFDM system associated with the tests are listed in Table 3.3. Various channel realizations were considered in the analysis to reflect diverse channel conditions. The random variables $XPD_v^{(n,m)}[l]$ and $XPD_h^{(n,m)}[l]$ were assumed to have a normal distribution with mean $\mu_{XPD}$ and unit variance. Similarly, the random variables $CPR^{(n,m)}[l]$ were assumed to have a normal distribution with mean $\mu_{CPR}$ (i.e. 0 dB in the emulation) and unit variance.

Table 3.4 summarizes key parameters of the 6-path channel models employed in the analysis, including the path delays, the path losses, the Rician K-factor associated with the co-polarized sub-channel within each path (all cross-polarized subchannels are always assumed to follow Rayleigh distributions), the XPD, and the maximum Doppler shift $D_s$ associated with a mobile channel. These values are used in conjunction with the spatial and polarization correlation matrices defining the antenna correlations at the Tx and Rx. The spatial and antenna polarization correlation coefficients for the cross-term entries of the combined spatial-polarization correlation matrices are indicated in Table 3.5. All of the polarization related formulas shown in Section II and the parameters in Tables 3.4 and 3.5 have been used to generate parameters needed to configure the N5106A channel emulator. The SNR of the evaluated systems is referenced to the common v-v link of the SISO architecture to ensure a meaningful comparison between the architectures. The transmit power associated with each packet is constant and the total transmit power of different architectures is identical to the total power used on the SISO case. The AWGN is digitally added to the received signals to achieve SNRs ranging between −6 dB and 36 dB. A rate 3/4 code from the rate 1/2, constraint length 7 convolutional code is created with the optimal puncture pattern $[1\ 1\ 0\ 1\ 1\ 0]^T$ to encode the input data. Viterbi decoding with depuncturing is applied to decode the received bits.

The figures listed in the emulation results section were obtained from utilization of the SP-MIMO communications testbed. Two metrics are used to quantify the system performance of SISO and MIMO architectures: EE and SE. The transmit EE or average transmit energy per successful bit corresponds to the transmit energy required to achieve successfully decoded bits that have not been erased due to packet errors.

TABLE 3.3

MIMO system parameters

| Parameters | Value | Parameters | Value |
|---|---|---|---|
| FFT-point | 1024 | Convolutional code | $r_c = ½$, $v = 7$ |
| Bandwidth BW | 10 MHz | Signal detection | MMSE |
| Useful symbol duration | 22.472 us | Diversity technique | Full multiplexing |
| Modulation | QPSK | $L_p$ | $L_d + 32$ |
| Carrier frequency, $f_c$ | 400 MHz | Number of packets, $N_d$ | 1600 |
| $G_tG_r$ | 3 dBi | $\eta_t$ | 0.35 |
| $N_o$ | −174 dBm/Hz | $d_{tr}$ | 1000 meters |

TABLE 3.4

| 4 × 4 SP-MIMO Rayleigh and Rician Channel models | | | | | |
|---|---|---|---|---|---|
| Model | K (dB) | Path delay (nsec) | Path loss (dB) | μ × PD (dB) | $D_s$ (Hz) |
| Rayleigh | 0, 0, 0, 0, 0, 0 | 0, 40, 100, 320, 460, 1000 | 3, 0, 2, 6, 8, 10 | 2, 2, 2, 2, 2, 2 | 20 |
| Rician | 15, 12, 9, 6, 3, 3 | 0, 40, 100, 320, 460, 1000 | 3, 0, 2, 6, 8, 10 | 10, 8, 8, 6, 3, 6 | 20 |

TABLE 3.5

| Spatial correlation coefficients for different 4 × 4 SP-MIMO channel models | | |
|---|---|---|
| Correlation type | $\rho_t^{(l)}$ | $\rho_r^{(l)}$ |
| Highly correlated | 0.9 | 0.9 |
| Partially correlated | 0.6 | 0.6 |
| Low correlated | 0.1 | 0.1 |
| Un-correlated | 0.0 | 0.0 |

The transmit energy efficiencies for the different MIMO architectures are compared for several different MIMO channel conditions. Results depend strongly on the PER, which in turn depends on a number of factors including the constellation, the SNR, the OFDM symbol size, the number of OFDM symbols in a packet, channel coding, and of course, the channel behavior. The analysis assumes packet structures based on a fixed OFDM symbol size, with packet lengths that depended on the number of streams used for spatial multiplexing as described earlier. Packets for each stream in a 4×4 MIMO architecture contains one-fourth the number of OFDM symbols contained in a SISO packet. Each SISO stream employs 4× more transmit power than each SP-MIMO stream and 2× more transmit power than each CP-MIMO stream and each DP-MIMO stream, and the packets are 4× longer than for SP-MIMO and twice as long as packets for CP-MIMO and DP-MIMO. These factors impact the resulting PER, and hence the average transmit energy per successful received bit.

Figure 11:
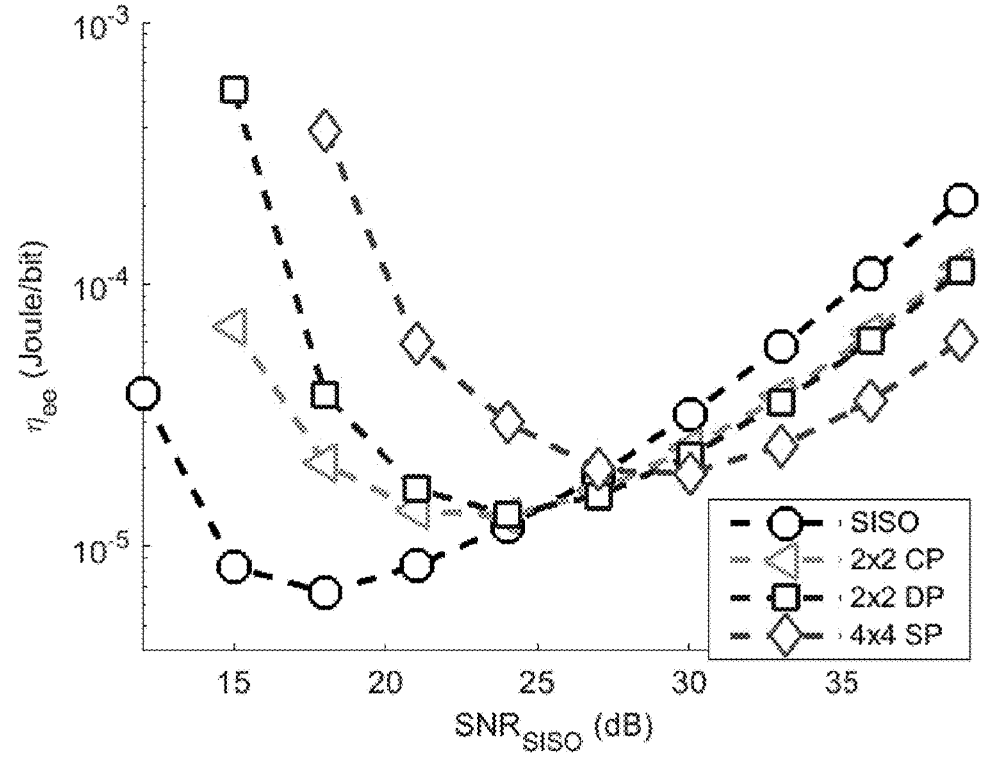
FIG. 11 shows average energy efficiencies $\eta_{ee}$ of coded SISO, 2×2 CP, 2×2 DP and 4×4 SP-MIMO schemes vs. SNRs over a low correlated Rayleigh channel model. $SNR_{SISO}$ is referenced to SNR of SISO case.
Figure 12:
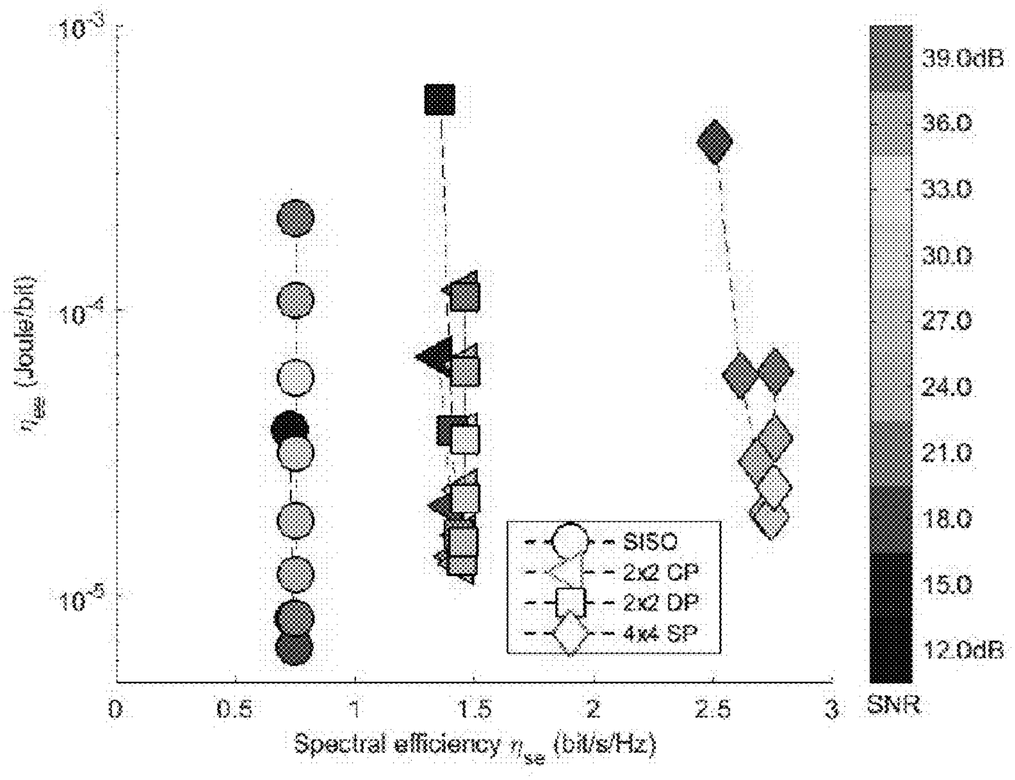
FIG. 12 shows average energy efficiencies $\eta_{ee}$ of coded SISO, 2×2 CP, 2×2 DP and 4×4 SP-MIMO schemes vs.

FIG. 11 shows average energy efficiencies $\eta_{ee}$ of coded SISO, 2x2 CP, 2x2 DP and 4x4 SP-MIMO schemes vs. SNRs over a low correlated Rayleigh channel model. $SNR_{SISO}$ is referenced to SNR of SISO case. In FIG. 11, the energy efficiencies for different MIMO architectures are shown as a function of SNR for one of the emulated SP-MIMO channels (a low-correlated Rayleigh channel). The corresponding spectral efficiencies are shown in FIG. 12. FIG. 12 shows average energy efficiencies $\eta_{ee}$ of coded SISO, 2x2 CP, 2x2 DP and 4x4 SP-MIMO schemes vs. average spectral efficiency $\eta_{se}$ vs. SNRs over a low correlated Rayleigh channel model. The emulation results suggests that at high SNR, the SP-MIMO provides nearly a 1.5× improvement in the EE than for 2x2 CP-MIMO and a 3.5× improvement over SISO. The SE results shown in FIG. 12 indicate that in rich scattering environments, SP-MIMO architectures provide approximately a four-fold improvement in SE over SISO and a two-fold improvement over CP-MIMO architectures. These SE gains are realized particularly at higher SNRs. The specific performance improvements depend heavily upon the particular channel characteristics. When the channel is Rician with partial or high spatial correlated (see Table 3.6), both the EE and the SE of SP-MIMO and CP-MIMO architectures degrade due to the reduced spatial rank of the channel and its ability to support full multiplexing schemes over this dimension. SISO can outperform the MIMO architectures, especially at lower SNR, but the SEs of SISO are less than those of MIMO architectures. When the SNR is low (e.g. 5 dB), the SISO performs better than DP-, CP- and SP-MIMO architectures because the PER/PER of the SISO is the lowest among these structures. Hence there is a tradeoff between the EE performance and the SE. When the SNR is large (e.g. 20 dB), the PER rates of the MIMO structures are reduced sufficiently to yield better energy efficiencies relative to SISO. The figure also suggests a locally optimal operating point for each architecture that yields near-maximum SE with a local minimum in energy consumption.

Table 3.6 summarizes the relative EE performance at high SNRs between the different MIMO architectures over different fading channel types. In an uncorrelated Rayleigh channel, EE gains of SP-MIMO, DP-MIMO, CP-MIMO are approximately 3.9, 2.25, and 2.25 with respect to the EE of SISO. However, the gains in the EE over a partially correlated Rayleigh channel decrease to 1.4, 1.65, and 1.0 for SP-MIMO, DP-MIMO and CP-MIMO respectively due to increased PER caused by increasing spatial correlations in the co-polarized entries of channel matrix. When the channel is highly Rician (e.g. K=60 dB), the space channels become highly correlated, and the energy efficiencies of CP-MIMO and SP-MIMO deteriorate dramatically as the channel becomes rank-deficient. In these cases, the PER increases due to highly-correlated or fully-correlated off-diagonal channel matrix terms. This condition could potentially be avoided through adaptive transmission schemes if channel state information was available at the transmitter. In these same channels, DP-MIMO achieves an EE gain of approximately 2.25 due to the diversity available to the dual-polarized architecture and since the DP-MIMO architecture is not impacted by the space correlation behavior of the channel.

From both emulation-based results and numerical results, several tradeoffs between the SE, EE, packet size and modulation schemes are observed: SE-EE tradeoff: a SE-EE curve for each architecture indicates a point along the SE axis where the energy consumption is minimum near the highest SE associated with the architecture (e.g. In FIG. 12, this SE is 0.80, 1.61, 1.56, and 3.1 bit/s/Hz for SISO, CP-MIMO, DP-MIMO and SP-MIMO respectively). At this operating point, the system achieves near-maximum SE and a local minimum in energy consumption. EE-packet size tradeoff: higher energy consumption occurs with increased packet size. Smaller packet sizes are expected to yield higher energy efficiencies. However, this generalization will breakdown at a point when the energy consumption due to the overhead symbols within a packet become non-negligible. EE-modulation scheme tradeoff: in MIMO architectures, in the high SNR regime, higher EE is achieved by higher-order modulation schemes. At low SNR the SISO exhibits better EE performance, but at the expense of lower SE.

TABLE 3.6

| Comparison of average energy efficiencies $\overline{\eta}_{cc}$ (at SNR = 30 dB) among different MIMO architectures (Joule/bit) | | | | |
|---|---|---|---|---|
| Channel model | SISO | CP-MIMO | DP-MIMO | SP-MIMO |
| Rayleigh, low correlated | $3.3 \cdot 10^{-5}$ | $1.4 \cdot 10^{-5}$ | $1.4 \cdot 10^{-5}$ | $1.3 \cdot 10^{-5}$ |

TABLE 3.6-continued

Comparison of average energy efficiencies $\overline{\eta}_{cc}$ (at SNR = 30 dB) among different MIMO architectures (Joule/bit)

| Channel model | SISO | CP-MIMO | DP-MIMO | SP-MIMO |
|---|---|---|---|---|
| Rayleigh, partially correlated (CPR = 3 dB) | $5.2 \cdot 10^{-5}$ | $4.8 \cdot 10^{-5}$ | $3.0 \cdot 10^{-5}$ | $4.4 \cdot 10^{-5}$ |
| Rayleigh, un-correlated | $3.3 \cdot 10^{-5}$ | $1.4 \cdot 10^{-5}$ | $1.4 \cdot 10^{-5}$ | $9.6 \cdot 10^{-5}$ |
| Rician, partially correlated | $4.7 \cdot 10^{-5}$ | $1.7 \cdot 10^{-2}$ | $1.7 \cdot 10^{-5}$ | $3.6 \cdot 10^{-4}$ |
| Highly Rician, highly correlated (K = 60 dB) | $3.3 \cdot 10^{-5}$ | 0.69 | $1.4 \cdot 10^{-5}$ | 0.58 |

In the next chapter, when channel state information (CSI) is available at the Tx, adaptive transmission based on linear precoding techniques can be employed to improve the EE of MIMO architectures with spatial and polarization diversity under partially-correlated and highly-correlated channel conditions.

Chapter 4

Transmit Energy Efficiency of Linearly Precoded MIMO Systems

In this chapter, the transmit EE of long-range wireless communications from battery-powered unmanned aircraft vehicle (UAV)s over packet erasure channels is analyzed for space- and polarization-based MIMO architectures with and without linear precoding. Adaptive MIMO transmission techniques based on linear precoding and power control strategies are considered to achieve high energy efficiencies in packet erasure channels. The strategies are applied in both simulated air-to-ground (A-to-G) and ground-to-ground (G-to-G) communications channels for UAVs. Theoretical and emulation results generated from a hybrid hardware/software testbed indicate that when packet erasures are considered, 4×4 MIMO architectures with precoding can offer significant EE gains relative to non-precoded MIMO systems. In the lower SNR regime, it is found that operating points exist for the different MIMO architectures that provide near maximum SE (for the given symbol rate, the constellation and the number of spatial beams) while operating at a local minimum in energy consumption. At these operating points, transceiver operating times are determined for a range of battery capacities.

The chapter is structured as follows. Section 4.1 describes the uplink (UL)/downlink (DL) signals, and the block structures that are adopted for the study. Section 4.1.2 explains the MIMO linear precoding schemes, while Section 4.2 describes the energy metric used to characterize EE performance and presents a derivation of the EE gain of MIMO architectures relative to SISO for the high SNR case. Battery lifetime as a function of the required SNR is also derived in this section. A MIMO-OFDM testbed is briefly described in Section 4.3 that enables comparisons between SISO, CP-MIMO, DP-MIMO, and SP-MIMO architectures. Emulation results from the testbed are presented in Section 3.3.

4.1 System Model

4.1.1 Signals on the Uplink and Downlink

In premise of this work is that the channel changes slowly and is reciprocal, so that the US can acquire CSIT through reverse channel information, for example in a TDD mode without utilizing spectral and temporal resources, e.g. channel feedback methods. The communication links are assumed to operate in a TDD fashion on the same frequency in a half-duplex mode as indicated in FIG. 13. FIG. 13 is an illustration of uplink (UL) and downlink (DL) between the unmanned station (US) and the ground station (GS) (blue and orange blocks show UL and DL slots respectively). The UL is from the GS to the US and the DL is from the US to the GS. In the UL slot, pilot and control signals are transmitted by the GS. The purpose of the pilot signals is to permit the US to perform synchronization, channel estimation and equalization and to acquire CSIT for linear precoding. The control signals are to enable control of the US and for air traffic control communications. In the DL slot, pilot signals and data packets are delivered by the US. Assuming the GS and the US are equipped with NT transmit and NR=NT receive antennas, NT preamble segments are used, each having Np samples with the guard interval of length Ng, where pilots are designed into the preamble structure. Ideal channel estimation is assumed on the UL and DL signals. Pilot design strategies known in the art can be used to help acquire accurate channel estimates. For example, to improve the SNR of each pilot, each Qth subcarrier out of the N subcarriers in the preamble can be used as a pilot tone, while the remaining subcarriers are nulled. The resulting pilot power increases by a factor Q, leading to enhanced channel estimation accuracy.

The goal in the analysis is to estimate the transmit EE of different MIMO architectures when CSIT is available at the US. It is found that systems employing CSIT can significantly improve the EE over systems without CSIT and that for each architecture, operating conditions exist that lead to an optimum in EE at near maximum SE.

Other assumptions used in the analysis include the following: 1. Both the US and the GS are equipped DP antennas with aspect-insensitive gains over the geometries of interest. 2. The MIMO subchannel spatial and polarization correlations are independent. 3. The antenna space correlations at the Tx and Rx are uncorrelated; similarly for the antenna polarization correlations. 4. Both the US and GS have channel state knowledge. This can be acquired, for example in TDD systems, from open-loop channel acquisition using pilots on both UL and DL, where the channel on the DL is identical to the transpose of the channel on the UL (reciprocity principle). Ideal channel state information at both ends is assumed.

4.1.2 MIMO Linear Precoding

When channel state information is available at the US, linear precoding at the transmitter (and subsequent decoding at the receiver) can be employed to improve the system performance. In this section, a minimum mean square error (MMSE) linear precoder/decoder design is considered that minimizes the sum of the output symbol estimation errors across all subchannels, where the weakest eigenmodes are dropped and the transmit power is distributed among the remaining eigenmodes (more power is allocated to the weaker eigenmodes and vice versa). Precoder and decoder designs are applied to communications over the frequency-selective G-to-G and A-to-G channels.

A multicarrier system employing OFDM modulation is assumed. As shown in FIG. 13, block transmission is utilized with guard symbols inserted between UL and DL slots to prevent intra-block interference. Each OFDM symbol comprises $N_{sc}$ sub-carriers (frequency bins), where the number of sub-carriers is selected so that each subchannel exhibits a flat-fading channel response.

In the case of linear precoding on the DL, the $k_b$th ($k_b \geq 1$) transmit signal block from the US consists of $N_s \cdot N_{sc}$ symbol vectors of size $N_B$, where $N_B \leq \text{rank}(H_k^i) \leq \min(N_T, N_R)$ is the number of parallel transmitted streams and $N_s$ is the number of symbol vectors (each vector has NB OFDM symbols) during the DL slot. Let $X_k^i$ represent the $N_B \times 1$ transmitted vector for the ith symbol vector and the kth subcarrier, and $F_k^i$ the $N_T \times N_B$ precoder matrix used at the US. The decoded signals at the receiver, $\hat{X}_k^i$ on the kth (k=0, 1, . . . , $N_{sc}-1$) sub-carrier for the ith (i=0, 1, . . . , $N_s-1$) symbol vector can be modeled as $$\hat{X}_k^i = G_k^i H_k^i F_k^i X_k^i + G_k^i W_k^i, \tag{4.1}$$

where $H_k^i$ is an $N_R \times N_T$ DL channel transfer matrix in the frequency domain, $W_k^i$ is the $N_R \times 1$ AWGN noise vector on the kth sub-carrier at the given symbol time, and $G_k^i$ is the $N_B \times N_R$ decoder matrix used at the GS. It is assumed that $$E\{x_k^i (x_k^i)^H\} = I_{N_B},$$

$$E\{W_k^i (W_k^i)^H\} = R_{nn,k}^i,$$

$$E\{X_k^i (W_k^i)^H\} = 0, \tag{4.2}$$

where the superscript $(\ )^H$ denotes the conjugate transpose and E { } is the expectation operation. In above assumptions, the average power of transmitted vector is normalized to unity and the average noise power is characterized by an autocorrelation of the noise vector. The transmitted signal vector is uncorrelated with the noise signal vector.

The precoder and decoder are jointly designed based on the MMSE criterion associated with symbol estimation errors across all subchannels with the total transmit power constraint $P_T$ and $N_B$ data streams. The method for finding $F_k^i$ and $G_k^i$ invokes the following optimization formulation:

$$\min_{G_k^i, F_k^i} J = E\left\{\left\|\Lambda_W^{\frac{1}{2}} e\right\|^2\right\} = \text{tr}[\Lambda_w R_{err}(G_k^i, F_k^i)], \quad \text{subject to: } \text{tr}\left(F_k^i (F_k^i)^H\right) = P_T, \tag{4.3}$$

where e is the estimation error vector, which is equal to $X_k^i - (G_k^i H_k^i F_k^i X_k^i + G_k^i W_k^i)$, tr( ) is the trace operation of the matrix, $\Lambda_W$ is the square root of a diagonal positive definite weight matrix of dimension $N_B \times N_B$, and $R_{err}(G_k^i, F_k^i)$ is the output symbol vector error covariance matrix given by $$R_{err}(G_k^i, F_k^i) = E\{ee^H\}. \tag{4.4}$$

The Lagrange Duality and the Karush-Kuhn-Tucker (KKT) conditions are often utilized to solve the above optimization problem. The Lagrangian for the given constraint is given by:

$$L(\mu, G_k^i, F_k^i) = tr[\Lambda_W R_{err}] + \mu[tr(F_k^i (F_k^i)^H) - P_T], \tag{4.5}$$

where μ is the Lagrange multiplier. The KKT conditions can then be used to jointly design an optimal precoder and decoder based on the MMSE criterion associated with symbol estimation errors. The KKT conditions are necessary and sufficient for optimizing $G_k^i$ and $F_k^i$ if and only if there is a μ satisfying the following conditions:

$$\nabla G_k^i L(\mu, G_k^i, F_k^i) = 0,$$

$$\nabla F_k^i L(\mu, G_k^i, F_k^i) = 0,$$

$$\mu_k^i > 0; tr(F_k^i F^H) - P_T \leq 0,$$

$$\mu_k^i [tr(F_k^i (F_k^i)^H) - P_T] = 0. \tag{4.6}$$

By choosing $\Lambda_W = I_{NB}$, the optimal $G_k^i$ and $F_k^i$ can be determined and are given by $$F_k^i = V_k^i \phi_{F,k}^i,$$

$$G_k^i = \phi_{G,k}^i (V_k^i)^H (H_k^i)^H (R_{nn,k}^i)^{-1},$$

$$\phi_{F,k}^i = [(\Lambda_{N_B,k}^i)^{-1} (\mu_k^i)^{-1/2} - (\Lambda_{N_B,k}^i)^{-1}]^{1/2}, \tag{4.7}$$

where $V_k^i$ is an $N_T \times N_B$ orthogonal matrix forming a basis for the range space of $(H_k^i)^H (R_{nn,k}^i)^{-1} H_k^i$, $I_{NB}$ is an identity matrix of dimension $N_B \times N_B$ and $\Lambda_{N_B,k}^i$ is a diagonal matrix containing the $N_B$ non-zero eigenvalues of $(H_k^i)^H (R_{nn,k}^i)^{-1} H_k^i$ in decreasing order from top-left to bottom-right. $\phi_{G,k}^i$ can be any arbitrary full-rank diagonal matrix. $\phi_{F,k}^i$ is the well-known water-pouring solution for transmit power allocation, which de-emphasizes the weaker eigenmodes. With NB spatial beams, the expression for $\mu_k^i$ can be obtained for the MMSE design.

$$(\mu_k^i)^{1/2} = \frac{\sum_{j_B=1}^{N_B} (\lambda_{j_B,k}^i)^{-1/2}}{P_T + \sum_{j_B=1}^{N_B} (\lambda_{j_B,k}^i)^{-1}}, \tag{4.8}$$

where $\lambda_{j_B,k}^i$ is the $j_B$-th ($j_B$=1, 2, . . . , $N_B$) element of the diagonal matrix $\Lambda_{N_B,k}^i$.

4.2 Transmit Energy Efficiency

RF transmit power is assumed to be dominant in the energy consumption analysis. To gauge the relative transmit EE of different architectures, a fixed payload is assumed and the total energy required for delivery of the payload is derived from the average transmit energy per successful bit, taking packet erasures into account. The average transmit EE $\eta_{ee}$ is defined by the ratio of the total transmit energy to the number of received bits in the unerased packets (Joule per successful bit) as follows:

$$\eta_{ee} = \frac{E_{tot}}{N_{good}} = \frac{E_{tot}}{L_d N_{pk}^d (1 - \overline{p}_{pk})}, \tag{4.9}$$

where $E_{tot}$ is the total transmit energy (Joule) over all transmit antennas and $N_{good}$ is the total number of data bits in good/successful packets decoded at the receiver. $N_{pk}^d$ is the number of data packets (excluding the overhead, preamble and control signals, see FIGS. 13 and 2) over all transmit antennas. $\overline{p}_{pk}$ is the average PER, which is dependent on the average BER and the packet size $$\overline{p}_{pk} = 1 - (1 - \overline{p}_b)^{L_d} \text{(SISO)},$$

$$\overline{p}_{pk} = 1 - (1 - \overline{p}_b)^{L_d/N_B} \text{(Others)}, \tag{4.10}$$

where $\overline{p}_b$ is the average BER on the DL between the US and GS.

This can be written this in terms of the SNR of the signal at the receiver. Using a path loss model, the average received signal power $P_R$ after the linear decoder over all $N_R$ receive antennas can be obtained in the form $$P_R = G_T G_R N_f \|GHF\|_F^2, \tag{4.11}$$

where $G_T$ and $G_R$ are the antenna power gains of the Tx and the Rx antennas respectively. $N_f$ is the noise figure at the Rx front-end. $\|\bullet\|_F$ is the Frobenius norm operation, and HF is the channel gain vector with linear precoding at the US and F is constrained by $tr(F_k^i(F_k^i)^H)=P_T$ (see constraints in (4.3)). For non-precoded schemes, F becomes an $N_T \times N_T$ ($N_B=N_T$) diagonal matrix whose entries on the diagonal designates the square root of the equally distributed transmit power $P_T/N_T$. The average transmit EE $\eta_{ee}$ at the US side defined in (1.6) can be rewritten as:

$$\eta_{ee} = \frac{P_T(N_{pk}^d + N_{pk}^p)L_p N_o}{N_B R_s N_{good} P_R} \cdot \left(\frac{P_R}{N_o}\right) = \frac{P_T(N_{pk}^d + N_{pk}^p)L_p}{N_B R_s L_d N_{pk}^d(1-\overline{p}_{pk})} \cdot \alpha_o \cdot \gamma_s, \tag{4.12}$$

where $L_p$ is the total number of bits in a packet including the overhead (see FIG. 2) and $R_s$ is the sample rate used to load OFDM subcarriers. $N_{pk}^P$ is the number of preamble packets for channel estimation and equalization. Information bits in control signals (see FIG. 13) are ignored. $N_o$ is the noise power given by $k_B \cdot T_0 \cdot B_w$, where $k_B$ is Boltzmann's constant $1{:}38\times10^{-23}$ in Joule per Kelvin, $T_0$ is the noise temperature in Kelvin and $B_w$ is the 3-dB noise bandwidth in Hertz. The scaling factor $\alpha_o$ is defined by $N_o/(G_T G_R N_f \|GHF\|_F^2$. The average SNR at the receiver, namely $\gamma_s$, is defined as $P_R/N_o$ where $P_R$ is given in (4.11). To enable comparisons among SISO and different MIMO architectures, systems are compared for similar transmit powers and are reported at the SNR corresponding to the SISO system, i.e. $SNR_{SISO}$. Therefore the average transmit EE becomes a function of $SNR_{SISO}$, i.e. $\eta_{ee}(SNR_{SISO})$.

Suppose $N_B$ (equivalently $N_T$ in non-precoding scenarios) spatial beams are disjointly detected from the same M-ary square QAM constellation, the average BER $\overline{p}_b$ cis given by $$\overline{p}_b = E\left\{\frac{1}{N_B}\sum_{n=1}^{N_B} p_{b,k,n}^i\right\}, \tag{4.13}$$

where $p_{b,k,n}^i$ is the probability of errors in the nth (n=1, 2, . . . , $N_B$) spatial beam of $\hat{X}_k^i$ within the kth subcarrier of the ith symbol. In the presence of ISI at the receiver, $p_{b,k,n}^i$ depends on the signal gain for the nth beam, ISI from other beams and a noise term for that beam of $\hat{X}_k^i$. The nth element of decoded or estimated signal vector $\hat{X}_k^i$ can be written as $$[\hat{X}_k^i] = [G_k^i H_k^i F_k^i]_{nn}[X_k^i]_n + I_{k,l}^i + [G_k^i W_k^i]_n, \qquad I_{k,l}^i = \sum_{\substack{l=1 \\ l\neq n}}^{N_B} [G_k^i H_k^i F_k^i]_{nl}[X_k^i]_l, \tag{4.14}$$

where $[A]_{ij}$ denotes the (i,j)th element of matrix A and $I_{k,l}^i$ is the ISI from the lth beam at the kth subcarrier within the ith symbol. By applying the computation procedures [33] of the probability of error for symbol-by-symbol detection of M-aray square QAM symbols in the presence of ISI to the model in (4.14), the analytic expression for $p_{b,k,n}^i$ is given by $$p_{b,k,n}^i = \frac{1}{2^{M(N_B-1)}} \sum_{i=1}^{2^{M(N_B-1)}} \left\{ \mathrm{erfc}\left(\frac{[G_k^i H_k^i F_k^i]_{nn} - \sqrt{2}\,R_e(I_{k,l}^i)}{\sqrt{2[G_k^i R_{nn,k}^i (G_k^i)^H]_{nn}}}\right) + \mathrm{erfc}\left(\frac{[G_k^i H_k^i F_k^i]_{nn} - \sqrt{2}\,I_m(I_{k,l}^i)}{\sqrt{2[G_k^i R_{nn,k}^i (G_k^i)^H]_{nn}}}\right)\right\}, \tag{4.15}$$

where $$\mathrm{erfc}(x) = \frac{2}{\sqrt{\pi}} \int_x^\infty \exp(-z^2)\,dz. \tag{4.16}$$

and Re( ) and Im( ) denote real and imaginary parts respectively. Under an assumption of sufficient statistics in the linear block precoding with for MMSE equalization, the distribution of the ISI in each beam of $\hat{X}_k^i$ converges almost surely to a circular complex Gaussian distribution, and so equation (4.14) can be approximated by $$[\hat{X}_k^i]_n \approx [G_k^i H_k^i F_k^i]_{nn}[X_k^i]_n + [\tilde{W}_k^i]_n, \tag{4.17}$$

where $[\tilde{W}_k^i]_n$ is a zero mean, circular complex Gaussian random variable with independent real and imaginary parts of variance $[C_{\tilde{W},k}^i]_{nn}$ and the covariance vector $C_{\tilde{W},k}^i$ is given by $$C_{\tilde{W},k}^i = [R_e(G_k^i H_k^i F_k^i) - \mathrm{diag}(G_k^i H_k^i F_k^i)] \cdot [R_e(G_k^i H_k^i F_k^i) - \mathrm{diag}(G_k^i H_k^i F_k^i)]^T + [I_m(G_k^i H_k^i F_k^i)][I_m(G_k^i H_k^i F_k^i)]^T + R_e[G_k^i R_{nn,k}^i (G_k^i)^H]. \tag{4.18}$$

In the above equation, diag(A) denotes the diagonal matrix operation where the off-diagonal elements of A are forced to zero. By following the calculation of the $$\overline{p}_b \approx E\left\{\frac{1}{N_B}\sum_{n=1}^{N_B} \frac{\sqrt{M}-1}{\sqrt{M}\log_2\sqrt{M}}\,\mathrm{erfc}\left(\sqrt{\frac{3\log_2 M}{2(M-1)}\frac{1}{\sqrt{2[\mathrm{diag}((G_k^i H_k^i F_k^i))^{-1} - I_{N_B}]_{nn}}}}\right)\right\}. \tag{4.19}$$

probability of errors in the M-ary square QAM scenario, the average BER for the linear precoding at high SNRs can be approximated in (4.19). Hence, the above average BER can be used to estimate the average transmit EE $\eta_{ee}$ in (3.5) in the high SNR regime. Note that the precoding vectors $G_k^i$ and $F_k^i$ are also related to the noise power $N_o$ and the transmit power $P_T$ respectively (see (4.7) and (4.3)).

Relative transmit EE gains $G_{\eta_{ee}}$ are useful to characterize the EE performance of various MIMO architectures relative to the SISO system in terms of transmit energy efficiencies:

$$G_{\eta_{ee}} = \frac{\eta_{ee}^{SISO}(SNR_{SISO})}{\eta_{ee}^{X}(SNR_{SISO})}, \tag{4.20}$$

where $\eta_{ee}^{SISO}$ ($SNR_{SISO}$) is the transmit EE of the SISO system and $\eta_{ee}^{X}(SNR_{SISO})$ is the transmit EE of other MIMO architectures X, where X denotes "CP-MIMO", "DP-MIMO", "SP-MIMO" architectures. Using the average BER for an architecture X, an approximation of the relative EE gain in the high SNR regime can be simplified as follows:

$$G_{\eta_{ee}} \approx \frac{N_B(1-\overline{p}_b^x)^{\frac{L_d}{N_B}}}{(1-\overline{p}_b^{SISO})^{L_d}} \cdot \frac{N_o}{G_T G_R \|H_{SISO}\|^2} \cdot SNR_{SISO}, \tag{4.21}$$

where $\overline{p}_b^X$ and $\overline{p}_b^{SISO}$ are average BERs evaluated for MIMO architecture X and the SISO system respectively. $H_{SISO}$ is the channel gain vector of the VV link of the SISO system.

The transmit EE will also impact the operating time of the battery-powered transceiver. In aircraft systems, two performance metrics are often considered: flight endurance and flight range. These indicate the longest amount of time and the distance an aircraft can fly between takeoff and landing respectively. The battery operating time (endurance) of small UAVs with electric propulsion can be estimated using techniques known in the art. In such an electric propulsion system, the power delivered by the battery would account for the power losses due to the propellers, motors, motor controllers, sensors, wireless transceivers, and the power required to overcome lift and drag in flight. In the analysis, it is assumed that a primary rechargeable battery pack powers all the US subsystems except the wireless transceiver; a second pack is associated with the wireless transceiver. For the primary battery pack, the required flight velocities UE and UR for the maximum endurance and the maximum range respectively can be determined from the vehicle's configuration, aerodynamic, and flight mechanics. Typical UE and UR range from 8 m/s to 15 m/s varying with battery configurations in small electric propulsion aircraft in steady flight.

To analyze the transceiver operating time (endurance), or equivalently the secondary battery lifetime, Peukert effects should be considered when estimating the discharge rate of the battery. The discharge time of the battery is given by $$t = \frac{R_{batt}}{i_c^{n_d}}\left(\frac{C_{batt}}{R_{batt}}\right)^{n_d}, \tag{4.22}$$

where t is the discharge time in hours, $i_c$ is the discharge current in amperes and $C_{batt}$ is the battery capacity in ampere hours (Ah). $n_d$ is the discharge parameter depending on the battery type and temperature. $R_{batt}$ is the battery discharge rating (time) over which the capacity is determined (in hours). In the model, the power output of the secondary battery is given by $$P_{batt} = V_{batt} i_c = V_{batt}\frac{C_{batt}}{R_{batt}}\left(\frac{R_{batt}}{t}\right)^{1/n_d}, \tag{4.23}$$

where $V_{batt}$ is the battery voltage rating. When the US flies steadily with the velocity $U_E$, the average transmit power $\overline{P}_T$ can be estimated by using the path-loss model $$\overline{P}_T = \int_{t'=0}^{t} N_o \gamma_s K_{pt}\left(\frac{U_E t'}{d_0}\right)^{n_p} dt', \tag{4.24}$$

where $\gamma_s$ is the required SNR and $N_o$ is the noise power at the receiver. $U_E \cdot t'$ is the varying distance between the US and the OS. The coefficient $K_{pt}$ is defined as $$\left(\frac{2\pi d_0}{\lambda_c}\right)^2 \cdot \frac{1}{G_T G_R N_f},$$

$d_0$ is the reference distance (1 meter) and $\lambda_c$ is the wavelength of center frequency $f_c$. $n_p$ is the path loss exponent for the simplified path-loss model. Equating (4.23) and (4.24) gives $$V_{batt}\frac{C_{batt}}{R_{batt}}\left(\frac{R_{batt}}{t}\right)^{1/n_d} = \int_{t'=0}^{t} N_o \gamma_s K_{pt}\left(\frac{U_E \cdot t'}{d_o}\right)^{n_p} dt'. \tag{4.25}$$

It is difficult to solve the time t in the non-linear equation shown in (4.25). Therefore, as shown in FIG. 14 (which is an illustration of steady flight routes for the US), the additional assumption is made that the US starts at the reference distance $d_0$ from the GS and arrives at the target distance $d_t$ with the constant velocity of $U_E$. Then it flies about the GS on a circle of radius $d_t$. Takeoff and landing procedures are not considered in the calculation. For this simplified route, (4.25) becomes $$V_{batt}\frac{C_{batt}-C_0}{R_{batt}}\left(\frac{R_{batt}}{l}\right)^{1/n_d} = N_o \gamma_s K_{pt}\left(\frac{d_t}{d_0}\right)^{n_p}, \tag{4.26}$$

where $C_0$ (Ah) is the battery capacity loss due to the power consumption of transceiver on the route from the reference distance $d_0$ to the target distance $d_t$. It is given by $$C_0 = V_{batt}\frac{d_t}{U_E}\frac{C_{batt}}{R_{batt}}\left(\frac{R_{batt}\cdot U_E}{d_t}\right)^{1/n_d}. \tag{4.27}$$

Solving the time t in (4.26) results in $$T_E = R_{batt}^{1-n_d}\left[V_{batt}\frac{C_{batt}-C_0}{N_o\gamma_s K_{pt}}\left(\frac{d_0}{d_t}\right)^{n_p}\right]^{n_d} + \frac{d_t}{U_E}, \tag{4.28}$$

where $E_T$ is the transceiver operating time in hours and shows the amount of time the transceiver can continuously operate with the discharge rate of battery capacity $C_{batt}$. The primary battery is assumed to be large enough to ensure that the flight endurance exceeds the transceiver endurance.

4.3 Adaptive SP-MIMO Emulation Testbed with CSI Feedback

The adaptive SP-MIMO testbed offers a hybrid hardware/software platform to evaluate MIMO communication systems with adaptive transmission (precoding) and signal processing methods in a real-time multipath fading propagation environment. The testbed can emulate SISO, CP-MIMO, DP-MIMO and SP-MIMO architectures with programmable and repeatable channel realizations. The hardware architecture of adaptive SP-MIMO testbed in Chapter 3.2.

In the adaptive SP-MIMO testbed, OFDM signals are synthesized in MATLAB and are downloaded to the PXB N5106A BB signal generator and MIMO channel emulator. Supported transmission schemes include both precoded (adaptive transmission) and un-precoded transmission. FIG. 15 shows signal processing blocks of a 4×4 adaptive SP- MIMO communications testbed platform. As shown in FIG. 15, at the transmitter side, the data bits to be transmitted are encoded by channel coding (e.g. convolutional codes). The encoded data bits are then framed in packets/subpackets. Packetized data bits are mapped into a signal constellation (e.g. QAM, QPSK etc.) by a mapper block. The resulting symbols are combined block-wise using a serial-to-parallel (S/P) module to create $N_T$ streams. For the precoded transmission, input data symbol vectors with the feedback CSI from the channel estimation block in the receiver are encoded using the linear precoder described in Section 4.1.2. The precoded or un-precoded symbols are then loaded onto orthogonal data subcarriers. Pilots and virtual subcarriers (guard subcarriers) are also inserted into reserved subcarriers. Following an N-point IFFT block, the time-domain signal samples at the output of the IFFT are extended with a cyclic prefix to minimize the ISI. Multiple OFDM symbols compose a frame. Synchronization (SYNC) sequences are incorporated at the beginning of each frame to compensate for phase offsets and timing errors among the four RF signals. The OFDM signals are then loaded into the transmit signal buffers (memory) in the N5106A baseband signal generator. The framed OFDM packets from NT transmitters are then "played" through the emulated $N_R \times N_T$ MIMO channels. The resulting digital baseband IQ signals at the output of the channel emulator are then routed to the N5182A signal generator and up-converted to RF.

Coherent reception of up to four signals is possible using the digital sampling scope, which operates as a coherent wide-band receiver. The oscilloscope captures RF signals from NR channels and converts them into digital samples by high-speed acquisition units. Blocks of samples from the acquisition units are transferred to the host computer for processing within the MATLAB programming environment, where the digitized RF signals are initially digitally down-converted to complex base-band. Time and frequency synchronization modules are then applied to minimize synchronization errors in the BB OFDM signals. After synchronization is achieved, algorithms for cyclic prefix removal, FFT processing, channel estimation, and MMSE signal detection/equalization are applied. Channel estimation is performed based on the pilot subcarriers contained in the OFDM symbols. Pilot spacing is required to be less than the coherence bandwidth of the channel.

The preamble design in MIMO-OFDM systems follows pilot patterns known in the art for channel estimation and equalization. When training symbols are available from the preamble signals, a MMSE estimator is widely used for channel estimation. It is assumed that linear MMSE signal detection when receiving unprecoded signals in the case of full spatial multiplexing MIMO-OFDM systems. This method treats all transmitted signals except the desired signal as interference.

For precoded signals, the baseband MIMO-OFDM signals from the antennas are translated into $N_R$ parallel data streams and then launched into the linear decoder defined by the G matrix derived from the received preambles. The resulting $N_B$ (precoded) or $N_R$ (un-precoded) parallel data streams are passed through a parallel-to-serial (P/S) module and further decoded into digital data by a de-mapper block, a de-interleaver and a channel decoder. Finally, the mux block combines and recovers decoded parallel streams to arrive at an estimate of the original data source. The estimated bits from a large number of packets are used to compute various performance metrics, such as BER, PER, SE, and transmit EE etc. Performance metrics are then computed, where tradeoffs among the architectures are reported in terms of SNR, BER, SE, and EE. At the operating point maximizing the EE, the corresponding transceiver endurance (equivalently battery lifetime) is estimated for a range of battery capacities.

4.4 Emulation Results

This section reports on the EE performance of the precoding schemes based on results from the emulation testbed.

4.4.1 Emulation and Measurement Setup

System parameters of the MIMO-OFDM system are listed in Table I of [137] (which is hereby incorporated by reference) for a carrier frequency of 915 MHz. A-to-G and G-to-G links are considered in the analysis to reflect diverse conditions for US-to-GS communications. Chapter 2.3 describes the SP-MIMO channel models used for emulating the frequency-selective G-to-G and A-to-G channels in the SP-MIMO testbed. Channel parameter sets used in the analysis are based on a six-path model and include the following:

4.4.1.1 Fading Statistics

Typically, the A-to-G channel is composed of a LOS path and a cluster of reflected and delayed paths. Rician factors of K≈2~20 dB have been measured in the very high frequency (VHF) communications channel. A Rician factor of K=15 dB is selected for this analysis. For the G-to-G case, a typical urban environment is considered, where diffuse components dominate the radio propagation and the K factor is close to zero.

4.4.1.2 Doppler

In the G-to-G case, uniformly distributed scattering is assumed around the GS, and so the "classic 6 dB" Rayleigh Doppler spectrum is applied. In the A-to-G case the Rician Doppler spectrum is a superposition of the Rayleigh Doppler spectrum and the resulting LOS Doppler, where the LOS signal is subject to a static frequency shift that is related to the relative velocity between the GS and the US in the A-to-G scenario. Both scenarios are characterized by slow fading: $\upsilon$=0~6.6 m/s is a typical range of velocities, such as when the US on the UAV hovers above the GS or taxis on the ground. The highest considered speed for a slowly moving US at low altitude is assumed to be 33 m/s. In the analysis, when the center frequency is 915 MHz, the maximum Doppler frequencies are set as 20 Hz (v≈6.6 m/s) and 100 Hz (v≈33 m/s) for the G-to-G and the A-to-G scenarios respectively.

4.4.1.3 Delay

The excess delay $\tau \geq 0$ in multipath fading channel models is determined by the differential propagation distance $\Delta_d$ between propagation paths, i.e., $\tau=\Delta_d/c$, where c is the speed of light. Worst case delays of 6~8 us ($\Delta_d$=1.8~2.4 km) have been reported for A-to-G links with communications distances approximately 10~20 nautical miles from the airport. For lower-power USs at a range of one km or so, a worst-case delay of 1 us ($\Delta_d$=300 m) is assumed for both A-to-G and G-to-G links.

4.4.1.4 Spatial and Polarization Correlations

Spatial correlation coefficients for the combined spatial-polarization correlation matrices are borrowed from Table III of [137]. The A-to-G link is assumed to be characterized by a highly correlated Rician channel, whereas the G-to-G propagation is treated as a low correlated Rayleigh channel or a partially correlated Rician channel. Relative power parameters, including the channel XPD and CPR, are set at 10 dB and 0 dB respectively.

Table II in [137] summarizes key parameters of the channel models employed in the analysis, including the path delays, the path losses, the Rician K-factor associated with the co-polarized sub-channel within each path (all cross-polarized subchannels, i.e. VH or HV are always assumed to follow Rayleigh distributions), and the maximum Doppler shift $f_{Dmax}$ associated with A-to-G and G-to-G channels. These values are used in conjunction with the spatial and polarization correlation matrices defining the antenna correlations at the Tx and Rx.

The transmit power associated with each packet is constant and the total transmit power of the different MIMO architectures and precoded schemes is identical to the total power of SISO case. The SISO SNR is used in the results to ensure a meaningful (i.e., identical transmit powers are employed) comparison between the architectures. The AWGN is digitally added to the received signals to achieve SNRs ranging between −6 dB and 30 dB.

4.4.2 Results

Emulation-based experiments were conducted to estimate the relative performance between non-precoded MIMO and linearly precoded MIMO schemes that leverage different numbers of eigenmodes. For each channel realization and MIMO scheme, a large number of bits were transmitted to estimate BER, PER, SE, and the EE performance.

4.4.2.1 G-to-G Rayleigh Channel

FIGS. 16 through 18 illustrate performance results for the various MIMO architectures over a G-to-G channel (low-correlation Rayleigh fading channel). FIG. 16 shows BER and PER of non-precoded SISO, CP-, DP-, SP-MIMO and precoded SP-MIMO 1/2/3-beam schemes vs. SNRs over a G-to-G Rayleigh channel model. FIGS. 16*a* and 16*b* show the BER and PER performance of non-precoded SISO, CP-, DP-, SP-MIMO architectures as well as for 1-beam, 2-beam, and 3-beam precoded SP-MIMO systems. The 1-beam precoded SP-MIMO case offers dramatic BER performance improvements in comparison to its non-precoded case, with up to 20 dB SNR gains at $10^{-4}$ coded BER.

The corresponding energy efficiencies for the different MIMO architectures with 1-beam, 2-beam or 3-beam are compared with non-precoded cases in FIG. 17 over a low correlated Rayleigh fading channel. FIG. 17 shows average energy efficiency (EE) $\eta_{ee}$ of non-precoded and precoded SISO, CP-, DP- and SP-MIMO schemes vs SNRs over a G-to-G Rayleigh channel model. It is noted that the curves exhibit a "well" in the performance curve indicating that a local minimum energy consumption exists versus the SNR. In the low and middle SNR ranges, the 1-beam precoded MIMO architectures with full CSIT provides significant EE improvements over non-precoded cases due to the precoding gain (See FIG. 17*a*). As the SNR increases, the EE performances degrade and the gains become less substantial and converge to steady-state relative performances. It is interesting to note that in the high-SNR regime (e.g., above approximately 18 dB) the 3-beam SP-MIMO in spatially low correlated G-to-G channels provides nearly 2× and 3.5× improvements in the EE than for 2×2 CP-MIMO and SISO respectively, while simultaneously providing enhanced SE (due to the use of three spatial beams). In FIG. 17*b*, at high SNRs, 2-beam and 3-beam precoded SP-MIMO architectures provide approximately 2× and 3× gains respectively in the EE over non-precoded SISO due to higher data rate with additional spatial streams.

Spectral efficiencies for the different architectures are shown in FIG. 18. FIG. 18 shows average EE $\eta_{ee}$ of non-precoded and precoded SISO, CP-, DP- and SP-MIMO schemes vs average spectral efficiency (SE) $\eta_{se}$ vs SNRs over a G-to-G Rayleigh channel model. The color bar shows the average SNRs. The figure shows the EE and achieved rate as a function of the SNR. In the rich scattering environment considered, SP-MIMO architectures provide approximately a four-fold improvement in SE over SISO and 1-beam precoded MIMO architectures as well as a two-fold improvement over non-precoded CP-, DP- and 2-beam precoded SP-MIMO architectures. These SE gains are realized particularly at higher SNRs. Note that for each architecture, a local minimum in energy consumption occurs near the maximum SE (i.e., at the bottom of the "well"). A goal of an efficient system would be to operate at this operating point in order to minimize energy consumption for the desired rate.

4.4.2.2 A-to-G Rician Channel

System performance for A-to-G highly correlated Rician fading channel conditions was also considered. In this case, the MIMO space channels become substantially correlated, and both the EE and the SE of non-precoded SP-MIMO and non-precoded CP-MIMO architectures degrade due to rank reductions. The increased spatial correlations in the channel lead to a reduced ability of the channel to support full multiplexing schemes, yielding increased BER and PER for these cases. The EE and SE for non-precoded MIMO architectures are compared with the corresponding performance of precoded schemes with 1-beam, 2-beam or 3-beam in FIG. 19 and FIG. 20 respectively. FIG. 19 shows average EE $\eta_{ee}$ of non-precoded and precoded SISO, CP-, DP- and SP-MIMO schemes vs SNRs over a A-to-G Rician channel model. FIG. 20 shows average EE $\eta_{ee}$, of non-precoded and precoded SISO, CP-, DP- and SP-MIMO schemes vs average SE $\eta_{se}$ vs SNRs over a A-to-G Rician channel model. The color bar shows the average SNRs. Again, there is a general advantage in performance gained by precoding. Note also that the curves exhibit an operating point corresponding to a local minimum in energy consumption that is near each architecture's maximum SE.

4.4.2.3 Theoretical EE Approximations

FIG. 21 shows relative EE gains of theoretical ("Theory" labels) vs emulation ("Emu" labels) results for non-precoded and precoded DP- and SP-MIMO schemes with respect to the SISO link over the G-to-G Rayleigh and A-to-G Rician channel models. FIG. 21 shows relative EE performance comparisons from the emulation results and theoretical analysis using (4.19) and (4.21) for the DP and space and polarization (SP) architectures over both G-to-G Rayleigh and A-to-G Rician channels in the high SNR regime. In the G-to-G Rayleigh channel, the theoretical relative performance of 2-beam, 3-beam precoded and full spatial 4×4 SP schemes are approximately 2.0, 2.95 and 3.9 times better than the SISO case at high SNRs (e.g. SNR≥30 dB). The corresponding EE gains over the A-to-G Rician channel are 2.0, 2.6, and 3.15 for 2-beam SP-MIMO, 3-beam SP-MIMO and full spatial 4×4 SP-MIMO respectively at an SNR of 39 dB. It is also observed that the emulation results and theoretical approximations for the relative EE agree well.

Relative EE Gain

FIG. 22 shows relative gains of average EE $\eta_{ee}$ of non-precoded and precoded CP-, DP- and SP-MIMO schemes with respect to the SISO link over G-to-G Rayleigh and A-to-G Rician channel models. The color bar shows the SE. FIG. 22 summarizes the relative EE gain performance computed from emulation results between the different non-precoded and precoded MIMO architectures over two different fading channel types, where results are normalized relative to the EE of the SISO system (e.g., each value on the abscissa corresponds to the same transmit power among the different architectures and results are relative to the SISO performance at that abscissa value). In a G-to-G Rayleigh channel, the EE gains associated with 1-beam precoded MIMO architectures, 2-beam SP-MIMO, and 3-beam SP- MIMO are approximately 4.5, 3.3, and 2.75 with respect to the EE of SISO at SNR=12 dB. However, the EE gains over the A-to-G Rician channel change to 2.25, 0.6, and 0.001 for 1-beam precoded MIMO, 2-beam SP-MIMO and 3-beam SP-MIMO respectively at an SNR of 12 dB. When the space channels become correlated in the A-to-G case, the energy efficiencies of non-precoded CP-MIMO and SP-MIMO and the 3-beam precoded architectures deteriorate dramatically as the channel becomes rank-deficient. When SNRs are in a range from 9 to 21 dB, the EE gains of the precoded 1-beam and 2-beam architectures are larger than SISO. However a 3-beam precoder derived from a SP-MIMO architecture exhibits relatively poor performance in comparison to 1-beam and 2-beam scenarios, particularly over the A-to-G channel. In the high SNR regime (e.g. 30 dB), the relative EE gains for the different precoded MIMO architectures over different fading channel types converge to approximately 3.0 (3-beam, G-to-G Rayleigh), 2.0 (2-beam, G-to-G Rayleigh), 2.2 (2-beam A-to-G Rician) and 1.6 (3-beam A-to-G Rician) respectively.

Another important aspect of the system performance is the SE. While the 1-beam precoded MIMO architectures outperform the SISO and their non-precoded counterparts in terms of EE, especially at lower SNR, their associated SE are less than those of the 2×2 and 4×4 non-precoded MIMO architectures and the precoded schemes employing more than one beam. Hence tradeoffs exist between the EE performance and the SE for a given channel realization. When the SNR is low (e.g. 9 dB), the performance of the 1-beam precoded MIMO is superior to that of the non-precoded SISO, DP-, CP- and SP-MIMO architectures in different fading channels because the BER/PER of the 1-beam scenario is the lowest among these structures. When the SNR increases to 24 dB, the 2-beam, 3-beam precoded SP-MIMO yield better energy efficiencies and higher data throughput relative to SISO and 1-beam MIMO structures. When the channel behaves according to a A-to-G Rician channel, 2-beam SP-MIMO can provide better EE and SE over the SISO and other architectures. FIGS. 18 and 22 also suggest a locally-optimal operating point for each architecture that yields near-maximum spectral efficiencies with a local minimum in energy consumption for the specific channel behavior and the number of spatial beams.

4.4.2.5 Endurance and Range

To study the impact of transmit EE on battery lifetime, the following input values were used for the transceiver operating time estimates based on the system model given in Section 4.2: $U_E$=15 m/s, $n_d$=1.3 (a typical value for lithium-polymer batteries), $V_{batt}$=11.1 V, $R_{batt}$=1 (hour), $n_p$=3.0 (urban areas), $d_t$=15 Km, and $d_0$=1 m. The optimal received SNR values $\gamma_s$ are utilized for different MIMO architectures. These values correspond to operating points at which the maximum energy efficiencies are achieved for various architectures. FIG. 23 shows the effect of battery capacity on estimated operating time (endurance) with various MIMO architectures, assuming optimal received SNR values. FIG. 23 summarizes the effect of MIMO architectures with or without linear precoding schemes on the transceiver endurance as a function of rated battery capacity for a fixed flight velocity $U_E$ and optimal received SNR values. SP-MIMO 1-beam scenario shows the best operating time performance over the other cases and provides an increase of approximately 50% relative to SISO as it requires the lowest optimal SNR value. However the SE (accordingly data rate) of SP-MIMO 2-beam and 3-beam architectures offers 2× and 3× gains respectively relative to 1-beam and SISO scenarios.

When the strong CCI is present, the PER and EE performances of linearly precoded MIMO can be deteriorated dramatically. In the next chapter, an energy-efficient IA technique is proposed to minimize energy consumption in packet-based communications under various interference environments.

Chapter 5

Transmit Energy Efficiency of MIMO Systems with Interference Avoidance

In this chapter, the EE and SE of adaptive MIMO techniques are considered in packet erasure channels, where the transmissions are conditioned on acquired channel and co-channel interference (CCI) statistics. The framework is used to compare the EE performance of different MIMO architectures with and without interference avoidance strategies.

Various statistical CCI models have been proposed in literature, including the symmetric alpha stable model, the Middleton Class A and B models and random Poisson interference fields, all which deal with narrowband sources. The present analysis proposes and employs a wideband interference model to facilitate the simulation of CCI.

A reciprocal, slowly changing channel is assumed, with a mobile radio (MR) and a fixed radio (FR) operating in a TDD mode. The problem under consideration is to optimize the transmit power of the MR side when linear precoding techniques are leveraged using CSIT to enable transmissions aligned with the eigenbeams of the channel. A MIMO system with OFDM is assumed. Such systems are known for high spectral efficiencies with capability to combat frequency selective fading. In prior work dealing with energy efficient MIMO techniques in Chapter 3, MIMO systems were found to outperform their SISO counterparts when adaptive modulations were utilized. In this work, a PHY/MAC cross-layer strategy with linear precoding and IA technique are adopted to improve the EE associated with band-limited and packet-based signals. The EE is conditioned on various factors such as modulation constellation, linear precoding beams, interference avoidance schemes and channel realizations. Both analytical and simulation results show the effectiveness of the IA and linear precoding techniques over various MIMO fading channels and different interference conditions.

The structure of the chapter is organized as follows. Section 5.1 describes the system model including the TDD system architecture, the frequency-selective channel model, the linear precoding techniques for adaptive transmission and the MIMO-OFDM system model. A wideband statistical interference model is derived in Section 5.2. Section 5.3 details the IA scheme and Section 5.4 analyzes the transmit EE and develops an optimization solution for the transmit operating points using the proposed MIMO communications system model. Numerical results determining the maximum transmit EE and optimal SINR under various constraints are presented in Section 5.5. A proof associated with the convex optimization problem is presented in the appendix A.

5.1 System Model 5.1.1 TDD System

A scenario is considered that involves one FR and one MR operating in a TDD fashion on the same frequency channel in a half-duplex mode. Other MRs, FRs, and other unknown local transmitters are treated as potential interferers. The total FR energy resources are assumed to be unlimited, while the total energy for the MR is assumed to be constrained because of battery operation. The IA and linear precoding techniques provide an ability for MRs to operate in the CCI while simultaneously using near minimum energy consumption to transfer data, leading to low energy footprints and promoting spectrum sharing. The techniques are potentially extendable to multiple MRs and multiple-user MIMO (MU-MIMO) scenarios.

FIG. 24 is a block diagram in the time division duplexing (TDD) mode. $N_{sym}^{ul}$, $N_{sym}^{p}$, $N_{sym}^{dl}$ and $N_{sym}^{g}$ are the numbers of orthogonal frequency-division multiplexing (OFDM) symbols for the UL data, the preamble, the DL data, and guard intervals in a block respectively. As shown in FIG. 24, the communications link is divided into a DL time slot (DL, the link from the FR to the MR), an UL time slot (UL, the link from the MR to the FR), and a guard interval. A spatial multiplexing approach is used at the FR for the DL slots, whereas on the UL, an adaptive transmission approach minimizing EE at the MR side is employed to help preserve MR battery consumption. In the initialization stage, the MR monitors the broadcast channel (BC) information from the FR and requests to establish a connection. After the request is approved by the FR, the MR and FR exchange packets in UL and DL slots. The packets include: 1) preamble segments containing training symbols for the purpose of time/frequency synchronization and MIMO channel estimation, 2) data symbols, and in the case of DL, 3) optional information that includes limited feedback of interference channel conditions, such as an IAM—to be described later—and average INP levels associated with received signals, to the MR. The DL preamble is designed to enable high-fidelity estimates of the MIMO CSI associated with the TDD link. Assuming reciprocal channels or approximately reciprocal channels, the MR Tx therefore has channel state knowledge. The CSI estimated from the FR DL preamble along with the IAM and INP are then used in an adaptive transmission (linear precoding) scheme. Quasi-static fading (or block-fading) is assumed in the analysis, where the channel gain is constant over the duration of the TDD block $T_{blk}$, which is assumed to be shorter than the coherence time of the channel.

5.1.2 MIMO-OFDM Tx-Rx Schemes in the Presence of Interference 5.1.2.1 Pilot Signaling At both the MR and the FR sides, the system generates preamble symbols $S_{p,k}^{i}$ ($0 \le k \le N_{sc}-1$) and data symbols $S_{d,k}^{i}$ in the frequency domain, where $N_{sc}$ is the discrete Fourier transform (DFT) size, k denotes the k-th subcarrier and i ($i \ge 0$) is the i-th OFDM symbol. The p and d in the subscripts correspond to the preamble and data symbols respectively. The OFDM Tx uses an inverse DFT (IDFT) of size $N_{sc}$ for the modulated signals.

The received preamble signals $Y_{p,k}^{i,r,t}$ at the r-th antenna within the ith OFDM symbol can be represented as $$Y_{p,k}^{i,r} = \sqrt{P_T} H_k^{i,r,t} S_{p,k}^{i} + V_k^{i,r} + W_k^{i,r,t}, 0 \le k \le N_{sc}-1, \tag{5.1}$$

where $H_k^{i,r,t}$ ($1 \le t \le N_T$, $1 \le r \le N_R$) is the channel frequency response on subcarrier k from the t-th (t=1, 2, . . . , $N_T$) transmit antenna to the r-th (r=1, 2, . . . , $N_R$) receive antenna. The model applies to both UL and DL communication links over an $N_R \times N_T$ MIMO channel. The subcarrier channel response $H_k^{i,r,t}$ is given by $$H_k^{i,r,t} = \sum_{n=0}^{N_{sc}-1} \sum_{l=0}^{L_D-1} h_{l,n}^{i,r,t}\left(\frac{nT_{sym}}{N_{sc}} + \tau_l + iT_{sym}\right) \cdot e^{-j2\pi\left(\frac{kn}{N_{sc}} + \frac{k\tau_l}{T_{sym}}\right)}, \tag{5.2}$$

where $H_{l,n}^{i,r,t}$ is a discrete-time channel impulse response at time instant n for the l-th path delay $\tau_l$ from the t-th transmit antenna to the r-th receive antenna during the i-th data OFDM symbol. It is assumed that $H_{l,n}^{i,r,t}$ remains invariant over the duration of a block transmission. $L_D$ and $T_{sym}$ denote the number of delay taps used to represent the channel and the duration of the OFDM symbol respectively. $P_T$ is the total transmit power over all transmit antennas and $j=\sqrt{-1}$. $W_k^{i,r}$ is additive white Gaussian noise (AWGN) on subcarrier k, which is distributed as $N(0, \sigma^2)$ on the r-th receive channel and for the i-th preamble symbol. $V_k^{i,r}$ is the aggregate interference signal sampled at the r-th receive antenna on the k-th subcarrier within the ith OFDM preamble symbol.

Channel estimates can be formed from the use of known preambles. In this chapter, a periodic preamble structure of Q identical parts is utilized, each containing $N_{sc}/Q$ samples in both UL and DL signals for synchronization and channel estimation/equalization between the MR and the FR. The transmit power of the pilots within the preamble is scaled by factor Q so that the total transmit power of the preamble remains $P_T$. During the i-th OFDM preamble symbol, the average received SINR of signals sent from the t-th transmit antenna to the r-th receive antenna over $N_{sc}$ subcarriers can be written as $$\gamma^{i,r,t} = E\left\{\frac{P_T \|H_k^{i,r,t} S_{p,k}^{i}\|^2}{\|V_k^{i,r}\|^2 + \|W_k^{i,r}\|^2}\right\}, \tag{5.3}$$

where E{ } is the expectation operation, ||x|| is the norm of x, and $\Sigma_{k=0}^{N_{sc}-1}\|S_{p,k}^{i}\|^2 = Q$.

5.1.2.2 Uplink Data Transmission with Linear Block Precoding

When CSIT is available, linear precoding techniques at the Tx of the MR (and subsequent decoding at the Rx of the FR) can be employed to reduce the bit/packet errors and hence improve the transmit EE. In the literature, a general framework for the design of an optimal precoder and decoder has been proposed to maximize the information rate based on the well-known water-pouring solution, where stronger eigenmodes of existing subchannels are allocated with more power (when compared to the weaker eigenmodes) and the weakest eigenmodes are neglected.

The maximum information rate design, however, has the drawback that it can result in unequal symbol error rates across the eigenmodes, which has a negative impact when considering packet erasures. In this chapter, an equal minimum mean square (MSE) error approach is considered that involves a design leading to comparable symbol error performance for all of the $N_B$ subchannels.

In a wireless MIMO system with a finite number of interfering signals, the linear precoding and decoding can be modeled for the i-th OFDM data symbol on the k-th subcarrier (k=0, 1, . . . , $N_d$−1) as $$\hat{S}_{d,k}^{i} = \sqrt{P_T}\, G_k^i H_k^i F_k^i \underbrace{(S_{d,k}^i \odot I_k^i)}_{s_k^i} + G_k^i \underbrace{(V_k^i + W_k^i)}_{N_k^i}, \tag{5.4}$$

where $N_d$ ($N_d \le N_{sc}$) is the number of data subcarriers, $S_{d,k}^{i}$ is the $N_B \times 1$ transmitted data vector, $H_k^i$ is an $N_R \times N_T$ channel transfer matrix in the frequency domain, $N_B \le \text{rank}(H_k^i) \le \min(N_T, N_R)$ is the number of parallel transmitted streams. $V_k^i \in C^{N_R \times 1}$ is the overall interference signal vector on the k-th subcarrier sampled at the Rx. $W_k^i$ is the $N_R \times 1$ AWGN vector on the k-th subcarrier at the given symbol time. $G_k^i$ is the $N_B \times N_R$ precoding decoder matrix used at the Rx and $F_k^i$ is the $N_T \times N_B$ precoding encoder matrix used at the Tx. The summation of interference and noise terms is denoted $N_k^i \in C^{N_R \times 1}$. $\otimes$ denotes Hadamard product. The vector $I_k^i \in C^{N_B \times 1}$ contains elements $1_k^i$ which are defined as functions indicating whether or not the subcarrier k is used by the Tx based on an IAM sent by the Rx, $$1_k^i = \begin{cases} 1 & \text{if the kth subcarrier is used in the ith symbol;} \\ 0 & \text{Otherwise.} \end{cases} \quad (5.5)$$

The IAM, which is detailed in Section 5.3, is obtained from the FR DL. The transmitted data vector with interference avoidance $S_{d,k}^i \otimes I_k^i$ is denoted by $S_i^k$.

The precoder and decoder are jointly designed to minimize the equal symbol estimation error across all subchannels with the total transmit power constraint $P_T$ and for $N_B$ data streams. The method for finding $F_k^i$ and $G_k^i$ invokes the following optimization formulation:

$$\min_{G_k^i, F_k^i} J = E\left\{\left\|\Lambda_W^{\frac{1}{2}} e\right\|^2\right\}, \quad (5.6)$$

$$\text{subject to: } tr\left(F_k^i (F_k^i)^H\right) = 1$$

and $$tr\left(S_k^i (S_k^i)^H\right) = 1,$$

where e is the estimation error vector, which is equal to $[x_k^i - (G_k^i H_k^i F_k^i S_k^i + G_k^i N_k^i)]$, tr( ) is the trace operation of the matrix, $\Lambda_W$ is the square root of a diagonal positive definite weight matrix of dimension $N_B \times N_B$.

The optimal $G_k^i$ and $F_k^i$ based on equal MSE errors across linear precoded beams for a fixed-rate system with $N_B$ data streams are given by $$\begin{aligned} F_k^i &= U_k^i \phi_{F,k}^i; \\ G_k^i &= \phi_{G,k}^i (U_k^i)^H (H_k^i)^H (R_{NN,k}^i)^{-1}; \\ \phi_{F,k}^i &= \gamma^{\frac{1}{2}} (\Lambda_i)^{-\frac{1}{2}}; \\ \phi_{G,k}^i &= \gamma^{\frac{1}{2}} (1+\gamma)^{-1} (A_i)^{-\frac{1}{2}}; \\ \gamma &= \sqrt{\frac{1}{tr(\Lambda_i^{-1})}}; \end{aligned} \quad (5.7)$$

where $R_{NN,k}^i$ is the auto-correlation of interference-plus-noise vector $N_k^i$, $U_k^i$ is an $N_T \times N_B$ orthogonal matrix which forms a basis for the range space of $(H_k^i)^H (R_{NN,k}^i)^{-1} H_k^i$, $\Lambda_i$ is a diagonal matrix containing the $N_B$ non-zero eigenvalues of $(H_k^i)^H (R_{NN,k}^i)^{-1} H_k^i$ in decreasing order from top-left to bottom-right, $\phi_{G,k}^i$ can be any arbitrary full-rank diagonal matrix, and $\phi_{F,k}^i$ is the well-known water-pouring solution for transmit power allocation, which de-emphasizes the weaker eigenmodes.

5.2 Interference Model

Assume that the interferers are uniformly distributed within the region $\Omega(R_l, R_u)$ surrounding the MR and the FR as shown in FIG. 25. FIG. 25 shows interference space and fixed radio (FR)/mobile radio (MR) locations in a wireless system. $d_{tr}$ is the distance between the FR and the MR. The number of active interferers during any observation interval is assumed to be distributed according to a homogeneous Poisson point process on the space $\Omega$ with density $\lambda_r$. For the ith OFDM symbol period, the interference signal vector $V_k^i \in C^{N_R \times 1}$ from co-channel interferers on subcarrier k in the frequency domain can be represented as $$V_k^i = \sum_{i_0=1}^{i} \sum_{m_c=1}^{M_c^{i_0}} G_{m_c}^{\frac{1}{2}} L_{NF}^{\frac{1}{2}} \frac{\lambda_k}{4\pi} r_{m_c}^{-\gamma_p/2} P_{T,m_c}^{1/2} H_{m_c,k}^i X_{m_c,k}^{i_0}, \quad (5.8)$$

where $\Sigma_{i_0=1}^{i}$ denotes the summation of co-channel interferers that emerge before and during the ith OFDM symbol, each with its own session life. $M_c^{i_0}$ is the number of active co-channel interferers associated with the $i_0$th ($i_0 \le i$) OFDM symbol. $G_{m_c}$ represents transmit antenna power gains of the $m_c$th co-channel interferer. $L_{NF}$ is the loss factor due to the Rx noise figure. $\lambda_k$ denotes the wavelength of center frequency of subcarrier k. $r_{m_c}$ is the average distance from the $m_c$th co-channel interferer to the FR. $\gamma_p$ is the propagation path loss exponent. $P_{T,m_c}$ represents the total transmit power of the $m_c$th co-channel interferer. $P_{T,m_c}$ is assumed to be distributed as $N\sim(\mu_{p,cc}, \sigma_{p,cc})$, where $\mu_{p,cc}$ is the average transmit power value for the co-channel interferer, and $\sigma_{p,cc}$ denotes the standard deviation.

$$H_{m_c,k}^i \in C^{N_R x N_T^{(m_c)}}$$

denotes the channel frequency responses on the kth subband associated with the cochannel interferer with $N_T^{(m_c)}$ representing the number of transmit antennas at the math co-channel interferer. The $H_{m_c,k}^i$ are modeled as i.i.d. random variables (RVs). The $$X_{m_c,k}^{i_0} \in C^{N_T^{(m_c)} x1}$$

are the random baseband signals transmitted from the active $m_c$th co-channel interferer on subband k during the $i_0$th OFDM symbol.

A frequency-domain interference signal model is adopted. The interference signal vectors $X_{m_c,k}^{i_0}$ for all interferers before and during the ith OFDM symbol are summed up, where the $\Gamma_{m_c}^{i_0}$ are the emergence times and the $L_{m_c}^{i_0}$ are the session life values of the co-channel interferers. The frequency-domain representations for the baseband signals from the $n_c$th ($1 \le n_c \le N_T^{(m_c)}$) antenna of co-channel interferers are $$X_{m_c,n_c,k}^{i_0} = E_{m_c,n_c,k}^{i_0} \cdot C_{m_c,n_c,k}^{i_0} \cdot \mathbb{I}_{\left[\Gamma_{m_c}^{i_0} \le \Gamma^i < \Gamma_{m_c}^{i_0} + L_{m_c}^{i_0}\right]} \cdot e_{m_c,n_c,k}^{j\phi^{i_0}}, \quad (5.9)$$

where $E_{m_c,n_c,k}^{i_0} \in R$ are the baseband envelope vectors, which are uniformly distributed between [−1/2, 1/2]. $I_{[\ldots]}$ is a function indicating whether or not the $i_0$th interference source is active during the ith symbol time, and is given by $$\mathbb{1}_{[\Gamma_l \le \Gamma < \Gamma_u]} = \begin{cases} 1 & \text{if } \Gamma_l \le \Gamma < \Gamma_u; \\ 0 & \text{Otherwise.} \end{cases} \quad (5.10)$$

$\phi_{m_c,n_c,k}^{i_0}$ are the uniformly distributed random phases between $[-\pi, \pi]$ on subcarrier k. $C_{m_c,n_c,k}^{i_0}$ are i.i.d. RVs for the co-channel interferers indicating if interference is active on subcarrier k during the $i_0$th symbol period, where $C_{m_c,n_c,k}^{i_0}=1$ when interference is present and $C_{m_c,n_c,k}^{i_0}=0$ otherwise. The sequences of Bernoulli trials, i.e. $\Sigma_{k=0}^{N_{sc}-1} C_{m_c,n_c,k}^{i_0}$, are characterized by binomial distributions with trial parameter $N_{sc}$ and success probabilities $p_{cc}$ in each trial. The session life variables $L_{m_c}^{i_0}$ can be modeled by the Zipf distribution (a discrete version of the Pareto distribution) with a distribution given by $$P\{L_{m_c}^{i_0} \ge k'\} = \left[1 + \left(\frac{k' - k_0}{\sigma_L}\right)\right]^{-\alpha}, \quad (5.11)$$

where $k_0$ is an integer denoting the location parameter, $\sigma_L$ is the scale parameter and $\alpha$ denotes the tail index.

5.3 Interference Avoidance

Figure 26:
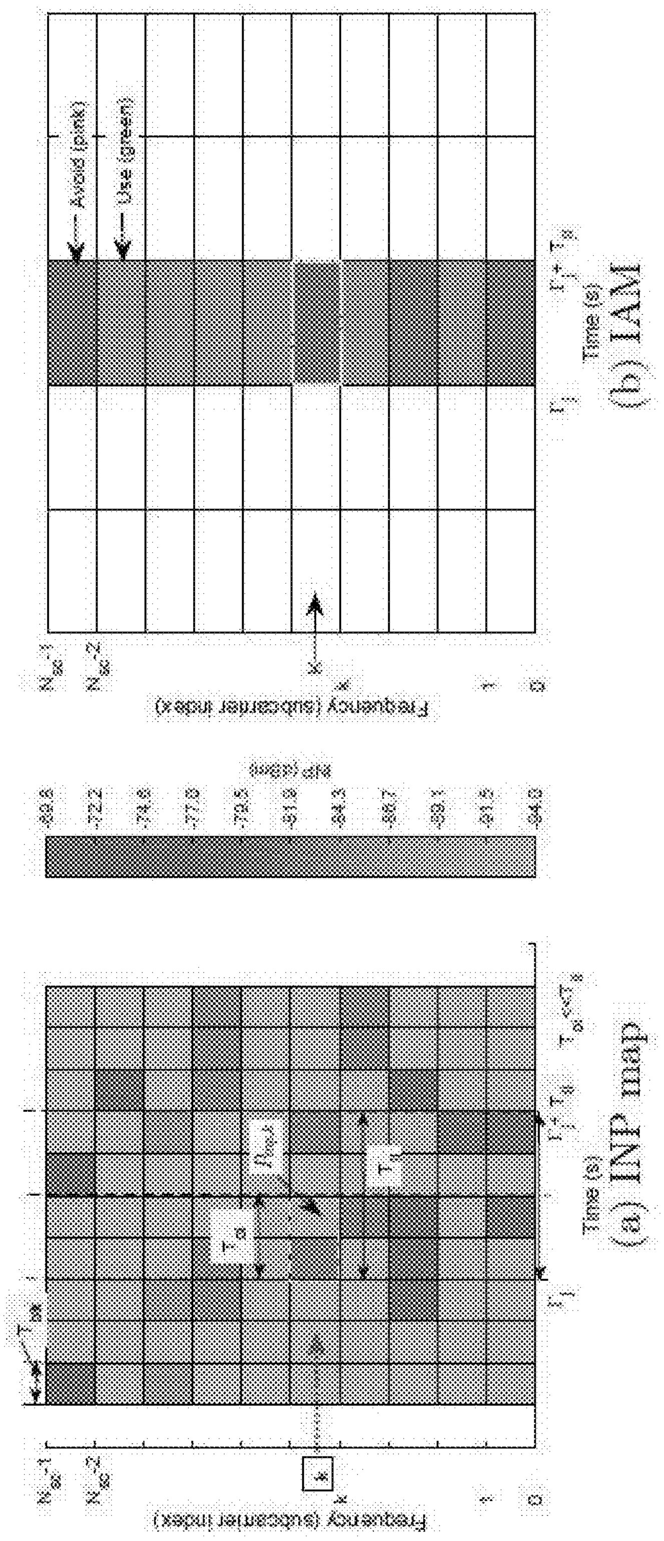

The proposed approach employs a form of interference avoidance that is enabled by measurements conducted at the FR. A block-interference model is assumed, where the interference signal $V_k^i$ in (5.8) remains invariant in the statistical sense over an interference decorrelation period, $T_{II}$, where $T_{blk} << T_{II}$, and where $T_{blk}$ is the duration of a TDD block. FIG. 26 is an illustration of (a) interference plus noise power (INP) map and (b) interference avoidance map (IAM) at the FR side. $\Gamma_j$ is positioned at the beginning of a block and $T_{II}$ contains multiple block periods. A block diagram of a TDD block is illustrated in FIG. 26*a*. As illustrated in the figure, during the $T_{II}$ block, the FR measures the combined interference and noise power within each subband during an observation interval, $T_{oi}$, taking the measurement during the intervals when the MR is not involved in communications. The observation dwell typically will contain one or more TDD blocks, but is a small fractions of $T_{II}$, i.e., $T_{blk} \le T_{oi} << T_{II}$. As illustrated in FIG. 26*a*, average INP levels on a subchannel are measured and monitored as a function of time block and frequency bin (subcarrier). $\overline{P}_{inp,k}^{\Gamma_j}$ is the time-averaged INP across all subchannels for subcarrier k during the interference decorrelation period from the emergence time $\Gamma_j$ to $\Gamma_j+T_{II}$. $\overline{P}_{inp,k}^{\Gamma_j}$ is actually averaged over the observation interval $T_{oi}$ for subcarrier k. The resulting time-averaged INP is compared with the averaged noise power $\overline{P}_{np,k}$ to generate the IAM with $N_d$ 1-bit data structures indicating whether or not a subcarrier should be used or avoided for signal transmission at the MR side (see avoid and use blocks on the IAM in FIG. 26*b*). Using $\overline{P}_{inp,k}^{\Gamma_j}$, $\overline{P}_{np,k}$ and a threshold $\gamma_{inp}$, the indicator function at the ith symbol and the kth subcarrier in (5.5) can be expressed as $$1_k^i = \begin{cases} 1 & \text{if } \dfrac{\overline{P}_{inp,k}^{\Gamma_j} \cdot 1_{[\Gamma_j \le i \cdot T_{sym} < \Gamma_j + T_{II}]}}{\overline{P}_{np,k}} \le \gamma_{inp}; \\ 0 & \text{Otherwise.} \end{cases} \quad (5.12)$$

When the IAM at time $\Gamma_j$ is generated, the average INP level $\overline{P}_{inp}^{\Gamma_j}$ is summed up over all of the subcarriers to be "used":

$$\overline{P}_{inp}^{\Gamma_j} = \frac{1}{N_d} \sum_{k=0}^{N_d-1} \left\{ \sum_{i=\lfloor \Gamma_j / T_{sym} \rfloor}^{\lfloor (\Gamma_j + T_{II}) / T_{sym} \rfloor} \left( \overline{P}_{inp,k}^{\Gamma_j} \cdot 1_k^i \right) \right\}, \quad (5.13)$$

where $\lfloor x \rfloor$ denotes the largest integer less than or equal to x. The IAM with the average INP levels $\overline{P}_{inp}^{\Gamma_j}$ is periodically sent to the MR upon the DL for adaptive transmission on used data subcarriers to combat the interference distortion at the FR. The data rate of IAM upon the DL is given by $$R_{iam} = \frac{N_d + N_{inp}}{T_{II}}, \quad (5.14)$$

where $N_{inp}$ is the number of bits for expressing the averaged INP level on all subchannel.

The IAM primarily depends on the average noise power $\overline{P}_{np,k}$, the average INP $\overline{P}_{inp}^{\Gamma_j}$ and the threshold $\gamma_{inp}$. The threshold $\gamma_{inp}$ sets the INP level used to select the subcarriers that can be used by the MR. As shown in the above equations, larger $\gamma_{inp}$ increases $\overline{P}_{inp}^{\Gamma_j}$ as well as the number of "use" subcarriers for data transmission by the MR. According to (5.28) in Section 5.4.1, increasing $\overline{P}_{inp}^{\Gamma_j}$ has the disadvantage that the MR will have to increase transmit power to compensate for the higher $\overline{P}_{inp}^{\Gamma_j}$ level, while increasing the number of available subcarriers has the advantage of increasing the achievable data rate. This tension results in trade-offs associated with the selection of $\gamma_{inp}$ and its impact on the transmit EE on the UL. In this work, $\gamma_{inp}$ has been selected to be 3 dB, except where otherwise indicated. It is also noted that adaptive modulation and coding (AMC) techniques can potentially be used for improving link performance that matches the modulation, coding and other protocol parameters to the conditions on the radio link.

5.4 Transmit Energy Efficiency Analysis 5.4.1 Transmit Energy Efficiency

The EE metric used in this analysis is defined as the ratio of the number of successfully received bits in unerased packets to the total transmit energy [31]. This definition is different than many conventional energy per bit formulations in literature that ignore packet erasures [18, 20]. It is closer to the definition of EE proposed in [30], although in that work, the definition incorporates frame re-transmissions under the assumption of type-I I ARQ. It corresponds to some definitions employed in network optimization with power control [17], where EE has been defined as the transmit energy required per successful bit. This application, however, does not consider network optimization but instead consider a single link in the presence of co-channel interference in the vicinity of the Rx, a problem that is relevant in both cooperative and non-cooperative spectrum sharing applications. The specific approach described in this chapter is similar to the network-based approaches, but with important distinctions: 1) The interference that is considered is not necessarily in-network interference and may exhibit different temporal statistics than the interference terms used in literature such as in [17]. 2) In a network solution presented in [17], the base station identifies a target signal-to-interference ratio (SIR) to be employed by all users. The results in the application indicate that the optimal SIR required to maximize the EE will depend upon the particular channel state, the number of linear precoding beams, the modulation and coding schemes, and other factors that would make this particular approach in [17] suboptimal for a given link. 3) Using the approach described in this application, subcarriers below a selected SIR at the FR are ignored. The FR identifies the subcarriers exceeding a particular threshold and conveys this information to the MR. Based on the feedback, the MR only uses low-interference subcarriers, which reduces the transmit power level. In [17] it would seem that the transmit powers are adjusted to try to achieve the target SIR set by the base. 4) The present analysis considers different MIMO architectures with linear precoding to employ 1-beam, 2-beam, and 3-beam links, and the resulting performance is compared for each architecture with and without the use of interference maps to help avoid subcarriers exhibiting interference. The performance difference is dramatic. The EE versus SIR is also compared for each of the architectures, and the SIR's leading to optimal energy efficiencies are identified. 5) The convergence algorithms in the network case would appear to have slower convergence times than the single-link solution being proposed, making network approaches more vulnerable to dynamic spectrum use that might become more prevalent as spectrum sharing strategies evolve.

In the analysis, a fixed payload is assumed for energy performance comparisons among different MIMO architectures. The total energy required for delivery of the payload can be derived from the average transmit EE and the number of successful packets that have to be received. The average transmit EE, $\eta_{ee}$, on the UL is given by $$\eta_{ee} = \frac{N_{good}^{pkt}}{E_{tot}} = \frac{[1 - P_e(\gamma_b)] \mid N_{sym}^{ul} N_u N_B L_{pkt} / L_{tot}}{T_{sym}[P_{tot}^{t}(N_{sym}^{ul} + N_{sym}^{p}) + P_{tot}^{r}(N_{sym}^{dl} + N_{sym}^{p} + N_{sym}^{g})]}, \tag{5.15}$$

where $N_{good}^{pkt}$ is the total number of data bits in good/successful packets decoded at the FR Rx, and $E_{tot}$ is the transmit energy (Joule) over all transmit antennas at the MR. $P_e(\ )$ is the average PER, $\gamma_b$ is the energy per bit to interference-plus-noise power spectral density ratio and $L_{pkt}$ is the packet length excluding the header and the checksum. The packet structure also contains a header and a checksum with sizes of $L_{head}$ and $L_{crc}$ respectively, where $L_{tot}=L_{pkt}+L_{crc}+L_{head}$. $N_u$ ($N_u \leq N_d$) is the number of "use" subcarriers in the IA schemes, which can be determined from the IAM shown in (5.5) and (5.12). $P_{tot}^{t}$ and $P_{tot}^{r}$ denote transmit and receive power respectively, i.e. $P_{tot}^{t}=P_{pa}+P_{tx}+P_{bb}$ and $P_{tot}^{r}=P_{rx}+P_{bb}$, where $P_{pa}$, $P_{tx}$, $P_{rx}$ and $P_{bb}$ represent average power consumption of the power amplifier (PA), transmit, receive and baseband subsystems. The power consumption of the PA can be approximated as $P_{pa}=\eta_t \bar{P}_T$, where $\eta_t=\eta_{papr}/\eta_{pa}$, $\eta_{pa}$ is the drain efficiency of the PA, and $\eta_{papr}$ is the peak-to-average power ratio (PAPR) of transmission signals. Here $N_{good}^{pkt}$ only counts the number of successfully decoded bits excluding the header and the checksum. As shown in FIG. 5.1, $N_{sym}^{ul}$ is the number of OFDM data symbols delivered by the MR over all transmit antennas per block. $N_{sym}^{p}$ is the number of OFDM preamble symbols per block used for synchronization and channel equalization. The SE $\eta_{se}$ in packet erasure channels is defined in good bits/s/Hz using:

$$\eta_{ee} = \frac{[1 - P_e(\gamma_b)] N_{sym}^{ul} N_u N_B L_{pkt} / L_{tot}}{T_{sym} B_w (N_{sym}^{ul} + N_{sym}^{dl} + (N_R + N_T) N_{sym}^{p} + N_{sym}^{g})}, \tag{5.16}$$

where $B_w$ is the 3-dB bandwidth occupied by transmitted signals.

The transmit energy consumption is dependent on various factors, including the received SINR (accordingly the transmit power), the power consumption of subsystems, IA schemes, channel conditions, the packet length, and the PER. When transmitting a fixed number of symbols, higher data rates for a fixed symbol power yield less energy consumption on data delivery, but not necessarily better EE due to packet erasures associated with unsuccessful decoding. The reduced SINR per bit results in higher bit errors and hence increased packet erasures, thus increasing the number of retransmissions and potentially the overall transmit energy required for the successful transmission of the data bits. A goal in this section was to derive an expression for $\eta_{ee}$ based on (5.15) that incorporates signal power, PER and the effects of packet erasures. This is achieved by deriving an analytic approximation for the PER and relating this to the received SINR per bit, leading to a new expression for (5.15). Finally, the average SINR per bit at the FR Rx used in the new equation is related to the transmit power using a MIMO reference channel to facilitate comparisons between different MIMO architectures.

5.4.1.1 Analytic Approximations to the Packet Error Rate

Given an arbitrary SINR threshold $\gamma_{th}$, the average PER on a quasi-static fading channel can be expressed as follows:

$$P_e(\gamma_b)=P_r\{\text{error}|\gamma_b \leq \gamma_{th}\}P_r\{\gamma_b \leq \gamma_{th}\}+ P_r\{\text{error}|\gamma_b > \gamma_{th}\}P_r\{\gamma_b > \gamma_{th}\}, \tag{5.17}$$

where $P_r\{\ \}$ denotes the probability of an event. The range of SINR values can be divided into a low-SINR and a high-SINR region using the SINR threshold $\gamma_{th}$. A simple analytic approximation to the FER of turbo codes has been proposed in quasi-static fading channels with no antenna diversity. El Gamal and Hammons have shown that if $\gamma_b$ at the iterative decoder input is higher than an iterative decoder convergence threshold $\gamma_{th}$, the decoder error probability approaches zero as the number of decoding iterations approaches infinity. On the other hand, if $\gamma_b$ is lower than $\gamma_{th}$ the decoder error probability approaches one. Brink has also proposed a simple characterization of the operation of the turbo iterative decoder to determine the convergence threshold in terms of the extrinsic information (EXIT) chart analysis. Consequently, when Turbo codes are considered using a long interleaver on a quasi-static fading channel, the PER in (5.25) can be further simplified by assuming that $$P_r\{\text{error}|\gamma_b \leq \gamma_{th}\} \approx 1 \text{ and } P_r\{\text{error}|\gamma_b > \gamma_{th}\} \approx 0. \tag{5.18}$$

Substituting (5.18) into (5.17) gives an approximation to the PER. Therefore, in the SISO situation, given a particular value of channel gain a packet error occurs if the instantaneous value of $\gamma_b$ is less than or equal to $\gamma_{th}$. By exploiting the model proposed by El Gamal and Hammons for the iterative decoder operation on the AWGN channel, the PER of the turbo code in the single antenna case is approximated as follows $$P_e(\gamma_b) \simeq P_r(\gamma_b \leq \gamma_{th}) = \int_0^{\gamma_{th}} p_r(\gamma_b) d_{\gamma b} = 1 - e^{-\frac{\gamma_{th}}{\bar{\gamma}_b}}, \tag{5.19}$$

where $\bar{\gamma}_b$ is the average value of $\gamma_b$. This has been extended further in the cases of antenna diversity. We extend the analytic approximation to linearly precoded MIMO scenarios on the quasi-static fading channel with co-channel interference.

For a MIMO architecture, given particular values of channel gains and interference signals, a packet error occurs if the instantaneous value of the SINR per bit, $\gamma_b$, is less than or equal to $\gamma_{th}$. The instantaneous $\gamma_b$ at the iterative decoder input can be determined from the received SINR $\gamma$ associated with $N_R$ receive antennas. Using the linear precoding model in (5.4), the average received SINR $\bar{\gamma}$ is the evaluated from the output of linear precoding decoder over a number of blocks and subcarriers.

$$\bar{\gamma} = \bar{P}_T G_T G_R L_s L_{NF} \frac{\sum_{m=1}^{N_B} E\left\{\left\|[\hat{G}_{UL,k}^{i} \hat{H}_{UL,k}^{i} \hat{S}_{F,k}^{i}]_m\right\|^2\right\}}{E\left\{\sum_{m=1}^{N_R} \|[N_k^i]_{m1}\|^2\right\}}, \tag{5.20}$$

where $G_T$ and $G_R$ are the antenna power gains at the Tx and the Rx antennas respectively, $L_s$ is the propagation path loss, and $[A]_m$ denotes taking an element from the mth row in a column vector A. $\hat{H}_{UL,k}^{i}$ is an $N_R \times N_T$ channel frequency response matrix estimated from the kth subcarrier and the ith OFDM symbol of the UL preamble at the FR side. $\hat{G}_{UL,k}^{i}$ is an $N_B \times N_R$ precoding decoder vector obtained from (5.7) that depends on the UL channel estimate $\hat{H}_{UL,k}^{i}$ and the average SINR measured in (5.3). $\hat{S}_{F,k}^{i}$ is the precoded signal vector on the kth subcarrier within the ith OFDM symbol transmitted by the MR. It is encoded using the precoding matrix $\hat{F}_{UL,k}^{i}$, i.e. $\hat{S}_F^{i} = \hat{F}_{UL,k}^{i} (S_{UL,k}^{i} \otimes I_k^{i})$, where $S_{UL,k}^{i}$ is the $N_B \times 1$ data vector upon the UL.

At the MR side, the precoding encoder vector $\hat{F}_{UL,k}^{i}$ is computed from (5.7) using the CSI estimation $\hat{H}_{UL}^{i}$, $\bar{P}_T$ and the average INP $\bar{P}_{inp}^{\Gamma_j}$ in (5.13) reported upon DL from the FR. Suppose that the DL and UL channels in the TDD mode are reciprocal, $\hat{H}_{UL}^{i}$ can be directly determined from the transpose of $\hat{H}_{DL}^{i}$ at the MR side. When the received SINR is normalized to the SISO link (the reference link) without precoding schemes, $\bar{\gamma}$ in (5.20) and the average SINR per bit $\bar{\gamma}_b$ at the FR are expressed as $$\bar{\gamma} = \frac{\sum_{n=1}^{N_B} E\left\{\left\|[\hat{G}_{UL,k}^{i} \hat{H}_{UL,k}^{i} S_{F,k}^{i}]_m\right\|^2\right\}}{N_B \cdot E\left\{\left\|\hat{H}_{UL,siso}^{i}\right\|^2\right\}} \gamma_r, \tag{5.21}$$

and $$\bar{\gamma} = \frac{B_w}{R_b} \bar{\gamma}$$

respectively, where $R_b$ is the data bit rate of communications systems with channel coding. It is equivalent to $R_s \log_2(M_o) r_c$, where $R_s$ is the symbol rate, $M_o$ is the modulation order and $r_c$ is the code rate. $\hat{H}_{siso,k}^{i}$ is the estimated channel frequency response vector estimated from kth subcarrier within the ith OFDM symbol of the SISO UL link at the FR side. In practical terms, $\hat{H}_{siso,k}^{i}$ can be measured from the common transmit/receive pair in SISO configurations. $\gamma_r$ is the average received SINR at the FR upon the SISO UL, that is $$\gamma_r = \bar{P}_T G_T G_R L_s L_{NF} \frac{E\left\{\left\|\hat{H}_{siso,k}^{i}\right\|^2\right\}}{\sigma_n^2}, \tag{5.22}$$

where $\sigma_n^2$ is the average interference plus noise power received from the decoder of a single antenna.

$$\sigma_n^2 = \frac{1}{N_B} \sum_{m=1}^{N_B} E\left\{\|[G_k^i N_k^i]_m\|^2\right\} = E\{\hat{P}_{inp}^{\Gamma_j}\}, \tag{5.23}$$

where the block-interference model and Rayleigh fading channel are assumed, $\sigma_n^2$ is approximately equivalent to the average INP $\bar{P}_{inp}^{\Gamma_j}$ reported from the FR. Consequently the channel frequency response gains on the kth subcarrier from each transmit to each receive antenna pair, $\hat{H}_{siso,k}^{i}$, are uncorrelated circularly symmetric complex Gaussian random variables with zero mean and variance $\sigma_n^2/2$ per real and imaginary component. $\gamma_b$ is typically Chi-square distributed with 2 L ($L=N_T N_R$) degrees of freedom and its probability density function is $$p(\gamma_b) = \frac{1}{(L-1)!(\bar{\gamma}_b/L)^L} \gamma_b^{L-1} e^{-\frac{\gamma_b}{\bar{\gamma}_b/L}}, \tag{5.24}$$

where $L=N_T N_R$ is an even and positive integer and $\bar{\gamma}_b/L$ is the normalized and averaged SINR per bit. Exploiting the model proposed in [153] for the iterative decoder, the PER of the turbo code with random interleavers of sufficiently long codeword length in the MIMO case is approximated as follows $$P_e(\gamma_b) \simeq \int_0^{\gamma_{th}} p(\gamma_b) d\gamma_b = 1 - e^{-\frac{\gamma_{th}}{\bar{\gamma}_b/L}} \sum_{l=0}^{L-1} \frac{1}{l!} \left(\frac{\gamma_{th}}{\bar{\gamma}_b/L}\right)^l, \tag{5.25}$$

where the performance of $P_e(\gamma_b)$ primarily depends on the decoder convergence characteristics $\gamma_{th}$ of practical coding schemes, the antenna diversity of the MIMO systems and the average SINR per bit values. In particular, it has been demonstrated that different turbo code characteristics, for example, the constituent recursive systematic convolutional (RSC) codes, interleaver size and the number of decoding iterations, can dramatically affect the convergence threshold $\gamma_{th}$. Table 5.1 shows the iterative decoder convergence thresholds of turbo codes in quasistatic fading channels with QPSK, 16-QAM and 64-QAM schemes by Monte Carlo simulation. The turbo encoder employs two identical terminated RSC encoders with rate $r_c=1/2$, octal generator polynomial (1,5/7) and an interleaver size $L_{pkt}=1024$. The puncturing of the parity bits transforms the conventional 1/3 rate turbo code into a 1/2 rate turbo code. The turbo decoder uses the log-MAP algorithm with 6 iterations. FIG. 27 shows packet error rates (PERs) of SISO, 2×2 and 4×4 MIMO systems with QPSK, 16-QAM and 64-QAM modulation schemes vs. $E_b/N_o(\gamma_b)$ on the additive white Guassian noise (AWGN) channel. Convergence threshold $\gamma_{th}$ are shown in Table 5.1. FIG. 27 illustrates that, on the AWGN channel, turbo codes with various modulation schemes (QPSK, 16-QAM and 64-QAM) and MIMO schemes (SISO, 2×2 MIMO, and 4×4 MIMO) without precoding exhibit dramatically different $E_b=N_o$ ($\gamma_b$) performance in quasi-static fading channels for PERs down to $10^{-3}$. As shown in (5.25), this is due to the fact that PER performance of turbo code in quasi-static fading channels is governed mainly by the convergence thresholds of the iterative decoder and the diversity gains of MIMO systems.

TABLE 5.1

| Convergence threshold $\gamma_{th}$ of turbo codes with $r_c = 1/2$, (1, 5/7), and interleaver size $L_{pkt} = 1024$ | |
|---|---|
| Modulation Scheme | $\gamma_{th}$ (dB) |
| QPSK | 0.71 |
| 16-QAM | 2.45 |
| 64-QAM | 4.27 |

5.4.1.2 Energy Efficiency as a Function of SINR

Using the average SINR $\gamma_r$ over the reference link as a design variable, the average transmit EE $\eta_{ee}$ defined in (5.15) becomes an objective function $-f_n$.

$$f_\eta(\gamma_r) = -\eta_{ee}(\gamma_r) = -\epsilon_y \frac{[1 - P_e(\gamma_r)|}{\epsilon_x \gamma_r + 1}, \tag{5.26}$$

where $$\epsilon_z = \frac{\eta_t(N_{sym}^{ul} + N_{sym}^{p})}{(N_{sym}^{ul} + N_{sym}^{p})(P_{tx} + P_{bb}) + P_{tot}^{r}(N_{sym}^{dl} + N_{sym}^{p} + N_{sym}^{g})},$$

and $$\epsilon_y = \frac{N_{sym}^{ul} N_u N_B L_{pkt}}{L_{tot} T_{sym}} \cdot \frac{1}{\begin{bmatrix} (N_{sym}^{ul} + N_{sym}^{p})(P_{ix} + P_{bb}) + \\ P_{tot}^{r}(N_{sym}^{dl} + N_{sym}^{p} + N_{sym}^{g}) \end{bmatrix}}, \tag{5.27}$$

5.4.1.3 Average Transmit Power as a Function of SINR

From (5.22) and (5.23), the average total transmit power ▯ PT at the MR is given by $$\overline{P}_T \simeq \frac{\gamma_r \cdot E\{\overline{P}_{inp}^{\Gamma j}\}}{G_T G_R L_s L_{NF} E\left\{\|\hat{H}_{siso,k}^{i}\|^2\right\}}. \tag{5.28}$$

FIGS. 28 and 29 show analytical performance results of transmit EE $\eta_{ee}$ vs the number of used subcarriers, $\eta_{ee}$ vs INP threshold $\gamma_{inp}$, $\eta_{ee}$ vs the average transmit power $\overline{P}_T$, and $\gamma_{inp}$ vs $\overline{P}_T$. FIG. 28 shows transmit EE $\eta_{ee}$ (left y-axis) vs the number of used subcarriers $N_u$ (bottom x-axis) for 4×4 MIMO with 1-spatial beam $N_B$=1. FIG. 28 also shows transmit EE $\eta_{ee}$ (right y-axis) vs threshold $\gamma_{inp}$ (top x-axis) for 4×4 MIMO with 1-spatial beam $N_B$=1. FIG. 29 shows transmit EE $\eta_{ee}$ (left y-axis) of 4×4 MIMO vs average transmit power $P_T$ (bottom x-axis). FIG. 29 also shows $P_T$ (right y-axis) vs threshold $\gamma_{inp}$ (top x-axis) for 4×4 MIMO with 1-spatial beam ($N_B$=1). Parameters associated with the packet structure and the power consumption of the hardware circuitry are shown in Table 5.2 in Section 5.5. The average INP power is set 3 dB higher than the averaged noise power $\overline{P}_{np,k}$. From the figures, one may observe that $\eta_{ee}$ is proportional to successful packet rate $[1-P_e(\gamma_b)]$ and the number of "use" subcarriers $N_u$ assuming the threshold $\gamma_{inp}$ and the average INP are fixed. $\eta_{ee}$ is inversely proportional to the threshold $\gamma_{inp}$ (accordingly the average transmit power $\overline{P}_T$) when the number of used subcarriers and the average INP are fixed. In linear precoding at the MR, decreasing the number of spatial beams $N_B$ would potentially tend to improve the maximum EE. However this would come at a reduction in the data rates that could be achieved. The EE shows a convex function of $\overline{P}_T$. When $\overline{P}_T$ is less than a threshold, the EE approaches zero since only a few bits are successfully decoded. When $\overline{P}_T$ is raised above the threshold, the EE monotonically increases with $\overline{P}_T$ until the maximum EE is achieved after which it monotonically decreases with $\overline{P}_T$.

5.4.2 Optimization Algorithm

A locally-optimal operating point (equivalently SINR) for each MIMO architecture can be identified to yield near-maximum SE with a local minimum in energy consumption. The maximum transmit EE (successful bits/Joule) in (5.26) can be found at a targeted data rate (i.e., constellation and number of beams). This is accomplished by determining the optimal reference SINR $\gamma_r$, and relating that to the required $\overline{P}_T$. The energy-constrained problem for transmit EE upon the UL can be modeled as $$\text{minimize } f_\eta(\gamma_r) = -\eta_{ee}(\gamma_r)$$

$$\text{subject to } 1 \le \gamma_r \le \gamma_r^{max} \tag{5.29}$$

where $\gamma_r^{max}$ is the maximum SINR obtained at the Rx of FR. The task is to find the average transmission power $\overline{P}_T$ at the Tx leading to the average SINR $\gamma_r$ at the Rx that maximizes the EE for the given constraints.

The optimization problem at the MR side has the power constraint, and an efficient and fast algorithm is desired to identify the transmit power yielding the maximum transmit EE with the given constraints. It can be proven that since $f_n$ is differentiable, it is a convex function over $\gamma_r$ for $\gamma_r \ge 1$ by showing that $\partial^2 f_n(\gamma_r)/\partial^2\gamma_r \ge 0$ (See Appendix A). Therefore the optimization problem of $f_n$ can be efficiently solved by the damped Newton method. The method proposed to find the optimal SINR is more computationally complex than the approach to obtain energy per information bit using the FER approximation for a coded system in a quasi-static Rayleigh fading channel. However, the proposed optimization method based on the analytical PER approximation and acquired CSI is expected provide improved performance. The process of adaptive transmission at the MR side is described in Algorithm 1.

Algorithm 1 Process of Adaptive Transmission at the MR Side

1: Initiate the connection between the FR and the MR.

2: The FR periodically measures the INP levels and generates the IAM in (5.12). The IAM is sent to the MR via the DL.

3: The FR sends preamble and data OFDM symbols to the MR upon the DL.

4: The MR measures the received SINR and estimates the CSI $\hat{H}_{DL,k}^{i}$ from DL preamble symbols.

5: The MR calculates the UL CSI by the transpose of $\hat{H}_{DL,k}^{i}$, i.e. $\hat{H}_{UL,k}^{i} = (\hat{H}_{DL,k}^{i})^T$. The CSI $\hat{H}_{siso,k}^{i}$ on UL SISO link (the reference link) can be extracted from $\hat{H}_{UL,k}^{i}$. Normalize the channel gains based on the reference link.

6: The MR determines the channel rank and selects appropriate data rate (including the number of spatial beams $N_B$ and modulation schemes) for the given application that can be supported by the channel.

7: The MR computes the precoding encoder matrices $\hat{F}_{UL}^{i}$ for the available data subcarriers indicated by the IAM and their average INP levels (sent by the FR via the DL).

8: The MR computes the minimum transmit EE in (5.29) and obtains the optimal SINR $\gamma_r^{opt}$.

9: The MR computes the average total transmit power $\overline{P}_T$ in (5.28) using $\gamma_r^{opt}$ and other parameters in the MIMO-OFDM system.

10: The MR transmits the UL preamble and data OFDM symbols with the total power $\overline{P}_T$.

5.5 Numerical Results

In this section, we present numerical results comparing the EE performance between 2×2 and 4×4 MIMO architectures using the frequency selective channel model and the MIMO-OFDM system detailed in Section 5.1.2. Primary system parameters of the MIMO-OFDM system associated with the investigation are listed in Table 5.2. A low correlated Rayleigh channel condition is considered in the analysis. The path delays and path losses follow the International Telecommunication Union channel model A for vehicular test environment and the maximum Doppler shift $f_{Dmax}$ associated with a mobile channel is set as 25 Hz. The wireless communication link on the UL is subjected to interferers that are Poisson-distributed over $\Omega$ with density $\lambda_t = 3.2 \text{e} 10^{-5}$ per m². In the simulations, co-channel interferers are contained in annuli with minimum and maximum radii of $R_l = 100$ and $R_u = 5000$ meters respectively. Also $k_0 = \sigma_L = 1$ and $\alpha = 1.5$ for the session life distribution of interferers in (5.11). The probability of a subcarrier being contaminated by the CCI, $p_{cc}$, is set at 0.3, which means approximately 30% of subcarriers are affected by co-channel interferers within any symbol period. The data rate required from transmission of the IAM and INP levels to the MR upon the DL, i.e. $R_{iam}$, are approximately 5 Kbps with the block interference interval $T_H$ of 169.6 ms. The DL data rates $R_{dl}$ of spatial multiplexing MIMO architectures at high SINRs is determined by $R_{dl} = N_T N_d \log_2(M_o) N_{sym}^{dl}/T_{blk}$, which are approximately 3.92 Mbps and 7.85 Mbps respectively. The data rate loss on the DL due to the IAM overhead is only a small fraction of data rate on the DL ($R_{iam}/R_{dl} \approx 0.13\%$ and 0.06% for 2×2 and 4×4 MIMO respectively).

The average total transmit power $\bar{P}_T$ for each MIMO architecture depends on the optimal SINR $\gamma_r^{opt}$, the channel realizations and other constraints described in (5.28). Typically the FR is not battery-constrained, and so the average SINR on the DL is assumed to be on the order of 20 dB for channel estimation at the MR side. At the FR, channel estimation and the precoding decoder performance can degrade sharply with low SINRs due to the limited transmit power from the MR. The impaired CSI estimates on the UL are manifest in STEP 4 and STEP 5 in Algorithm 1.

In the analytical results, the average total transmit power of the MR is adjusted to achieve values of $\gamma_r$ ranging between −5 dB and 30 dB at the Rx of the FR. The convergence thresholds of turbo codes shown in Table 5.1 are employed to analytically approximate the PER in (5.25), which are used to find the average transmission power $\bar{P}_T$ at the MR leading to the optimal SINR at the FR that maximizes the EE on the UL. Numerical results demonstrate relationships between the transmit EE $\eta_{ee}$, the SNR $\gamma_r$, the modulation schemes, channel conditions, and the number of spatial beams $N_B$ (parallel streams). For different linear precoding schemes and OFDM system/MIMO channel model parameters, $\gamma_r^{opt}$, can be identified using the objective function $f_n(\gamma_r)$ in (5.29) in the Newton method employing an error $\varepsilon = 10^{-4}$. FIG. 30 shows transmit EE $\eta_{ee}$ of 2×2 and 4×4 MIMO systems with 1/2/3-spatial beam ($N_B = 1$, 2 and 3) vs. signal plus interference to noise ratio (SINR) $\gamma_r$ over a low correlated Rayleigh channel model. The optimal SNR $\gamma_r^{opt}$ (accordingly the optimal average transmit power $\bar{P}_T^{opt}$) denotes the SINR at which the maximum transmit EE occurs, as illustrated in FIG. 30. In these plots, 1-beam 4×4 MIMO configuration shows lower $\gamma_r^{opt}$ and higher transmit EE than 2×2 MIMO scenarios. $\gamma_r^{opt}$ is also seen to increase with increasing $N_B$ ($N_B = 1$, 2 and 3), while the maximum EE degrades with increasing $N_B$. This is due in part to the fact that in rich scattering environments, the MIMO architecture configured with more antennas and spatial beams requires larger SINRs to decode received signals, though it provides diversity and multiplexing gains. FIG. 31 shows SE $\eta_{se}$ of 2×2 and 4×4 MIMO systems with 1/2/3-spatial beam ($N_B = 1$, 2 and 3) vs. SINR $\gamma_r$ over a low correlated Rayleigh channel model. The spectra efficiencies $\eta_{se}$ of 2-beam and 3-beam 4×4 MIMO systems in FIG. 31 are 3× and 2× higher than 1-beam scenarios due to the multiplexing gains from use of parallel streams. It is also observed that $\gamma_r^{opt}$ corresponds to the point at which the SE is near its maximum (equivalently achieved data rate) for each of the different transmission modes.

TABLE 5.2

MIMO-OFDM system parameters

| Parameters | Value | Parameters | Value | Parameters | Value |
|---|---|---|---|---|---|
| $N_T$, $N_R$ | 2, 4 | $N_B$ | 1, 2, 3 | $N_{sc}$ | 1024 |
| $N_d$ | 832 | $N_{inp}$ | 16 | Q | 8 |
| $F_c$ | 915 MHz | $B_w$ | 10 MHz | $R_s$ | 15.36 MSa/s |
| $L_{cp}$ | 150 | $T_{sym}$ | 77.08 us | $T_H$ | 169.6 ms |
| Modulation | QPSK | $M_o$ | 4 | $G_T \cdot G_R$ | 3 dBi |
| $G_{mc}$ | 1 dB | $L_{NF}$ | −10 dB | $d_{tr}$ | 500 m |
| $R_u$ | $5 \cdot 10^3$ m | $R_l$ | 100 m | $\mu_L$ | 6.17 ms |
| $\lambda_t$ | $3.2 \times 10^{-5}$/m² | $\mu_{p,cc}$ | 20 dBm | $\sigma_{p,cc}$ | 10 dB |
| $\gamma_{inp}$ | 3 dB | $\eta_{papr}$ | 10 dB | $\eta_{pa}$ | 0.4 |
| $N_T^m{}_c$ | 1 | $p_{cc}$ | 0.3 | $\gamma_p$ | 2.5 |
| $L_{pkt}$ | 1024 bits | $L_{head}$ | 16 bits | $L_{crc}$ | 32 bits |
| $N_{sym}^{ul}$ | 10 | $N_{sym}^{dl}$ | 2 | $N_{sym}^P$ | 1 |
| $N_{sym}^g$ | 2 | $T_{oi}$ | $2 \cdot T_{blk}$ | $T_{blk}$ | 1.696 ms |
| $P_{bb}$ | 100 mW | $P_{rx}$ | 150 mW | $P_{tx}$ | 100 mW |

FIG. 32 shows maximum transmit EE $\eta_{ee}^{max}$ (on the left y-axis), corresponding SE $\eta_{se}$ (on the right y-axis) and optimal SINR $\gamma_r^{opt}$ of 2×2 MIMO 1-spatial beam and 4×4 MIMO with 1-/2-/3-spatial beam architectures for Non-IA and IA schemes varying with the probability of CCI $p_{cc}$ over the Rayleigh channel model. Architecture indices 1~8 on the x-axis denote "2×2 MIMO-1b, Non-IA", "4×4 MIMO-1b, Non-IA", "4×4 MIMO-2b, Non-IA", "4×4 MIMO-3b, Non-IA", "2×2 MIMO-1b, IA", "4×4 MIMO-1b, IA", "4×4 MIMO-2b, IA", and "4×4 MIMO-3b, IA" respectively. Blue and white bars are grouped for $\eta_{ee}^{max}$ and $\eta_{se}$ respectively. FIG. 32 illustrates the maximum transmit EE $\eta_{ee}^{max}$, the corresponding spectra efficiency rise, and the optimal SINR $\gamma_r^{opt}$ for 2×2 MIMO with 1-spatial beam and 4×4 MIMO with 1-/2-/3-spatial beam architectures for Non-IA and IA schemes over the low correlated Rayleigh channel. The figure also makes a comparison among different probabilities of CCI ($p_{cc}$=0.15, 0.3, 0.5, and 0.8). It can be verified that IA schemes with 1, 2 and 3 beams perform dramatically better than the Non-IA scenarios in terms of the maximum transmit EE over all four $p_{cc}$ cases. In the plots, when more spatial beams are selected, 4×4 MIMO 2- and 3-beam architectures show better spectral efficiencies, however they require higher SINR to achieve the maximum transmit EE. The 4×4 MIMO 3-beam architecture without IA indicates the largest SE among all architectures as all the subbands can be utilized for data transmission, but exhibits the worst EE performance, particularly when $p_{cc}$ is larger than 0.5. Higher $p_{cc}$ causes a larger number of subcarriers to be contaminated by CCI. It is observed that when CCI exists, the non-IA schemes perform much worse than the IA schemes. Without IA, the precoder of the MR allocates much more power on subcarriers contaminated by CCI exceeding the tolerated threshold in order to achieve the target SINR at the FR. When the IA method is employed, SEs are reduced on the UL because contaminated subcarriers are not used for data transmission at the MR. However, increases in the EE are observed. The use of only low-interference subchannels is clearly shown to outweigh any potential losses in EE due to the use of a reduced number subcarriers.

FIG. 33 shows transmit EE $\eta_{ee}$ of 2×2 MIMO and 4×4 MIMO with 1-spatial beam ($N_B$=1) vs. $\gamma_r$ vs. modulation schemes over a low correlated Rayleigh channel model. FIG. 34 shows transmit EE $\eta_{ee}$ of 4×4 MIMO with 2/3-spatial beam ($N_B$=2 and 3) vs. $\gamma_r$ vs. modulation schemes over a low correlated Rayleigh channel model. FIG. 33 and FIG. 34 depict trends of the transmit EE as a function of modulation schemes and SINR for 2×2 MIMO and 4×4 MIMO configurations with 1-, 2-, and 3-spatial beam over a low correlated Rayleigh fading channel. Three modulation schemes are employed: QPSK, 16-quadrature amplitude modulation (QAM) and 64-QAM. The impact of the modulation schemes on the maximum EE and the optimal SINR are evidenced in the figures. For the cases where low-order modulation schemes such as QPSK are used, the maximum energy efficiencies are greater than high-order modulation schemes such as 16-QAM and 64-QAM, while high-order modulation schemes provide higher data rates.

According to (5.15), higher order modulation schemes increase the data rate, which would seem to enhance the transmit EE. However, the transmit EE is also inversely proportional to the transmit power $\overline{P}_T$. As shown in FIG. 27, on the AWGN channel, turbo codes with various modulation schemes exhibit different $E_b$=$N_o$ performance in quasi-static fading channels for PERs down to $10^{-3}$. A lower order modulation such as QPSK requires smaller SINR per bit than 16-QAM and 64-QAM schemes at the receiver (accordingly lower transmit power) for a given PER. When packet erasures are considered in the transmit EE definition, low order modulation schemes tend to exhibit better energy efficient than higher order counterparts, indicating that the power requirements, rather than data rate, dominate the impact on EE. The gain in EE for the lower order modulation schemes, however, comes at the expense of a reduced data rate.

Chapter 6

Conclusions and Future Research Direction

6.1 Conclusions

The EE and SE of MIMO architectures with and without CSIT associated linear precoding have been investigated in packet erasure channels. A goal has been to compare the performance of various space- and polarization-based MIMO architectures relative to SISO systems. Architectures considered in the analysis include SISO, CP-MIMO, DP-MIMO, and SP-MIMO architectures. For a given system architecture, number of data streams, data rates, packet size and other system parameters that dictate the maximum SE, the EE is found to exhibit performance that can be optimized through power control of the transmission. The optimal point of operation typically occurs where the spectral efficiency is maximized for the given system parameters. Generally, there is a tradeoff between EE and the SE: the best EE typically occurs for system parameters with lower maximum SEs, while systems with higher maximum SEs typically yield poorer EEs.

Initially the work considered full multiplexed systems without the use of CSIT, but was then extended to the consideration of adaptive transmission architectures with linear precoding that take advantage of CSIT. The adaptive schemes take advantage of available space- and polarization diversities, leading to considerable EE performance improvements over full-multiplexing schemes. The optimal EE typically occurs at relatively low SNR conditions, opening the possibility of increased vulnerability to co-channel interference. Therefore, an interference avoidance scheme was proposed and analyzed involving the identification of frequency subbands containing significant interference, the conveyance of this information to the transmitter, and then use of energy-efficient waveforms with linear precoding that avoid use of carriers containing CCI power. These various analyses correspond to the work described in Chapters 3, 4, and 5.

In Chapter 3, the transmit EE was first investigated for full spatial multiplexing systems, and the EE and SE performance of MIMO systems were determined relative to SISO systems. Under the assumption of flat fading, theoretical developments were pursued, leading to numerical results for flat fading channel conditions with different space-correlation behaviors. The results indicated that a tradeoff exists between the EE and a number of factors including SE, modulation schemes, packet size, channel coding and erasure schemes. Next, using a SP-MIMO emulation testbed, system performance was also evaluated over a wide range of frequency-selective space and polarization correlation conditions. A comparison of the transmit EE and SE results for the different MIMO architectures show that SP-MIMO and DP-MIMO systems can achieve SE advantages and improved energy effciencies over conventional CP-MIMO and SISO systems, depending on channel conditions and the SNR. At high SNR and uncorrelated Rayleigh channels, the efficiency is found to improve with higher-order modulation constellations and with the use of MIMO instead of SISO. At lower SNR, lower-order constellations tend to be more efficient, but also exhibit reduced spectral efficiencies. The use of subpackets has a favorable performance impact, particularly at lower SNRs due to reductions in the PER. For Rayleigh channels with low spatial correlation, SP-MIMO provides a nearly 3.5× and 1.5× gains in EE relative to 2×2 MIMO schemes and SISO, respectively at high SNR. For the case of highly correlated spatial channels, CP-MIMO and SP-MIMO performance degrades severely due to channel rank deficiencies. However DP-MIMO is less affected by spatial correlation and retains its favorable performance levels relative to SISO. The SE and EE gains of DP-MIMO in spatially correlated channels achieve an approximate 2× improvement over SISO.

In highly correlated channels, the PER and EE performance losses of MIMO systems can potentially be remedied with adaptive transmission schemes based on linear precoding techniques when the CSI is available to the Tx. Chapter 4 considers adaptive transmission and its impact on energy efficient operations in the context of battery-powered unmanned systems in packet erasure channels, especially under the assumption of long-range communications where transmit energy dominates the energy consumption of the system. The results suggest that significant efficiency gains are possible through the use of linear precoding techniques. Emulation results from the hybrid hardware/software SP-MIMO testbed indicate that precoded 4×4 SP-MIMO outperforms SISO and full multiplexing techniques in spatially low correlated channels (such as in certain A-to-G channels), with energy efficiencies approximately 5- and 2-times better than SISO and non-precoded 2×2 MIMO architectures at low SNR values, respectively. In A-to-G Rician channels exhibiting either partial or high spatial correlation such as in line-of-sight (LOS) channels, 1-beam precoded 4×4 MIMO architectures can offer a 10- to 20-fold EE gain relative to nonprecoded DP and CP architectures in the low SNR regime. These EE improvements accrue due to reduced packet error rates when linear precoding schemes are used. In both non-precoded and precoded schemes for the unmanned system, an operating point exists that minimizes energy consumption while providing near maximum SE. Use of these operating points would help to extend battery powered operation of the system, which are quantified in terms of operating time (endurance) estimates.

The best operating time performance is indicated by 1-beam precoded 4×4 MIMO systems. However, 2-beam and 3-beam precoded scenarios provide 2X and 3X data rates respectively relative to 1-beam case. These analyses considered A-to-G and G-to-G scenarios with different correlation and fading properties, and in all cases, intelligent selection of the number of transmit beams coupled with linear precoding and optimization of the transmission power can yield EE gains that could substantially increase the operational times of battery-powered unmanned systems having long-range downlink.

The relatively low SNR requirements associated with the optimal EEs suggest a potential vulnerability to co-channel interference. For example, when multiple mobile users or primary and secondary users operate on a shared frequency channel, CCI can potentially degrade the performance of the proposed EE optimization scheme. To combat interference, an interference avoidance method is proposed in Chapter 5. The method requires estimation of CCI statistics at the intended receiver, and conveyance of these statistics to the transmitter. The transmit EE is then optimized using adaptive transmission over the subcarriers where the CCI impact is negligible. The algorithm depends on the SINR, interference statistics, channel conditions and a number of communications system parameters. The analysis is framed using broadband MIMO-OFDM system architectures in a TDD mode. The algorithm optimizes the SINR (accordingly the total transmit power) over the selected subcarriers in order to achieve the maximum transmit EE in packet erasure channels. The optimization is conditioned on the MIMO architecture, the channel coding characteristics, the modulation constellation, packet structure, and the adaptive transmission schemes.

Numerical results demonstrate performance tradeoffs as a function of linear precoder designs, modulation schemes, interference statistics and MIMO channel conditions and indicate the potential of the technology to minimize energy consumption under CCI conditions. It is also verified that when CCI exists, the EE performance of non-IA schemes perform much worse than the performance of IA schemes since the Tx at the MR consumes much more power on subbands contaminated by CCI to achieve the target SINR and the fixed data rate at the FR. The SE in the case of IA degrades because of the loss of the use of subcarriers where interference levels are significant, but data are transmitted over the remaining subcarriers in an efficient manner. Data rate loss on the DL due to overhead to implement the IA is found to be a small fraction of the DL data rate (less than 0.1%).

The primary contributions of this application work include the following: 1. A closed-form approximations for an EE metric is derived that is based on successful reception of transmitted payloads and incorporates the impact of packet erasures (See Equation (3.5) in Section 3.1). This definition leads to the identification of operating conditions that yield a local minimum in energy consumption at near-maximum SE for the given symbol rate, the constellation and the number of spatial beams. 2. A sub-packet erasure method is introduced to improve the EE over MIMO channels for both full spatial multiplexing MIMO systems (See Section 1.3) and adaptive MIMO systems that exploit CSIT. This strategy leads to improved EE by reducing the number of successfully decoded bits that are erased by MIMO systems. 3. The EE performance of various full-multiplexing MIMO architectures is estimated in different frequency-selective channel realizations with different spatial correlation and polarization correlation characteristics by using a sophisticated SP-MIMO emulation testbed (See Section 3.3). For each architecture it is possible to identify an operating point in the SE-EE plane corresponding to near-maximum SE with a corresponding local minimum in energy consumption. 4. The hybrid software/hardware testbed was modified to enable use of CSIT (See Section 4.3). The modified testbed was used to analyze the relative performance of adaptive transmission (or linear precoding) schemes for different MIMO architectures in polarization-sensitive channels (See Section 4.4). Various tradeoffs are quantified in terms of SE, EE, and SNR. 5. Operating points for each adaptive transmission based architecture and channel realization are identified that minimize energy consumption and provide near maximum SE. Some tradeoffs exist between the EE performance and the spectral efficiency for a given channel realization (See Section 4.4.2.4). Battery capacities are used to estimate transceiver operational times for the operating point minimizing energy consumption (See Equation 4.28 and Section 4.4.2.5). 6. A wideband interference model is developed to characterize random processes of CCI (See Section 5.2). 7. In the presence of CCI, an efficient link-based and dynamic IA approach with very small bandwidth overhead is proposed to minimize energy consumption in packet-based communications when the link is subject to interference, frequency selective fading, and packet erasures (See Section 5.3). The method enables battery-powered radios to operate in interference while simultaneously using near-minimum energy consumption to transfer data in a manner that results in low energy footprints and serves to promote spectrum sharing. 8. An analytical framework is also presented to analyze the EE as a function of practical broadband communications system parameters, including channel coding characteristics, modulations, PER, packet structure, transmit power profile, power consumption in subsystems, adaptive transmission schemes, IA and physical interference channel models in networks with packet erasures (See Section 5.4). Methods are also developed at the Tx to optimize the EE by identifying optimal linear precoding and transmit power profiles for MIMO systems operating in the interference environments to achieve energy efficient operation in latency-constrained packet networks (See Equation (5.28) and Algorithm 1 in Section 5.4.2).

6.2 Future Research Directions

The energy-efficient communications approach can potentially be used to improve the capacity and EE of vehicle-to-vehicle (V2V) wireless communications and vehicular ad hoc networks (VANET)s. In the V2V or VANET systems, when two or more vehicles or roadside stations are in radio communication range, they can connect automatically and establish an ad hoc network, enabling the sharing of reliable safety messages such as positions, velocities, and directions. Every vehicle also acts as a router and allows sending messages over multiple-hops to more distant vehicles and roadside stations. The routing algorithm requires handling fast changes of the network topology based on the positions of the vehicles. The V2V system is capable of making automatic or semi-automatic decisions, providing warnings/safety information and potentially taking effective actions of collision avoidance. However, the BER, PER and throughput performance of vehicles in the vehicular communications system may degrade in the presence of CCI. The link-based IA method proposed in this thesis can potentially be applied. With effective IA schemes, the overall throughput and EE of vehicular communications systems can be potentially be improved in a dynamic interference environment.

Energy-efficient communications can also potentially benefit operations of a battery-powered drone swarm, which is defined as a large collection of UAVs working together in a coordinated manner. Swarming drones can communicate with each other autonomously and be ready to fly in a group. Once airborne, the drone swarm shares the information between UAVs, enabling autonomous collaborative behaviors and making decisions in either defensive or offensive missions. As shown in Chapter 4, adaptive MIMO transmission techniques based on linear precoding and power control strategies are used to improve energy efficiencies over multipath fading channels from the GS to the UAV. However, jamming or strong CCI signals in hostile environments can sharply deteriorate the communications or adaptive transmission among the UAVs. The energy-efficient design with link-based IA technique and adaptive linear precoding might help preserve battery life and reduce the risk of communications interruptions under the strong interference conditions and highly dynamic spectrum sharing.

The analytical framework employed to study energy-efficient communications can also potentially be applied in the design of energy-efficient architectures and algorithms in multi-user multiple-input multiple-output (MU-MIMO) systems, where multiple users communicate in the same frequency and time slots. The methods may provide a gain in network performance using the best suited MIMO configuration and adaptive transmission strategy based on the IA concepts.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

It should also be appreciated, in light of this disclosure, that multiple distributed computing devices can be substituted for any one computing device illustrated herein. In such distributed embodiments, the functions of the one computing device are distributed such that some functions are performed on each of the distributed computing devices.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

Acronyms 3D three-dimensional
ADPS angular delay power spectrum
A-to-G air-to-ground
AWGN additive white Gaussian noise
BB baseband
BER bit error rate
BPSK binary phase shift keying
CCI co-channel interference
CMOS complementary metal-oxide semiconductor
CP co-polarized
CP-MIMO co-polarized MIMO
CPR co-polarized power ratio
CSI channel state information
CSIT channel state information at the transmitter
DDC digital down conversion
DL downlink
DoA direction of arrival
DoD direction of departure
DOF degree of freedom
DP dual-polarized
DP-MIMO dual-polarized MIMO
EE energy efficiency
FFT fast Fourier transform
FR fixed radio GPU graphics processor unit
GS ground station
GSCM geometry-based stochastic channel model
GSM global system for mobile
G-to-G ground-to-ground
IA interference avoidance
IAM interference avoidance map
IFFT inverse fast Fourier transform
i.i.d. independent and identically distributed
INP interference plus noise power
IQ inphase and quadrature
ISI inter-symbol interference
LNA low noise amplifier
LOS line-of-sight
MIMO multiple-input multiple-output
MMSE minimum mean square error
MPC multiple path components
MR mobile radio
MU-MIMO multi-user multiple-input multiple-output
NLOS non-line-of-sight
OFDM orthogonal frequency-division multiplexing
PA power amplifier
PAPR peak-to-average power ratio
PDP power delay profile
PER packet error rate
PSK phase-shift keying
QAM quadrature amplitude modulation
QPSK quadrature phase shift keying
RF radio frequency
r.v. random variable
Rx receiver
RX receive
SE spectral efficiency
SINR signal plus interference to noise ratio
SISO single-input single-output
SNR signal to noise ratio
SP space and polarization
SP-MIMO space and polarization MIMO
S-V Saleh-Valenzuela
TDD time-division duplexing
Tx transmitter
TX transmit
UAV unmanned aircraft vehicle
UL uplink
US unmanned system
V2V vehicle-to-vehicle
VANET vehicular ad hoc networks
WCDMA Wideband CDMA
XPD cross polarization discrimination

APPENDIX A

Proofs of Convex Optimization

In this section, we prove that $f_n(\gamma_r)$ in (5.26) and (5.29) satisfies $\partial^2 f_n(\gamma_r)/\partial^2\gamma_r \geq 0$, leading to the conclusion that the optimization of transmit EE is a convex optimization problem. Given a channel coding scheme and a MIMO architecture, the PER in (5.25) can be simplified as $$P_e(\gamma_r) \approx 1 - e^{-\frac{C}{A\gamma_r}} \tag{A.1}$$

where $$C = \gamma_{th} L$$

$$\overline{\gamma}_b = A\gamma_r > 0$$

-continued $$A = \frac{B_w}{R_b} \frac{\sum_{n=1}^{N_B} E\left\{\left\|\left[\hat{G}^i_{UL,k}\hat{H}^i_{UL,k}\hat{S}^i_{F,k}\right]_m\right\|^2\right\}}{N_B \cdot E\left\{\left\|\hat{H}^i_{UL,siso}\right\|^2\right\}} > 0 \tag{A.2}$$

$$\sum_{l=0}^{L-1} \frac{1}{l!}\left(\frac{C}{A\gamma_r}\right)^i \approx 1,$$

when $$\gamma_r \geq \gamma_{min} \geq 1,$$

and $\gamma_{min}$ is a threshold.

The first partial derivative of $f_n(\gamma_r)$ in terms of $\gamma_r$ is given by $$\frac{\partial f_\eta(\gamma_r)}{\partial\gamma_r} = \epsilon_y \cdot \frac{P'_e(\gamma_r)(\epsilon_x\gamma_r + 1) + [1 - P_e(\gamma_r)]\epsilon_x}{(\epsilon_x\gamma_r + 1)^2} \tag{A.3}$$

where $$P'_\varepsilon(\gamma_r) = \frac{\partial P_e(\gamma_r)}{\partial\gamma_r} = -\frac{C}{A\gamma_r^2}e^{-\frac{-C}{A\gamma_r}} < 0, \epsilon_x > 0 \tag{A.4}$$

and $$\epsilon_y > 0.$$

Similarly, the second partial derivative $f_n(\gamma_r)$ is obtained as $$\frac{\partial f_\eta(\gamma_r)}{\partial^2\gamma_r} = \epsilon_y \cdot \frac{\{[P''_\varepsilon(\gamma_r)(\epsilon_x\gamma_r + 1)^3| - 2\epsilon_x(\epsilon_x\gamma_r + 1)[\epsilon_x \cdot D + P'_e(\gamma_r)]\}}{(\epsilon_x\gamma_r + 1)^4} \tag{A.5}$$

where $$P''_e(\gamma_r) = \frac{\partial^2 P_e(\gamma_r)}{\partial^2\gamma_r} = \frac{C}{A\gamma_r^4}e^{-\frac{-C}{A\gamma_r}}\left(2\gamma_r - \frac{C}{A}\right), \tag{A.6}$$

$$D = P'_e(\gamma_r)\gamma_r + 1 - P_e(\gamma_r) = -\frac{C}{A\gamma_r}e^{-\frac{-C}{A\gamma_r}} + e^{-\frac{-C}{A\gamma_r}}.$$

When $$\gamma_r \geq \max\left\{\frac{C}{2A}, \gamma_{min}\right\}$$

and $$\gamma_r \leq \frac{C}{A},$$

we obtain $P_e^{\#}(\gamma_r) \geq 0$ and $D \leq 0$ in (A.6). Plugging (A.4) and (A.6) into (A.5), we prove that $\partial^2 f_n(\gamma_r)/\partial^2\gamma_r \geq 0$.

What is claimed is:

1. A transceiver for use in a point-to-point packet-based communication link with packet erasures, the transceiver comprising:

a data source to provide bits of data for transmission to a remote device via a channel;

a processor to map the bits of data to symbols in a constellation according to a modulation scheme and to provide the symbols on one or more subcarriers; and multiple antenna elements, the multiple antenna elements comprising co-located orthogonally polarized elements or spatially separated elements or both, wherein the symbols are transmitted to the remote device in packets via one or more of the multiple antenna elements, and wherein the processor is further configured to determine a metric of average transmit energy per bit successfully decoded, and not erased, at the remote device and to adjust transmission powers at the one or more antenna elements to reduce the average transmit energy per successfully decoded and unerased bit.

2. The transceiver of claim 1, wherein the processor is further configured to form one or more weighted combinations of data that are transmitted via multiple ones of the antenna elements.

3. The transceiver of claim 2, wherein the one or more weighted combinations of data comprise eigenmodes.

4. The transceiver of claim 2, wherein the processor selects the one or more weighted combinations of data and determines the transmit power for the selected ones based on channel state information.

5. The transceiver of claim 4, wherein the channel state information is received from the remote device.

6. The transceiver of claim 4, wherein the channel state information is determined by the processor from preamble or pilot signals transmitted by the remote device based on an assumption of a reciprocal channel between the transceiver and the remote device.

7. The transceiver of claim 4, wherein the processor selects a subset of linearly independent weighted combinations which can be transmitted using the multiple antenna elements.

8. The transceiver of claim 1, wherein the processor selects the one or more subcarriers based on interference information provided by the remote device.

9. The transceiver of claim 8, wherein the processor selects one or more subcarriers which exhibit a lesser degree of interference at the remote device.

10. The transceiver of claim 1, wherein the metric of average transmit energy per bit accounts for packet erasures at the remote device.

11. The transceiver of claim 1, wherein the processor determines the metric of average transmit energy per successfully decoded and unerased bit for a selected packet payload size by estimating a number of unerased packets relative to a total amount of energy required to deliver those unerased packets, and forming the metric of a ratio of the total energy to the estimate of the number of total bits in all unerased packets.

12. The transceiver of claim 11, wherein the metric is computed using packet error rate, energy per bit to interference-plus-noise power spectral density ratio, packet length, packet length excluding a header and preamble, the number of subcarriers, transmit power and receiver power, the number of symbols delivered per block, the number of symbols in a packet preamble per block used for synchronization and channel estimation, the symbol duration, the number of eigenmodes and the specific selected eigenmodes, the number of downlink symbols, or the number of guard symbols.

13. The transceiver of claim 1, wherein the processor reduces the average transmit energy per successfully decoded and not erased bit by reducing the packet erasure rate at the remote device.

14. The transceiver of claim 13, wherein the processor reduces the packet erasure rate by selecting the size of each transmitted packet.

15. The transceiver of claim 1, wherein the processor reduces the average transmit energy per successfully decoded and unerased bit by:

selecting a data rate, including the modulation scheme and a number of eigenmodes that can be supported by the channel;

determining a weighted combination to be used in transmission for one or more data streams and for the one or more subcarriers to be utilized in the transmission;

determining a maximum transmit energy efficiency and a corresponding optimal signal plus interference to noise ratio (SINR) for each of the one or more subcarriers; and determining a corresponding transmit power for each of the one or more subcarriers using at least the optimal SINR values.

16. The transceiver of claim 1, wherein the one or more subcarriers are orthogonal subcarriers.

17. The transceiver of claim 1, wherein the transceiver is a battery powered unit.

18. The transceiver of claim 1, wherein the transceiver reduces the average transmit energy per successfully decoded and unerased bit by jointly considering the number of transmitted eigenmodes and the specific selection of eigenmodes, packet length, modulation constellation, the one or more subcarriers, and the transmit power.

19. A method for use in a point-to-point packet-based communication link with packet erasures, the method comprising:

providing bits of data for transmission to a remote device via a channel;

mapping the bits of data to symbols in a constellation according to a modulation scheme;

providing the symbols on one or more subcarriers;

transmitting the symbols to the remote device in packets via one or more of multiple antenna elements, the multiple antenna elements comprising co-located orthogonally polarized elements or spatially separated elements or both; and determining a metric of average transmit energy per bit successfully decoded, and not erased, at the remote device and adjusting transmission powers at the one or more antenna elements to reduce the average transmit energy per successfully decoded and unerased bit.

* * * * *